US007783543B2

(12) United States Patent
Horowitz

(10) Patent No.: US 7,783,543 B2
(45) Date of Patent: *Aug. 24, 2010

(54) FINANCIAL ACTIVITY BASED ON NATURAL PERIL EVENTS

(75) Inventor: Kenneth A. Horowitz, Palm Beach, FL (US)

(73) Assignee: Weather Risk Solutions, LLC, Palm Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/981,504

(22) Filed: Oct. 31, 2007

(65) Prior Publication Data

US 2008/0065521 A1 Mar. 13, 2008

Related U.S. Application Data

(63) Continuation-in-part of application No. 11/312,662, filed on Dec. 20, 2005, now Pat. No. 7,693,766, application No. 11/981,504, which is a continuation-in-part of application No. 11/901,050, filed on Sep. 14, 2007, now Pat. No. 7,584,134, which is a continuation-in-part of application No. 11/312,783, filed on Dec. 20, 2005, now Pat. No. 7,584,133.

(60) Provisional application No. 60/637,784, filed on Dec. 21, 2004.

(51) Int. Cl.
*G06Q 40/00* (2006.01)

(52) U.S. Cl. ........................................................ 705/35

(58) Field of Classification Search ........................ None
See application file for complete search history.

(56) References Cited

U.S. PATENT DOCUMENTS 3,573,747 A 4/1971 Adams
3,874,584 A 4/1975 Foley (Continued)

FOREIGN PATENT DOCUMENTS

EP 0752135 9/1995

(Continued)

OTHER PUBLICATIONS

"A Dynamic Pari-Mutuel Market for Hedging, Wagering, and Information Aggregation", (ACM Conference on Electronic Commerce May 17, 2004), published by David M. Pennock.

(Continued)

*Primary Examiner*—Jason M Borlinghaus
(74) *Attorney, Agent, or Firm*—Hughes Socol Piers Resnick & Dym Ltd.

(57) ABSTRACT

A financial activity network includes a central managing system connected to a plurality of participant terminals. Rules governing operation of the financial activity are stored for future reference. A participant provides investment information such as a map location for the predicted strike by the natural peril event and, optionally, one or more secondary parameters relating to the natural peril event, such as the time interval between the time of investment and the time of an event strike and/or the severity of the event strike according to an established scale. In one example, an external objective independent information source is consulted, with the external objective independent information source providing monitoring, interpretation and derived determination of parameters pertaining to the natural peril event. Methods and articles of manufacture are also disclosed.

14 Claims, 45 Drawing Sheets

U.S. PATENT DOCUMENTS

| | | |
|---|---|---|
| 4,235,001 A | 11/1980 | Matino |
| 4,323,770 A | 4/1982 | Dieulot et al. |
| 4,334,270 A | 6/1982 | Towers |
| 4,346,442 A | 8/1982 | Musmanno |
| 4,376,978 A | 3/1983 | Musmanno |
| 4,412,287 A | 10/1983 | Braddock, III |
| 4,554,418 A | 11/1985 | Toy |
| 4,566,066 A | 1/1986 | Towers |
| 4,674,044 A | 6/1987 | Kalmus et al. |
| 4,722,055 A | 1/1988 | Roberts |
| 4,739,478 A | 4/1988 | Roberts et al. |
| 4,751,640 A | 6/1988 | Lucas et al. |
| 4,752,877 A | 6/1988 | Roberts et al. |
| 4,766,539 A | 8/1988 | Fox |
| 4,823,264 A | 4/1989 | Deming |
| 4,823,265 A | 4/1989 | Nelson |
| 4,831,526 A | 5/1989 | Luchs et al. |
| 4,839,804 A | 6/1989 | Roberts et al. |
| 4,842,278 A | 6/1989 | Markowicz |
| 4,903,201 A | 2/1990 | Wagner |
| 4,933,842 A | 6/1990 | Durbin et al. |
| 4,953,085 A | 8/1990 | Atkins |
| 4,975,840 A | 12/1990 | DeTore et al. |
| 4,980,826 A | 12/1990 | Wagner |
| 5,077,665 A | 12/1991 | Silverman et al. |
| 5,101,353 A | 3/1992 | Lupien et al. |
| 5,126,936 A | 6/1992 | Champion et al. |
| 5,136,501 A | 8/1992 | Silverman et al. |
| 5,148,365 A | 9/1992 | Dembo |
| 5,220,500 A | 6/1993 | Baird et al. |
| 5,275,400 A | 1/1994 | Weingardt et al. |
| 5,444,819 A | 8/1995 | Negishi |
| 5,491,629 A | 2/1996 | Fox et al. |
| 5,519,605 A | 5/1996 | Cawlfield |
| 5,568,378 A | 10/1996 | Wojsznis |
| 5,608,620 A | 3/1997 | Lundgren |
| 5,663,547 A | 9/1997 | Ziarno |
| 5,665,952 A | 9/1997 | Ziarno |
| 5,671,363 A | 9/1997 | Cristofich et al. |
| 5,689,649 A | 11/1997 | Altman et al. |
| 5,689,650 A | 11/1997 | McClelland et al. |
| 5,689,799 A | 11/1997 | Dougherty et al. |
| 5,696,366 A | 12/1997 | Ziarno |
| 5,712,985 A | 1/1998 | Lee et al. |
| 5,717,989 A | 2/1998 | Tozzoli et al. |
| 5,732,400 A | 3/1998 | Mandler et al. |
| 5,745,383 A | 4/1998 | Barber |
| 5,749,785 A | 5/1998 | Rossides |
| 5,794,207 A | 8/1998 | Walker et al. |
| 5,796,932 A | 8/1998 | Fox et al. |
| 5,802,500 A | 9/1998 | Ryan et al. |
| 5,806,048 A | 9/1998 | Kiron et al. |
| 5,819,238 A | 10/1998 | Fernholz |
| 5,830,068 A | 11/1998 | Brenner et al. |
| 5,830,069 A | 11/1998 | Soltesz et al. |
| 5,832,456 A | 11/1998 | Fox et al. |
| 5,845,266 A | 12/1998 | Lupien et al. |
| 5,848,396 A | 12/1998 | Gerace |
| 5,855,514 A | 1/1999 | Kamille |
| 5,873,782 A | 2/1999 | Hall |
| 5,878,141 A | 3/1999 | Daly et al. |
| 5,911,136 A | 6/1999 | Atkins |
| 5,926,800 A | 7/1999 | Baronowski et al. |
| 5,931,467 A | 8/1999 | Kamille |
| 5,946,666 A | 8/1999 | Nevo et al. |
| 5,953,707 A | 9/1999 | Huang et al. |
| 5,970,479 A | 10/1999 | Shepherd |
| 5,987,433 A | 11/1999 | Crapo |
| 5,991,735 A | 11/1999 | Gerace |
| 6,015,345 A | 1/2000 | Kail |
| 6,024,641 A | 2/2000 | Sarno |
| 6,026,364 A | 2/2000 | Whitworth |
| 6,064,985 A | 5/2000 | Anderson |
| 6,078,901 A | 6/2000 | Ching |
| 6,078,904 A | 6/2000 | Rebane |
| 6,078,905 A | 6/2000 | Pich-LeWinter |
| 6,085,174 A | 7/2000 | Edelman |
| 6,085,175 A | 7/2000 | Gugel et al. |
| 6,088,686 A | 7/2000 | Walker et al. |
| 6,089,981 A | 7/2000 | Brenner et al. |
| 6,099,409 A | 8/2000 | Brenner et al. |
| 6,105,005 A | 8/2000 | Fuhrer |
| 6,134,536 A | 10/2000 | Shepherd |
| 6,135,884 A | 10/2000 | Hedrick et al. |
| 6,151,588 A | 11/2000 | Tozzoli et al. |
| 6,167,378 A | 12/2000 | Webber, Jr. |
| 6,224,486 B1 | 5/2001 | Walker et al. |
| 6,229,810 B1 | 5/2001 | Gerszberg et al. |
| 6,236,972 B1 | 5/2001 | Shkedy |
| 6,236,973 B1 | 5/2001 | Dillard |
| 6,236,977 B1 | 5/2001 | Verba et al. |
| 6,269,101 B1 | 7/2001 | Gerszberg et al. |
| 6,269,343 B1 | 7/2001 | Pallakoff |
| 6,278,983 B1 | 8/2001 | Ball |
| 6,292,787 B1 | 9/2001 | Scott et al. |
| 6,315,666 B1 | 11/2001 | Mastera et al. |
| 6,317,726 B1 | 11/2001 | O'Shaughnessy |
| 6,317,727 B1 | 11/2001 | May |
| 6,319,122 B1 | 11/2001 | Packes, Jr. et al. |
| 6,321,212 B1 | 11/2001 | Lange |
| 6,330,551 B1 | 12/2001 | Burchetta et al. |
| 6,336,103 B1 | 1/2002 | Baker |
| 6,336,105 B1 | 1/2002 | Conklin et al. |
| 6,345,239 B1 | 2/2002 | Bowman-Amuah |
| 6,363,525 B1 | 3/2002 | Dougherty et al. |
| 6,368,216 B1 | 4/2002 | Hedrick et al. |
| 6,370,516 B1 | 4/2002 | Reese |
| 6,375,571 B1 | 4/2002 | Ohnuma et al. |
| 6,405,179 B1 | 6/2002 | Rebane |
| 6,415,267 B1 | 7/2002 | Hagan |
| 6,421,653 B1 | 7/2002 | May |
| 6,427,132 B1 | 7/2002 | Bowman-Amuah |
| 6,430,542 B1 | 8/2002 | Moran |
| 6,453,687 B2 | 9/2002 | Sharod et al. |
| 6,460,029 B1 | 10/2002 | Fries et al. |
| 6,470,321 B1 | 10/2002 | Cumming et al. |
| 6,508,710 B1 | 1/2003 | Paravia et al. |
| 6,513,031 B1 | 1/2003 | Fries et al. |
| 6,527,172 B1 | 3/2003 | Lewis et al. |
| 6,527,270 B2 | 3/2003 | Maksymec et al. |
| 6,546,375 B1 | 4/2003 | Pang et al. |
| 6,554,708 B1 | 4/2003 | Brenner et al. |
| 6,554,709 B1 | 4/2003 | Brenner et al. |
| 6,560,580 B1 | 5/2003 | Fraser et al. |
| 6,591,232 B1 | 7/2003 | Kassapoglou |
| 6,601,059 B1 | 7/2003 | Fries |
| 6,625,582 B2 | 9/2003 | Richman et al. |
| 6,662,195 B1 | 12/2003 | Langseth et al. |
| 6,666,769 B2 | 12/2003 | Stronach |
| 6,671,715 B1 | 12/2003 | Langseth et al. |
| 6,717,943 B1 | 4/2004 | Schwering |
| 6,722,980 B2 | 4/2004 | Stronach |
| 6,738,738 B2 | 5/2004 | Henton |
| 6,741,980 B1 | 5/2004 | Langseth et al. |
| 6,751,606 B1 | 6/2004 | Fries et al. |
| 6,754,639 B2 | 6/2004 | Ginsberg |
| 6,836,537 B1 | 12/2004 | Zirngibl et al. |
| 6,850,907 B2 | 2/2005 | Lutnick et al. |
| 6,856,973 B1 | 2/2005 | Bott |
| 6,904,412 B1 | 6/2005 | Broadbent et al. |
| 6,912,510 B1 | 6/2005 | Shepherd |
| 6,963,853 B1 | 11/2005 | Smith |
| 7,006,991 B2 | 2/2006 | Keiser et al. |
| D519,570 S | 4/2006 | Amaitis et al. |

| | | |
|---|---|---|
| 7,069,232 B1 | 6/2006 | Fox et al. |
| 7,144,011 B2 | 12/2006 | Asher et al. |
| 7,233,922 B2 | 6/2007 | Asher et al. |
| 2001/0014875 A1 | 8/2001 | Young et al. |
| 2001/0021911 A1 | 9/2001 | Ohmoto et al. |
| 2001/0037282 A1 | 11/2001 | Yoneda |
| 2001/0037287 A1 | 11/2001 | Broadbent et al. |
| 2001/0044767 A1 | 11/2001 | Madoff et al. |
| 2001/0047326 A1 | 11/2001 | Broadbent et al. |
| 2001/0056396 A1 | 12/2001 | Goino |
| 2002/0032644 A1* | 3/2002 | Corby et al. .............. 705/37 |
| 2002/0032646 A1 | 3/2002 | Sweeney et al. |
| 2002/0040339 A1 | 4/2002 | Dhar et al. |
| 2002/0046137 A1 | 4/2002 | Odom et al. |
| 2002/0046144 A1 | 4/2002 | Graff |
| 2002/0069155 A1 | 6/2002 | Nafeh et al. |
| 2002/0073021 A1 | 6/2002 | Ginsberg et al. |
| 2002/0120558 A1 | 8/2002 | Reid |
| 2002/0130899 A1 | 9/2002 | Ryan et al. |
| 2002/0138390 A1 | 9/2002 | May |
| 2002/0138413 A1 | 9/2002 | Creamer et al. |
| 2002/0138417 A1 | 9/2002 | Lawrence |
| 2002/0147670 A1 | 10/2002 | Lange |
| 2002/0161681 A1 | 10/2002 | Richman et al. |
| 2003/0009419 A1 | 1/2003 | Chavez et al. |
| 2003/0023534 A1 | 1/2003 | Kadambe |
| 2003/0023546 A1 | 1/2003 | Shepherd |
| 2003/0078869 A1 | 4/2003 | Williams |
| 2003/0087701 A1 | 5/2003 | Paravia et al. |
| 2003/0088532 A1 | 5/2003 | Hampshire, II |
| 2003/0120426 A1 | 6/2003 | Baron et al. |
| 2003/0126059 A1 | 7/2003 | Hensley et al. |
| 2003/0126073 A1 | 7/2003 | Lawrence |
| 2003/0135441 A1 | 7/2003 | Ginsberg |
| 2003/0149657 A1 | 8/2003 | Reynolds et al. |
| 2003/0177083 A1 | 9/2003 | Mont et al. |
| 2003/0177087 A1 | 9/2003 | Lawrence |
| 2003/0191707 A1 | 10/2003 | Shepherd |
| 2003/0195841 A1 | 10/2003 | Ginsberg et al. |
| 2003/0208429 A1 | 11/2003 | Bennett |
| 2003/0225687 A1 | 12/2003 | Lawrence |
| 2003/0236738 A1 | 12/2003 | Lange et al. |
| 2003/0236742 A1 | 12/2003 | Lawrence |
| 2004/0006528 A1 | 1/2004 | Fung |
| 2004/0006532 A1 | 1/2004 | Lawrence et al. |
| 2004/0006533 A1 | 1/2004 | Lawrence |
| 2004/0019557 A1 | 1/2004 | Yaruss et al. |
| 2004/0024693 A1 | 2/2004 | Lawrence |
| 2004/0024694 A1 | 2/2004 | Lawrence et al. |
| 2004/0044617 A1 | 3/2004 | Lu |
| 2004/0048656 A1 | 3/2004 | Krynicky |
| 2004/0059627 A1 | 3/2004 | Baseman et al. |
| 2004/0064402 A1 | 4/2004 | Dreyer et al. |
| 2004/0073505 A1 | 4/2004 | Wright |
| 2004/0078321 A1 | 4/2004 | Lawrence |
| 2004/0083158 A1 | 4/2004 | Addison et al. |
| 2004/0083165 A1 | 4/2004 | Lawrence |
| 2004/0103003 A1* | 5/2004 | Mayers et al. .............. 705/4 |
| 2004/0103058 A1 | 5/2004 | Hamilton |
| 2004/0109031 A1 | 6/2004 | Deaton et al. |
| 2004/0111358 A1 | 6/2004 | Lange et al. |
| 2004/0133502 A1 | 7/2004 | Sadre |
| 2004/0133508 A1 | 7/2004 | Lawrence |
| 2004/0148243 A1 | 7/2004 | Rosenblatt |
| 2004/0167850 A1 | 8/2004 | Dreyer et al. |
| 2004/0204232 A1 | 10/2004 | Asher et al. |
| 2004/0210507 A1* | 10/2004 | Asher et al. .............. 705/37 |
| 2004/0215551 A1 | 10/2004 | Eder |
| 2004/0230521 A1 | 11/2004 | Broadbent et al. |
| 2004/0235542 A1 | 11/2004 | Stronach et al. |
| 2004/0236659 A1 | 11/2004 | Cazalet et al. |
| 2004/0236676 A1 | 11/2004 | Takezawa et al. |
| 2004/0267660 A1 | 12/2004 | Greenwood et al. |
| 2005/0004862 A1 | 1/2005 | Kirkland et al. |
| 2005/0027643 A1 | 2/2005 | Amaitis et al. |
| 2005/0027645 A1 | 2/2005 | Lui et al. |
| 2005/0027649 A1 | 2/2005 | Cech |
| 2005/0043078 A1 | 2/2005 | Sundstrom |
| 2005/0044029 A1 | 2/2005 | Griffin et al. |
| 2005/0044037 A1 | 2/2005 | Lawrence et al. |
| 2005/0049956 A1 | 3/2005 | Ballman |
| 2005/0049962 A1 | 3/2005 | Porter et al. |
| 2005/0055306 A1 | 3/2005 | Miller et al. |
| 2005/0055308 A1 | 3/2005 | Meyer et al. |
| 2005/0071266 A1 | 3/2005 | Eder |
| 2005/0075963 A1 | 4/2005 | Balabon |
| 2005/0080702 A1 | 4/2005 | Modi |
| 2005/0086143 A1 | 4/2005 | Vlazny et al. |
| 2005/0096124 A1 | 5/2005 | Stronach |
| 2005/0108148 A1 | 5/2005 | Carlson |
| 2005/0131789 A1 | 6/2005 | Mintz |
| 2005/0139661 A1 | 6/2005 | Eglen et al. |
| 2005/0144114 A1 | 6/2005 | Ruggieri et al. |
| 2005/0149458 A1 | 7/2005 | Eglen et al. |
| 2005/0160032 A1 | 7/2005 | Lutnick et al. |
| 2005/0171878 A1 | 8/2005 | Pennock |
| 2005/0176495 A1 | 8/2005 | Stronach |
| 2005/0176499 A1 | 8/2005 | Stronach |
| 2005/0181868 A1 | 8/2005 | Vlazny et al. |
| 2005/0182704 A1 | 8/2005 | Winbom |
| 2005/0187020 A1 | 8/2005 | Amaitis et al. |
| 2005/0187850 A1 | 8/2005 | Horowitz et al. |
| 2005/0197190 A1 | 9/2005 | Amaitis et al. |
| 2005/0202873 A1 | 9/2005 | Asher et al. |
| 2005/0245305 A1 | 11/2005 | Asher et al. |
| 2005/0245306 A1 | 11/2005 | Asher et al. |
| 2005/0245308 A1 | 11/2005 | Amaitis et al. |
| 2005/0245310 A1 | 11/2005 | Amaitis et al. |
| 2005/0267836 A1 | 12/2005 | Crosthwaite et al. |
| 2005/0288081 A1 | 12/2005 | Amaitis et al. |
| 2006/0085286 A1 | 4/2006 | Lutnick et al. |
| 2006/0085310 A1 | 4/2006 | Mylet et al. |
| 2006/0100951 A1 | 5/2006 | Mylet et al. |
| 2006/0105839 A1 | 5/2006 | Graeve et al. |
| 2006/0105840 A1 | 5/2006 | Graeve |
| 2006/0111951 A1 | 5/2006 | Jain |
| 2006/0116917 A1 | 6/2006 | Jain |
| 2006/0173774 A1 | 8/2006 | Frankel |
| 2006/0199631 A1 | 9/2006 | McGill et al. |
| 2006/0240891 A1 | 10/2006 | Klinkhammer et al. |
| 2006/0264253 A1 | 11/2006 | Trobia |
| 2006/0265313 A1 | 11/2006 | Fung et al. |
| 2006/0271475 A1 | 11/2006 | Brumfield et al. |
| 2007/0005481 A1 | 1/2007 | Kedia et al. |
| 2007/0011619 A1 | 1/2007 | Chang et al. |
| 2007/0016861 A1 | 1/2007 | Salomaa et al. |
| 2007/0021165 A1 | 1/2007 | Ma et al. |
| 2007/0083458 A1 | 4/2007 | Rosenthal et al. |
| 2007/0185653 A1 | 8/2007 | Bresch et al. |

FOREIGN PATENT DOCUMENTS

| | | |
|---|---|---|
| EP | 0789884 | 4/1996 |
| EP | 0 770 967 A2 | 2/1997 |
| EP | 1 345 145 A2 | 9/2003 |
| KR | 102008004912 | 6/2008 |
| NL | 1002790 | 4/1996 |
| WO | WO 94/18640 | 8/1994 |
| WO | WO 95/19614 | 7/1995 |
| WO | WO 95/22883 | 8/1995 |
| WO | WO 95/26005 | 9/1995 |
| WO | WO 96/12242 | 4/1996 |
| WO | WO 96/21192 | 7/1996 |
| WO | WO 97/22073 | 6/1997 |
| WO | WO 98/13776 | 4/1998 |
| WO | WO 99/09500 | 2/1999 |

| | | |
|---|---|---|
| WO | WO 99/10815 | 3/1999 |
| WO | WO 99/19821 | 4/1999 |
| WO | WO 99/23592 | 5/1999 |
| WO | WO 99/24928 | 5/1999 |
| WO | WO 99/30261 | 6/1999 |
| WO | WO 99/31613 | 6/1999 |
| WO | WO 99/46720 | 9/1999 |
| WO | WO 99/56232 | 11/1999 |
| WO | WO 00/11570 | 3/2000 |
| WO | WO 00/17795 | 3/2000 |
| WO | WO 00/21013 | 4/2000 |
| WO | WO 00/29923 | 5/2000 |
| WO | WO 00/29973 | 5/2000 |
| WO | WO 00/58858 | 10/2000 |
| WO | WO 01/25987 A1 | 4/2001 |
| WO | WO 01/67308 A1 | 9/2001 |
| WO | WO 2004/021120 A2 | 3/2004 |
| WO | WO 2004/068286 A2 | 8/2004 |
| WO | WO 2004/075028 A2 | 9/2004 |
| WO | WO 2004/090662 A2 | 10/2004 |
| WO | WO 2005/039712 A2 | 5/2005 |
| WO | WO 2005/057339 A2 | 6/2005 |
| WO | WO 2005/074557 A2 | 8/2005 |
| WO | WO 2005/109281 A2 | 11/2005 |
| WO | WO 2006/055035 A1 | 5/2006 |
| WO | WO 2006/099382 A2 | 9/2006 |
| WO | WO 2006/115534 A2 | 11/2006 |
| WO | WO 2006/130624 A2 | 12/2006 |
| WO | WO 2007/008597 A2 | 1/2007 |
| WO | WO 2007/008601 A2 | 1/2007 |
| WO | WO 2007/008713 A2 | 1/2007 |
| WO | WO 2007/015921 A2 | 2/2007 |
| WO | WO 2007/024605 A2 | 3/2007 |
| WO | WO 2007/033198 A2 | 3/2007 |

OTHER PUBLICATIONS

"Simulation of Hurricane Risk in the U.S. Using Empirical Track Model"; P.J. Vickery, P.F. Skerlj, and L.A. Twisdale, authors; Journal of Structural Engineering, Oct. 2000, pp. 1222-1237.

Notification; International Search Report for International application No. PCT/US05/46467; Written Opinion of the International Searching Authority for International application No. PCT/US05/46467 (8 pp.).

"Adaptive Control Using Multiple Models"; Kumpati S. Narendra, Jeyendran Balakrishnan, authors; IEEE Transactions on Automatic Control, vol. 42, No. 2, Feb. 1997; pp. 171-187.

"Controlled diffusion processes"; Vivek S. Borkar, author; Probability Surveys, vol. 2 (2005); pp. 213-244.

"Theory and Applications of Adaptive Control—A Survey"; K.J. Astrom, author; Automatica, vol. 19, No. 5, pp. 471-486, 1983.

UK Decision No. BL O/366/04 from The Patent Office, Dec. 14, 2004; Applicant: CFPH L.L.C.

"Dynamic Hedging Strategies"; Simon Benninga and Zvi Wiener; vol. 7 No. 1 (1998); 5 pp.

"Measuring Up: What CEOs Look for in Their Chief Financial Officers"; Mintz, S L, author; Feb. 1994; pp. 1-5.

"River Runs Dry: Big Hong Kong Property Deal Falls Through"; Jonathan Karp, author; Nov. 12, 1992; pp. 1-2.

"Japanese Investment Posts Strong Momentum"; Sun Hong, author; Feb. 1997; pp. 1-2.

"Lack of Debt Trades Stunts Market-HSBC" Business World, Manila; Sep. 1998; pp. 1-2.

"Real Bonds, Real Time, Real Fast"; Tatiana D. Helenius, author, Wall Street & Technology; Apr. 1998; pp. 1-4.

"On the Use of Martingales in Monte Carlo Approaches to Multiperiod Parameter Uncertainty in Capital Investment Risk Analysis"; W. J. Hurley, author; Jan. 1998; pp. 1-6.

"Financial Risk Analysis Using Financial Risk Simulation Prog"; Sabah U. Randhawa, James A. Douglas, authors; Sep. 1993; pp. 1-4.

"Constrained Moments Simulation of Healthcare Capital Acquisitions"; D. F. Kocaoglu et al., authors; Jan. 1997; pp. 1.

"A Statistical Model for Characterizing Price Variability with Application to Dairy Investment Analysis"; Terry Ross Smith, author; Jan. 1980; pp. 1-2.

"Transparency and Liquidity: A comparison of Auction and Dealer Markets with Informed Trading"; Marco Pagano and Ailsa Röell, authors; 1996; pp. 579-611.

"Trading Mechanisms in Securities Markets"; Ananth Madhavan, author; Journal of Finance; Jun. 1992; pp. 607-641.

"Call and Continuous Trading Mechanisms Under Asymmetric Information: An Experimental Investigation"; Charles R. Schnitzlein, author; Journal of Finance; Jun. 1996; pp. 613-636.

"Electronic Call Market Trading"; Nicholas Economides and Robert A. Schwartz, authors; Journal of Portfolio Management; Spring 1995; pp. 10-18.

"Parimutuel Betting Markets as Information Aggregation Devices: Experimental Results"; C. R. Plott, J. Wit, W.C. Yang, authors; Caltech Social Science Working Paper 986; Apr. 1997.

"A Parimutuel System with Two Horses and a Continuum of Bettors"; Watanabe Takahiro, author; Journal of Mathematical Economics 28; Apr. 1994; pp. 85-100.

"Trade Using One Commodity as a Means of Payment"; Lloyd Shapley and Martin Shubik, authors; Journal of Political Economy 85; 1997; pp. 937-968.

"Implied Risk-Neutral Probability Density Functions from Option Prices: Theory and Application"; Bhupinder Bahra, author; Bank of England; 1997; ISSN 1368-5562.

"Macro Markets and Financial Security"; Stefano Athanasoulis, Robert Shiller and Eric van Wincoop, authors; FRBNY Economic Policy Review; Apr. 1999; pp. 21-39.

"A Model of a General Parimutuel System: Characterizations and Equilibrium Selection"; Takahiro Watanabe, author; International Journal of Game Theory 23; 1994; pp. 237-260.

"Integrating Call and Continuous Markets"; Robert A. Schwartz, author; Securities Traders Monthly; Sep. 1991; pp. 14-16.

"Structural Organization of Secondary Markets: Clearing Frequency, Dealer Activity and Liquidity Risk"; Kenneth D. Garbade and William L. Silber, authors; Journal of Finance 34; Jun. 1979; pp. 577-593.

Notification; International Search Report for International application no. PCT/US05/46467; Written Opinion of the International Searching Authority for International application no. PCT/US05/46467 (8 pp.) 2005.

* cited by examiner

Fig. 16b

Stormfund

STORMFUND
THE HURRICANE PROJECT

Home    Join the Fund    Login    Hurricane Learning Library    About the Fund    Help

LOGIN        REGISTER

September 25, 2004

Search for Shares ← Return to Homepage

STEP 3
Purchase Your StormFund Shares!
Enter The Numer of shares you would like to purchase below. After confirmation, the StormFund Shares will be added to your Portfolio.

Quick Facts About Palm Beach County

☑ Annual Chance of a Hurricane Strike: 8.89%

☑ Current Strike Possibilty: 10.85%

FUND D
Total Invested inFund D
$1,791,815,645

Purchase your shares for Palm Beach County, FL In Fund D.

Current cost per shares for Palm Beach: $ 470.09

Participants have bought a total of 253.890 shares in this county. The total value in the fund is currently $18,319,945.

PALM BEACH COUNTY, FL  $470.09
CURRENT VALUE PER SHARE 400.00
300.00
200.00
100.00
0.00
Jan      Jun      Nov

CALCULATE PAYOFFS
IF THIS IS THE ONLY COUNTY HIT, your payout would be $7,057 per share A hurricane will usually strike more than one county. It is a good ideal to place bets on multiple counties to compound your gains and spread your risk around the map. Use the Payout Calculator to explore different combinations of share purchases.

Stormfund

» Launch the Payout Calculator

Purchase Now!

Current value for Palm Beach County (cost per share)
$ 470.09

Number of Shares: 
...or purchase by dollar amount:

Dollar Amount: $ 

FUND E
Total Invested in Fund E
$0

Purchase your shares for Palm Beach County, FL in Fund E.

Current cost per shares for Palm Beach: $ 162.20

Participants have bought a total of 0 shares in this county. The total value in the fund is currently $0.

CALCULATE PAYOFFS

IF THIS IS THE ONLY COUNTY HIT, your payout would be $0 per share

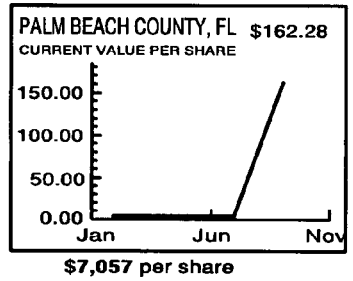

$7,057 per share

A hurricane will usually strike more than one county. It is a good ideal to place bets on multiple counties to compound your gains and spread your risk around the map. Use the Payout Calculator to explore different combinations of share purchases.

» Launch the Payout Calculator

Purchase Now!

Current value for Palm Beach County (cost per share)
$ 162.20

Number of Shares: 
...or purchase by dollar amount:

Dollar Amount: $ 

Table 1. Example illustrative share prices, in round numbers, for a range of strike probabilities $p_i$, assuming purchase on 1 June, with $F = \$100$/share.

| $p_i$ | Typical Example | Risk Assessment Stage | Round-number price |
|---|---|---|---|
| $10^{-7}$ | West Texas | I | $ 0.0002 |
| $10^{-4}$ | Northern Louisiana | I | $ 0.2 |
| 0.003 | Austin, TX | I | $ 5 |
| 0.01 | Central Louisiana | I | $ 20 |
| 0.02 | Florida Panhandle | I | $ 40 |
| 0.05 | South Florida | I | $ 100 |
| 0.1 | Weak possibility, existing storm | II | $ 200 |
| 0.2 | Moderate possibility, existing storm | II | $ 400 |
| 0.5 | Likely strike, within 5 days | III | $ 1300 |
| 0.8 | Very likely strike, within 5 days | III | $ 3000 |
| 0.9 | Imminent strike, within 5 days | III | $ 4300 |

Fig. 21

Table 2. Poisson probabilities for $\mu = 1.7$ hurricane landfalls per year, corresponding cumulative probabilities, and ratios of probabilities used in Equation (6).

| X | 0 | 1 | 2 | 3 | 4 | 5 |
|---|---|---|---|---|---|---|
| Pr{X=x} | .1827 | .3106 | .2640 | .1496 | .0636 | .0216 |
| Pr{X≤x} | .1827 | .4933 | .7573 | .9069 | .9705 | .9921 |
| Pr{X≥x}/(1−Pr{X=0}) | — | 1.0000 | .6200 | .2970 | .1139 | .0361 |

Fig. 22

Table 3. Tradeoffs involved in the choice of the number of lotteries to be run.

| Number of lotteries | % of years when 1 or more lotteries don't pay | % of years when more hurricanes occur than lotteries |
|---|---|---|
| 1 | 18% | 51% |
| 2 | 49% | 24% |
| 3 | 76% | 9% |
| 4 | 91% | 3% |
| 5 | 97% | 1% |

Coastal Area: Colleton, SC

Options or Shares: 2

| Landfall Instantaneous Return Calculation | Landfall Conditional Floor | Secondary Market Value of Investment | Secondary Market Per Option or Share | | # of Shares Avail. |
|---|---|---|---|---|---|
| | | | Bid Price | Asking Price | |
| $88,818 | $20,276 | $35,212 | $38.25 | $38.56 | 526 |

Total

| Landfall Instantaneous Return Calculation | Landfall Conditional Floor | Secondary Market Value of Investment | Secondary Market Per Option or Share | | # of Shares Avail. |
|---|---|---|---|---|---|
| | | | Bid Price | Asking Price | |
| $444,090 | $101,380 | $176,060 | $39.75 | $36.23 | 610 |

770

763

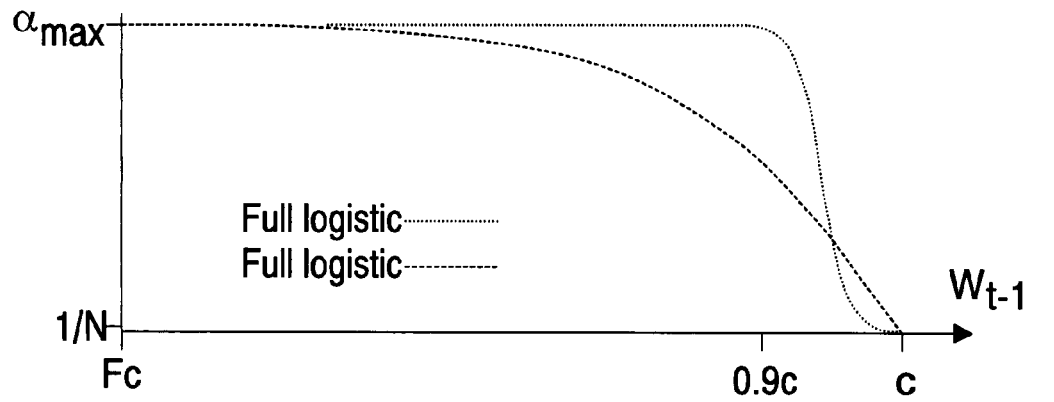

Two candidate pricing curves for specifying the parameter $\alpha$, in the range $Fc \leq W \leq c$.

*Fig. 43*

| TIME | DAILY INPUT | PERIOD TOTAL |
|---|---|---|
| INITIAL SEED | | $ 2 |
| 1-15 JANUARY | $ 16 | $240 |
| 16-31 JANUARY | $ 10 | $160 |
| 1-14 FEBRUARY | $ 6 | $ 84 |
| 15-29 FEBRUARY | $ 2 | $ 30 |
| MARCH | $ 1 | $ 31 |
| APRIL | $ 1 | $ 30 |
| 1-15 MAY | $ 2 | $ 30 |
| 16-31 MAY | $ 3 | $ 48 |
| 1-15 JUNE | $ 10 | $ 150 |
| 16-30 JUNE | $ 2 | $ 30 |
| 1-15 JULY | $ 2 | $ 30 |
| 16-30 JULY | $ 2 | $ 30 |
| 31 JULY | $ 50 | $ 50 |
| 1 AUGUST | $100 | $ 100 |
| 2 AUGUST | $200 | $ 200 |
| 3 AUGUST | $ 70 | $ 70 |
| 4 AUGUST | $ 20 | $ 20 |
| 5 AUGUST | $ 10 | $ 10 |
| 6 AUGUST | $ 5 | $ 5 |
| 7 AUGUST | $ 10 | $ 10 |
| 8 AUGUST | $ 10 | $ 10 |
| 9 AUGUST | $ 60 | $ 60 |
| 10 AUGUST | $120 | $ 120 |
| 11 AUGUST | $200 | $ 200 |
| 12 AUGUST | $250 | $ 250 |

*Fig. 46*

Table 5. Time sequence of hypothetical dollar allocations to the parimutuel pool, in millions.

| Time | Daily Input | Period Total |
|---|---|---|
| Initial seed | | $ 2 |
| 1–15 January | $ 16 | $240 |
| 16–31 January | $ 10 | $160 |
| 1–14 February | $ 6 | $ 84 |
| 15–29 February | $ 2 | $ 30 |
| March | $ 1 | $ 31 |
| April | $ 1 | $ 30 |
| 1–15 May | $ 2 | $ 30 |
| 16–31 May | $ 3 | $ 48 |
| 1–15 June | $ 10 | $150 |
| 16–30 June | $ 2 | $ 30 |
| 1–15 July | $ 2 | $ 30 |
| 16–30 July | $ 2 | $ 30 |
| 31 July | $ 50 | $ 50 |
| 1 August | $100 | $100 |
| 2 August | $200 | $200 |
| 3 August | $ 70 | $ 70 |
| 4 August | $ 20 | $ 20 |
| 5 August | $ 10 | $ 10 |
| 6 August | $ 5 | $ 5 |
| 7 August | $ 10 | $ 10 |
| 8 August | $ 10 | $ 10 |
| 9 August | $ 60 | $ 60 |
| 10 August | $120 | $120 |
| 11 August | $200 | $200 |
| 12 August | $250 | $250 |

*Fig. 47*

Table 6. Means and standard deviations for simulated Lee County payouts, as fractions of $c$, or par. For $c$ = $100, volatility (standard deviation of end-of-day prices during 11 January through 30 July) is also shown, again as a fraction of par.

| H | c=$100,000 $\tau \approx 10^6$ $\bar{x}$ | s | c=$10,000 $\tau \approx 10^7$ $\bar{x}$ | s | c=$1000 $\tau \approx 10^8$ $\bar{x}$ | s | c = $100 $\tau \approx 10^9$ $\bar{x}$ | s | volatility |
|---|---|---|---|---|---|---|---|---|---|
| 1 | 0.546 | .037 | 0.544 | .039 | 0.547 | .042 | 0.533 | .041 | .0003 |
| 5 | 0.747* | .042 | 0.747* | .040 | 0.760* | .046 | 0.835* | .050 | .0008 |
| 10 | 0.858* | .031 | 0.858* | .036 | 0.868* | .037 | 0.956* | .035 | .0012 |
| 20 | 0.946* | .028 | 0.948* | .033 | 0.965* | .021 | 1.018* | .028 | .0021 |
| 25 | 0.976* | .028 | 0.984* | .026 | 0.988* | .028 | 1.028* | .029 | .0025 |
| 30 | 0.987+ | .026 | 0.999* | .026 | 1.006* | .026 | 1.034* | .025 | .0031 |
| 35 | 1.002* | .025 | 1.016* | .029 | 1.020* | .027 | 1.033* | .025 | .0034 |
| 40 | 1.014+ | .029 | 1.021* | .029 | 1.024* | .030 | 1.040* | .028 | .0039 |
| 45 | 1.022+ | .026 | 1.027* | .029 | 1.036 | .028 | 1.036 | .026 | .0044 |
| 50 | 1.031* | .024 | 1.035* | .027 | 1.042 | .082 | 1.031 | .098 | .0053 |
| 100 | 1.060* | .030 | 0.999 | .283 | 1.059 | .299 | 1.023 | .312 | .0113 |

\* = No breaches of the 50% floor in any of the 100 simulated years.
+ = Breaches of the 50% floor in one instance only, very early in the season.

*Fig. 48*

FINANCIAL ACTIVITY BASED ON NATURAL PERIL EVENTS

CROSS-REFERENCE TO RELATED APPLICATION

This is a continuation-in-part of U.S. non-provisional patent application Ser. No. 11/312,662, filed Dec. 20, 2005 now U.S. Pat. No. 7,693,766 which claims the benefit of U.S. Provisional Patent Application No. 60/637,784, filed Dec. 21, 2004 and a continuation-in-part of U.S. non-provisional patent application Ser. No. 11/901,050, filed Sep. 14, 2007 now U.S. Pat. No. 7,584,134 which is a continuation-in-part of U.S. non-provisional patent application Ser. No. 11/312,783, filed Dec. 20, 2005 now U.S. Pat. No. 7,584,133 which claims the benefit of U.S. Provisional Patent Application No. 60/637,784, filed Dec. 21, 2004 which are incorporated by reference herein in their entirety.

BACKGROUND OF THE INVENTION

1. Field of the Invention

The present invention pertains to financial activities and in particular to such activities in which a financial return may be paid out based on a participant's prediction of weather-related or other naturally occurring events, and especially such events monitored and documented by an independent external information source.

2. Description of the Related Art

Oftentimes, natural peril events contain sufficient energy to impose potentially significant financial burdens arising from damage to property. It is the nature of such catastrophes that they cannot be predicted with exact certainty, even in severity or number of occurrences within an event season or the exact time and/or duration of an event. These types of natural peril events include, for example, earthquakes, tornadoes and tropical weather events such as cyclones, (a term given to all circulating weather systems over tropical waters—and of special interest here, the Atlantic basin and eastern Pacific). Tropical cyclones include tropical weather events referred to as "hurricanes" if they are sufficiently strong. Tropical cyclones which grow in intensity so as to become hurricanes originate at sea and may make landfall and travel along a land portion before dissipating or returning to the sea. Homeowners and business insurance policies typically contain deductible provisions ranging from 2% to 15% of the value of a home or worksite.

Further, these same policies do not provide any coverage for the outside areas of a home or business such as landscaping, outside lighting, docks, fencing and the like. Often, property owners do not have sufficient flood insurance or have other omissions or insufficient coverage which result in catastrophic financial losses in even the lowest rated hurricanes. Great losses suffered by property owners, such as those located along coastal and outlying areas, can be overwhelming for those who cannot afford to be self-insured. Insurance companies offer substantial aid for these individuals, but economic strains caused by unusually active hurricane seasons have resulted in relatively high premiums. In order to make certain that insurance protection is available to individuals on an ongoing basis, various legislation and regulations have been enacted. However, substantial economic burdens remain, such as high deductible amounts and excluded items, which represent damage costs which must be borne directly by the individual. Further, there are considerable delays in obtaining insurance relief, due to a number of factors outside of the owner's control, such as delays associated with adjuster scheduling, claim processing and governmental determinations. These delays are considerably extended when widescale damage occurs.

As if the present problems are not enough, it has been predicted that the increased storm activity of the past few years is likely to continue in the Atlantic basin for the next 15 to 20 years. One prediction for 2006 is that 17 named storms will occur, nine of which can become hurricanes and five of which are expected to develop into major storms, with winds of 111 mph or more. By comparison, in the year 2005, 26 named storms were reported. Of the 13 major storms that formed the past two years, seven struck the U.S., whereas, according to the historical average, only one of every three reported storms would be considered "major" storms.

In addition to increased whether severity, other factors have been cited as causes for unexpectedly large damage estimates. For example, it has been estimated that, by year 2020, a single Miami storm could cause catastrophic losses of 500 Billion—several times the damage inflicted by Hurricane Katrina. This is attributed to the rise in additional property development demanded by a growing population, along with a rise in purchasing power with greater individual wealth. These estimates have not included any consideration of inflation.

Other lessons are being learned from hurricane Katrina. For example, the Great Miami hurricane of 1926 caused about $760 million in damage, in 2004 dollars. Surprisingly, if the hurricane were to be repeated at the present time (the same magnitude and following the same track) damage is estimated to be as large as $130 billion, due in large part to population expansion in the area. In the year 2020, damage estimates from the same hurricane are estimated to be as great as $500 billion. In addition to primary damage factors such as loss of property, other factors directly result from a natural event. For example, the Federal Emergency Management Agency (FEMA) has encountered significant difficulty in providing temporary housing for disaster victims. Loss of dwellings is aggravated by extensive loss of jobs, further slowing economic and personal recovery. For example, FEMA's hotel program for 2005 cost the federal government $325 million and, at its peak, covered approximately 85,000 rooms.

Other natural activities are also forecasted to exhibit alarming trends. For example, a tsunami occurring in the next few years is anticipated to result in a 60 Billion dollar disaster, imperilling 1 million residents, affecting 600,000 jobs locally and 2.5 million jobs nationwide. The California State Seismic Safety Commission and others have urged that local evacuation plans be upgraded to account for possible catastrophic losses. For example, in one instance, losses are estimated to include the closure of the ports of Los Angeles and Long Beach. A two-month shutdown of the ports would cost $60 billion and affect 600,000 jobs in the state and 2.5 million jobs nationwide.

SUMMARY OF THE INVENTION

The invention is generally directed to conducting financial activities between a provider and a plurality of participants, based on a natural peril event such as a tropical cyclone, a tornado, an earthquake or a peril to one's peaceable enjoyment of a skiing vacation or a week at what is hoped to be a sunny beach. The participants are given an opportunity to predict the future occurrence of the natural peril event, and to invest funds with the expectation of a return on their investment if their prediction should match the outcome of the natural peril event.

In one implementation, the invention encompasses system for conducting a financial activity based on a natural peril event, including a financial activity module for facilitating financial activity between a provider and at least two participants, for receiving natural peril event information from an external independent information source of such information and for providing financial activity information to the participants, including information relating to the natural peril event information and a plurality of geographic regions for which the financial activity is to occur and in which a future natural peril event may occur. Also included is at least one communication module for communication between the financial activity module and an external independent information source for receiving the natural peril event information, and the financial activity module also provides index information including an index having an index value varying in response to one or more natural peril events. The financial activity module presents to the participants at least one derivative product to be traded between the participants, for a plurality of geographic regions, the derivative product having a value that varies in response to the index and which is settled based on at least one of the external natural peril event information and the index information.

If desired, a null region may be made available for trading, designating no tropical weather event in any of the plurality of geographic regions.

In another implementation, the invention encompasses a method for conducting a financial activity between a provider and at least two participants, based on a natural peril event, including the steps of the provider receiving natural peril event information from an external independent information source of such information, and the provider receiving index information from an external independent information source of such information, the index information including an index having an index value varying in response to one or more natural peril events. Preferably, the provider provides financial activity information to the participants, including information relating to the natural peril event information, and a plurality of geographic regions for which the financial activity is to occur and in which a future natural peril event may occur. The provider also presents to the participants at least one derivative product traded between the participants, the derivative product having a value that varies in response to the index and which is settled based on at least one of the natural peril event information and the index information.

In a further implementation, the invention encompasses a method for conducting a financial activity between a provider and at least two participants, based on a natural peril event, including the steps of the provider defining a plurality of geographic regions for which the financial activity is to occur and in which a future natural peril event may occur, and receiving natural peril event information from an external independent information source of such information. The provider provides for each region, an index having an index value varying in response to one or more natural peril events, and also engages in providing financial activity information to the participants, including information relating to the natural peril event information, the index, and the geographic regions. The provider presents to the participants at least one derivative product traded between the participants for each of the regions, the derivative product having a value that varies in response to the index and which is settled based on at least one of the external natural peril event information and the index information.

In another implementation, the invention encompasses a system for conducting a financial activity based on a natural peril event, including a financial activity module for facilitating financial activity between a provider and at least two participants, for receiving natural peril event information from an external independent information source of such information and for providing financial activity information to the participants, including information relating to the natural peril event information and a plurality of geographic regions for which the financial activity is to occur and in which a future natural peril event may occur. At least one communication module is provided for communication between the financial activity module and an external independent information source for receiving the natural peril event information and for receiving index information including an index having an index value varying in response to one or more natural peril events. The financial activity module includes presenting to the participants at least one derivative product to be traded between the participants, for a plurality of geographic regions, the derivative product having a value that varies in response to the index and which is settled based on at least one of the natural peril event information and the index information.

In another implementation, the invention encompasses a system for conducting a financial activity based on a natural peril event, including: a financial activity module for facilitating financial activity between a provider and at least two participants, for defining a plurality of geographic regions for which the financial activity is to occur and in which a future natural peril event may occur, for receiving natural peril event information from an external independent information source of such information and for providing financial activity information to the participants, including information relating to the natural peril event information and the geographic regions. At least one communication module is provided for communication between the financial activity module and an external independent information source for receiving the natural peril event information from at least one external independent information source. The financial activity module provides index information including an index having an index value varying in response to one or more natural peril events, and presents to the participants at least one derivative product to be traded between the participants, for a plurality of geographic regions, the derivative product having a value that varies in response to the index and which is settled based on at least one of the natural peril event information and the index information, and for providing an indication of a matching outcome to the participants.

In one aspect, the present invention can be employed as a viable solution to the economic and financial devastation which affects citizens as well as governments caused by naturally occurring catastrophes such as hurricanes. The present invention can be employed to offer an economic solution which does not use government or public funds and therefore does not require tax payer funding to replenish government pools. In one aspect, the present invention can be employed to use only funds provided by private entities to augment governmental financial assistance for catastrophic occurrences.

BRIEF DESCRIPTION OF THE DRAWINGS

Features of exemplary implementations of the invention will become apparent from the description, the claims, and the accompanying drawings in which:

FIG. 21 is a table showing examples of illustrative financial investment unit prices;

FIG. 22 is a table showing Poisson probabilities and other probabilities;

FIG. 23 is a table illustrating trade-offs involved in choosing the number of financial activities to be run.

FIG. 41 shows a display table of FIG. 40;

FIG. 42 shows a series of display tables;

FIG. 43 shows candidate pricing curve functions for an exemplary study;

FIG. 46 shows a table of data for a pari-mutuel pool; and

FIGS. 47 and 48 show a table of data for a pari-mutuel market.

DETAILED DESCRIPTION OF THE PREFERRED EMBODIMENTS

Figure 1:
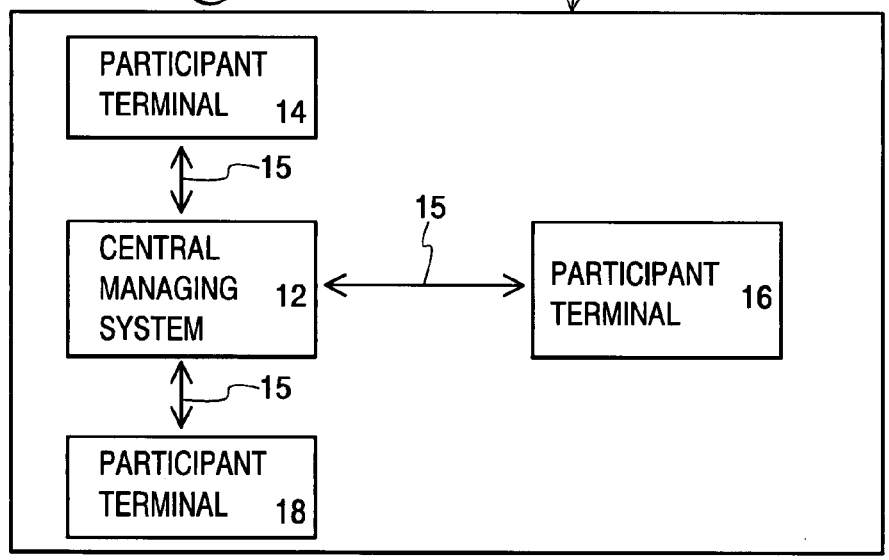
FIG. 1 is a schematic representation of a financial activity network according to an embodiment of the present invention.

The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

For ease of description, financial activity networks and other systems, articles of manufacture, and apparatus embodying the present invention are described herein below in their usual assembled position as shown in the accompanying drawings and terms such as upper, lower, horizontal, longitudinal, etc., may be used herein with reference to this usual position. However, the systems, articles of manufacture and apparatus may be manufactured, transported, sold, or used in orientations other than that described and shown herein.

Introduction

On-line events have been proposed for a variety of financial activities. These activities may be divided in a number of different ways such as gambling and non-gambling activities, for example. Gaming or gambling systems are in place which emulates traditional gambling activities in an on-line, internet software-based program, giving the users the look and feel of traditional gambling activities. Such gambling variants have been extended to nontraditional games of chance based on virtually any experience known to mankind. Although gaming activities can receive substantial benefit from implementations of the present invention, the present invention can also be employed with games of skill and non-gaming financial transactions.

Financial activities may also take the form of sweepstakes offerings in which participants are eligible to participate in a drawing or other selection of winners who share in or are otherwise are entitled to a pool of money set aside for the purpose. In another example of financial activities contemplated by the present invention, cell phone subscribers can text message their vote, indication of approval or choice of alternatives and be entered into a sweepstakes for their participation.

In one instance, the present invention is concerned with financial activity based upon games of skill in which participants process historic and other data and apply scientific principles and acquired analytical skills to arrive at informed decisions relating to the predictions of future naturally occurring activities. In one instance, a participant makes an investment based upon one or more informed decisions, thereby contributing to a common pool from which payouts are made, for example, based upon the accuracy, level of detail and timing of their prediction.

The present invention, in one instance, is also concerned with traditional financial activities which lie outside the area of gambling. More specifically, in one example, the present invention is concerned with allocating and managing a pool of money collected from participants, i.e. market participants who seek to offset an unpredictable but nonetheless potentially catastrophic financial burden caused by property loss due to natural peril events. In one instance, these types of financial activities are based upon the participant's property interests. Although such financial investments do at times come with a substantial element of risk in the expectation and amount of return, it has long been recognized that such financial investments do not represent gambling activities. The present invention is also concerned with other forms of natural peril, such as a peril to one's expectations of a peaceable enjoyment of a skiing vacation or a week at what is hoped to be a sunny beach.

The present invention finds immediate application in the field of offsetting losses of those who live or find themselves in a particular geographic area subjected to natural peril events which cause significant damage to their property interests (e.g. homes, businesses, rentals, and vacation shares). In one instance, the present invention is concerned with offsetting losses without governmental interaction. Examples of such natural peril events supported by the present invention include naturally occurring phenomena without human causality, such as tropical weather systems such as hurricanes as well as other tropical weather events.

The present invention is directed not only to catastrophic or disaster type weather or other natural events but also to "regular," non-catastrophic or non-disaster weather or other natural events such as rain, snow, heat and cold usually regarded as severe or unwelcome, but not catastrophic. For example, the present invention is directed to natural events of virtually any type which are known to place financial or other burdens on people who suffer as a result of the event. in one aspect, the financial activity contemplated herein need not be based on severity of the natural event. Examples include business and/or personal loss (vacations, etc.) that could be hedged against the risk of natural weather events such as (but not limited to) extreme days of rain, snow, heat, and cold. Excess cold and/or rain can disrupt the tourism and vacation industry. Unexpected snowfall can also disrupt travel and/or outdoor events and lack of snowfall and high temperatures could disrupt the ski industry. Too many days of any weather extreme could affect businesses. This model provides way of hedging against any of these events should a minimum threshold be exceeded (example, more than 5 rain days during a specified number of period in a specific geographic area during a certain time of the year) or could even compensate individuals and/or businesses on an escalating scale (binary) based upon the number of rain days exceeded in a given period for a given geographic area and time of the year. Based upon the minimum conditional payout guarantees, one could lock in a minimum payment based upon a threshold being met.

The premise of the financial activity is that market participants can exercise personal initiative to research known naturally occurring activity and make certain predictions relating to forthcoming activity for a particular season or year. A return on their investment can be paid out at year's end or once a natural peril event has concluded, with the return being based upon certain factors such as the accuracy of their prediction, the amount of time between their investment and the occurrence of a natural peril event, and the skillful use of established laws of statistics and other resources available to a market participant. Time and effort spent in researching natural activity can help to improve the accuracy of predictions made.

Any of the financial activities herein may be undertaken with one or more participants, and the provider may comprise one or more separate entities.

External Objective Information Sources

In one instance, the financial activity incorporates conclusions, findings and reports of one or more external objective information sources such as an independent disinterested third party that provides publicly available information and conclusions. The terms "external" and "independent" refer to entities which are separate from the provider and/or participants of the financial activity. In one instance, an external objective information source provides information pertaining to a natural peril event (in one example an indication that a defined natural peril event has occurred, and in another example, that the defined natural peril event has concluded). In another instance, the external objective information source provides natural peril event data, such as a point of landfall or a land track of a storm originating at sea.

As discussed herein, the present invention is directed to financial activities between a provider and one or more participants. Activities involving multiple participants are attractive in many instances, since the risk to a provider can be spread across a number of participants. However, the present invention also contemplates activity of virtually any type herein, conducted with a single participant who wishes to mitigate the risk of suffering setbacks due to a future natural event. The provider, must however, be willing to engage such an activity.

In one instance, the financial activities incorporate independent objective information which is based upon naturally occurring events that are studied by the external objective information source (and which, in one instance, is publicly available). In one example, financial activities contemplated by the present invention are directed to predictions of natural peril event activity, with financial investments being made before the activity has occurred and/or concluded. Payouts or the assigning of points or other value according to a successful, matching outcome of the financial activity may be based upon multiple factors, some of which are determinable by an external objective information source. Examples include the measurable severity which can be measured, for example, by the amount of property damage as determined by insurance institutes and government agencies. Payouts can also depend upon metrics associated with the natural peril event, based on details concerning occurrence of the natural peril event, such as its points or path of terrestrial contact and the timing of a participant's investment such as the amount of lead time given by the market participant prior to event conclusion.

In many instances, an external objective independent information source is relied upon for its expertise in studying, and measuring natural peril event phenomena as well as drawing conclusions from data collected from natural peril events. Oftentimes, reports made available to the public and others include inferences and conclusions drawn by an expert agency, which goes beyond a mere relating of observed facts. Information which is key to carrying out a financial activity (such as the time and place of occurrence of the natural activity) is obtained from a source external to the provider of the financial activity.

As will be seen herein, it is generally preferred that the identity of the external objective information source is defined beforehand, in a rules database or in some other manner. In one instance, the external objective independent information source provides facts and conclusions which are made generally available to the public, or at least to individuals likely to participate in the financial activity. In this manner, individuals interested in participating in the financial activity and those participants already engaged in the financial activity can monitor progress of a natural peril event, independent of the financial activity. In one instance, participants in the financial activity will be able to readily obtain expert information and skill-building technical intelligence from sources independent of the financial activity, thus enhancing motivation of the participants to engage in the financial activity with a greater likelihood of enjoying a successful outcome. Of particular interest here, are property owners unable to obtain adequate insurance, but who nonetheless live in an area known to be subject to destructive natural peril events. Such property owners will have an interest in gaining an ability to predict natural peril events, so as to be better able to protect their property interests and to offset unforeseen damages. Others that might be interested are cities and municipal corporations. Besides those that have property interests at risk, interested parties may include those interested in speculation types of financial activities, such as operators of hedge funds and institutional type market participants.

Examples of external objective independent information sources include the National Hurricane Center and the Tropical Prediction Center for hurricanes and other tropical storms.

Low-pressure tropical weather systems, or storms beginning at sea, start as relatively low energy thunderstorms. If a moving area of thunderstorms in the tropics maintains its identity for 24 hours or more, the weather system is termed a "tropical disturbance". If the weather system exhibits a rotating or circulating weather pattern, the weather system is referred to as a tropical cyclone. The lowest energy tropical cyclone is termed a "tropical depression" if its maximum sustained wind speed does not exceed 38 mph. For maximum sustained wind speeds ranging between 39 and 73 mph, the weather system is termed a "tropical storm". The most intense weather systems are referred to either as "hurricanes" or "typhoons".

According to the National Hurricane Center, "hurricane" is a name for a tropical cyclone that occurs in that oceanic area generally referred to as the Atlantic Basin or the eastern Pacific, and which is defined by maximum sustained wind speeds of 74 mph or more. "Tropical cyclone" is the generic term used for low-pressure systems exhibiting rotational characteristics that develop in the tropics and meet a criterion for relatively high maximum sustained wind speeds. The intensity of hurricanes is measured according to the Saffir-Simpson scale (categories 1 to 5).

It is well known that hurricanes and lesser storms develop from tropical depressions in the oceans where weather related factors cooperate to form and contribute energy to a low-pressure weather system. The weather system then travels across the ocean, along an unpredictable path. Of interest here are weather systems exhibiting circulating behavior which grow in intensity so as to develop into hurricanes which travel with a generally westward direction component and make landfall or otherwise contact property along well-defined geographical areas, such as the eastern coast of Canada, the United States, Mexico, and South America as well as sea islands lying in a path of travel toward those land bodies. The class of storms referred to as "hurricanes" vary in intensity and are generally free to travel along their own unique pathway or "track". Hurricanes are observed by independent expert agencies of the United States government, such as the National Hurricane Center (an example of an external objective information source), which carefully records, analyzes and later publishes reports, findings and conclusions, which are made available to the public.

Hurricanes are powered by the sea's thermal energy and by energy in the atmosphere. Generally speaking, hurricanes are directed by the easterly trade winds. Around the center, core or "eye," wind speeds accelerate to great velocities. Moving ashore, these energetic winds displace the ocean inwardly, toward land and are known to spawn tornadoes and produce torrential rains and floods. In the Atlantic Basin, for example, statistically there is an annual average of 8.6 tropical storms for the years 1886-1998. Of these, 5.0, statistically, are hurricanes. The above illustrates aspects of natural peril events which may be employed in a rules database or program or other structure to govern operation of financial activity.

It is important to define early on those natural peril events which will qualify for consideration by the financial activity. For example, hurricanes considered by the financial activity may be limited to only those hurricanes which make terrestrial contact or which have a minimum strength. In another example, it is important to define natural peril events considered by the financial activity when the members of the public may have alternative definitions which vary from those to be considered by the financial activity. For example, participants who suffered damage during the time of a tropical cyclone may not fall within the "best-track" or other report issued by an external, independent, objective information source (such as NHC/TPC) (information employed according to one of the possible rules of operation). Contrary to popular expectations, a particular participant may suffer damage from natural phenomena lying outside of the tropical event of interest to the financial activity.

Other examples of external objective independent information sources include the National Hurricane Center for hurricanes and other tropical storms, the National Weather Service and the Storm Prediction Center for tornadoes in the United States, and the Geological Survey, National Earthquake Information Center for earthquakes in the United States. Additional examples include third parties that provide indexes of damage or risk of damage for financial investors and insurance companies.

Examples of Natural Peril Events

Consideration will now be given to a few examples of independently observable, moving or otherwise changing natural peril events, and in particular, those events capable of causing substantial damage.

A tornado is a violently rotating column of air in contact with the ground that extends from a particular type of cloud formation referred to as a "cumulonimbus cloud". Tornadoes can be categorized as "weak", "strong", and "violent"; with weak tornadoes often having a thin, rope-like appearance, with rotating wind speeds no greater than about 110 MPH. The typical "strong" tornado often has a recognizable funnel-shaped cloud associated with a high energy whirling updraft and rotating wind speeds ranging between 110 and 200 MPH. Tornado severity is also measured according to the Fujita scale.

Scientific tornado research is performed by the National Severe Storms Laboratory (NSSL) which has been a leader in Doppler radar development, research and testing, and which has run numerous field programs to study tornadoes and other severe weather. Tornado research is also conducted by NCAR (National Center for Atmospheric Research) located in Boulder, Colo., and TORRO located in the United Kingdom. Almost every university with an atmospheric science program, as well as many local National Weather Service (NWS) offices, have also published some tornado-related studies. The National Weather Service is a branch of the United States government organized under the US Dept of Commerce, and the National Oceanic and Atmospheric Administration (NOAA). In the United States, the National Weather Service (NWS) issues tornado forecasts nationwide. Warnings come from each local NWS office. The Storm Prediction Center, located in Norman, Okla. and organized under NOAA/National Weather Service, and the National Centers for Environmental Prediction, issue watches and severe weather outlooks. Information concerning tornadoes in Canada is managed by the Meteorological Service of Canada.

Tropical cyclones are low-pressure weather systems that develop at sea, especially at low latitudes, usually beginning as relatively low-energy tropical depressions. As storm energy builds, tropical depressions begin to exhibit a rotating or circular weather pattern, and if the storm intensity is sufficient it is classified as a tropical cyclone. Tropical cyclones include "tropical storms," but the most intense tropical cyclones are referred to (depending on the ocean basin in which they occur) as "hurricanes," "typhoons," or simply "cyclones." According to the National Hurricane Center, "hurricane" is a name for a tropical cyclone that occurs in that oceanic area generally referred to as the Atlantic Basin, and which is defined by certain minimum wind speeds. "Tropical cyclone" is the generic term used for low-pressure systems of great intensity that develop in the tropics and meet a criterion for relatively high minimum sustained wind speeds. The intensity of hurricanes is measured according to the Saffir-Simpson scale.

It is well known that hurricanes and less energetic tropical weather events develop from tropical depressions in the oceans, where weather related factors cooperate to form and contribute energy to a low-pressure weather system. The weather system then travels across the ocean, along an unpredictable path. Of interest here are weather systems exhibiting circulating behavior which grow in intensity so as to develop into hurricanes which travel with a generally westward direction component and make landfall or otherwise contact property along well-defined geographical areas, such as the eastern coast of Canada, the United States, Mexico, South America and sea islands lying in a path of travel toward those land bodies. The class of storms referred to as hurricanes vary in intensity and are generally free to travel along their own unique pathway or "track". Hurricanes are observed by independent expert agencies of the United States government, such as the National Hurricane Center (an example of an external objective information source), which records, analyzes and later publishes reports, findings and conclusions, which are made available to the public.

An earthquake is a shaking of the ground caused by the sudden breaking and shifting of large sections of the earth's rocky outer shell. The earth is divided into three main layers—a hard outer crust, a soft middle layer and a center core. The outer crust is broken into massive, irregular pieces called "plates." An earthquake is associated with a sudden motion or trembling in the Earth caused by the abrupt release of strain slowly accumulated in the Earth's plates. It is reasonable to expect that future earthquakes in known earthquake areas will have magnitudes generally comparable to the magnitudes of past earthquakes. Seismologists use a magnitude scale, such as the Richter scale, to express the seismic energy released by an earthquake.

Typical effects of earthquakes vary from a Richter magnitude less than 3.5 (generally not felt, but nonetheless recorded) to a Richter magnitude 8 or greater (so-called "great earthquakes" which can cause serious damage over large areas measured in hundreds of kilometers). Although earthquakes can have similar magnitudes, their effects can vary greatly according to distance, ground conditions, and man-made construction techniques. Publicly available, independent third-party studies are reported by the U.S. Geological Survey. For example, the US geological survey reports Earthquake Density Maps of the United States, as well as Shake Maps and Seismogram Displays for recent earthquake activity in United States and throughout the world. The U.S. Geological Survey, National Earthquake Information Center, World Data Center for Seismology in Denver, issues detailed reports of significant earthquake activity for local areas of the United States and maintains an earthquake catalog useful for earthquake predictions.

The above illustrates aspects of exemplary natural peril events which may be employed in a rules database, program, derivatives contract or other structure to govern operation of financial activity. It is important to define early on those natural peril events which will qualify for consideration by the financial activity. For example, tornadoes considered by the financial activity may be limited to only those tornadoes which make terrestrial contact or which have a minimum strength. In another example, it is important to define natural peril events considered by the financial activity when the members of the public may have alternative definitions which vary from those to be considered by the financial activity. For example, participants who suffered damage during the time of a tropical cyclone may not fall within the "best-track" issued by an external, independent, objective information source (such as NHC/TPC) set up by the financial activity as the conclusive source of such information. That is, contrary to popular expectations, a particular participant may suffer damage from natural phenomena which are not encompassed by the financial activity.

As mentioned, the present invention contemplates natural peril events that are not related to hurricanes. Such natural peril events may be described as natural peril events originating either on land (such as tornadoes, hail storms, wildfires or earthquakes), at water level (such as tsunamis and rogue waves caused by winds in contact with the water surface) or below water level (such as tsunamis caused by underwater earthquakes).

Examples of Financial Activity Models

Different types of financial activities are carried out, typically between a financial activity provider and one or more participants in the financial activity. The activity may also be conducted between paired or matched trading partners, as where bids are matched with purchases. The pools of money supporting the financial activity can be managed on a pari-mutuel basis or not. For example, a financial activity can be conducted to provide a fixed payout to one or more eligible parties. Pricing can be structured in a number of different ways, such as where prices are determined by market conditions, or by one or more algorithms, or a mixture of these and other possibilities. Different models of financial activities are contemplated, including:

1. Derivative trading type of financial activity, such as those activities directed to derivative securities interests, which are typically monitored by the Securities and Exchange Commission or other oversight bodies, such as the Commodity Futures Trading Commission (an independent agency of the United States government), the New York Stock Exchange, the Chicago Mercantile Exchange, the Iowa Electronic Market, and others. Examples include futures contracts, options contracts and options on future contracts. Trading may be unilateral or multilateral and may be cleared, either initially or later on, by an exchange.

2. Secondary trading of financial assets developed by a participant of one or more of the financial activities indicated herein, particularly secondary trading between a participant of an ongoing financial activity and a third party wishing to deal directly with the participant, rather than the financial activity provider. The financial activity provider may require registration of the secondary trade or impose other controls over the parties involved, including assistance with executing the trade between two or more participants or nonparticipants, such as registration of the instruments traded.

3. Persons with cell phones or other portable communication devices such as pda's or laptop computers, may vote their choice of first landfall and are charged for placing the vote. Voting may be carried out via text messaging, the internet or voice communication, with or without the use of voice recognition technology. Those participating may, for example, be entered into a sweepstakes that may or may not include a second sweepstakes for those who vote in favor of a particular choice.

4. Price-oriented competition, preferably in games of skill where participants are charged an "entry fee" to engage in skillful competition with other participants. The distribution or "prize" to qualifying participants is predetermined at the outset of competition, and accordingly is not affected by variability factors. However, if desired, the "entry fee" can be adjusted by variability factors such as those relating to the time interval between investment and event outcome, and the probability of a successful outcome determined approximately at the time of investment.

5. Property value protection, particularly financial activities in which the participants are screened for eligibility to engage in the financial activity, depending upon some indication of their property rights in a geographical area covered by the financial activity.

6. Games of skill, preferably where the participants are obliged to demonstrate a level of skill which pertains to the natural peril events of interest.

7. Lotteries, sweepstakes or other games of chance, such as those activities monitored by state and local governments.

Financial Activity Network

Referring now to the drawings, and initially to FIGS. 1-4, financial activity system 100 in one instance, takes the form of a financial activity network generally indicated at 10. In one example, network 10 includes a central managing system 12 linked to a plurality of participant terminals 14-18. The terminals can comprise, for example virtually any device that provides communication with a workstation such as a network or other computers including desktop, portable, lap-top or mainframe computers, data terminals, dumb terminals, personal digital assistants, cellular phones or other electronic devices having communications capabilities. Throughout the description given herein, "computer" refers to a computer system comprising one or more computing devices, but could also refer to computer systems operated by stock markets, options exchanges, commodity exchanges or the like.

As schematically indicated in FIG. 1, each of the participant terminals communicate directly with central managing system 12 via communication network components 15, allowing concurrent transactions and data transfers to occur. Other types of arrangements are possible. For example, communications between the central managing system and the participant terminals can employ virtually any communications technology known today. The geographical spacing between the central managing system and the participant terminals can have virtually any scale desired. For example, the entire network 10 can be located in a single room, or in a single building or building complex or campus.

As will be seen herein, financial activity can take place according to different models. One model is directed to a derivative tradings type of financial activity, such as those activities directed to derivative securities interests. In this type of financial activity, the central managing system 12 preferably comprises a brokerage system communicating with an exchange system. Preferably, participants' trading is conducted through the brokerage system before being conducted with the exchange. If desired, in this type of financial activity, the brokerage system can be omitted with participants dealing directly with the exchange system. If desired, the central managing system can either be incorporated into, or be provided in addition to, the exchange system.

Alternatively, the financial activity network 10 can be located at various nationwide or international locations, as may be desired. As a further alternative, the financial activity network may take on any form, and may employ wire, cable or wireless components (such as cell phones, text messaging devices, pda's, etc), for example. Network 10 can be configured as an open connection or network such as the Internet network, a wide area network, a telephone network, a satellite network, an on-line network or a closed circuit television network or the like intra-facility network. Network 10 can also take the form of an Ethernet arrangement, a token ring, a token bus or any other suitable communications arrangement or configuration that can link workstations, particularly workstations including one or more data processing computers.

Financial activity can, but need not necessarily, take place either within or across local, state, federal, national or international boundaries. For example, participant terminals can be located in one or more boundaries, e.g., political boundaries different from that of the central managing system. As a further example, although the central management system and the participant terminals are located within a given boundary, e.g., a given political boundary, the central management system may communicate with external objective, independent information sources, external credit agencies or other agencies located within one or more different political or geographic boundaries. As will be seen, operators of the financial activity may rely entirely on outside services to provide the needed credit and other financial arrangements.

The terminals can comprise one of the many different types of electronic devices known today, including a programmable computer, a telephone, a stand-alone machine such as an ATM machine, a television or a set-top box unit, a credit card reader, a kiosk terminal, a point-of-purchase register, or a stand-alone unit resembling an arcade game, for example. The terminals preferably include an input device suitable for receiving a purchase request or other data from a participant, such as those employed by purchasers to obtain goods and/or services from a merchant. The input devices can take many forms, including a keypad (including those used in cellular and other portable devices), keyboard touch screen or mouse or a remote control device, contactless payment system, or fingerprint or other biometric system, for example. Systems, articles and apparatus preferably comprise digital devices, but could also comprise analog or hybrid electronic or non-electronic devices, as may be desired.

System Apparatus

Figure 2:
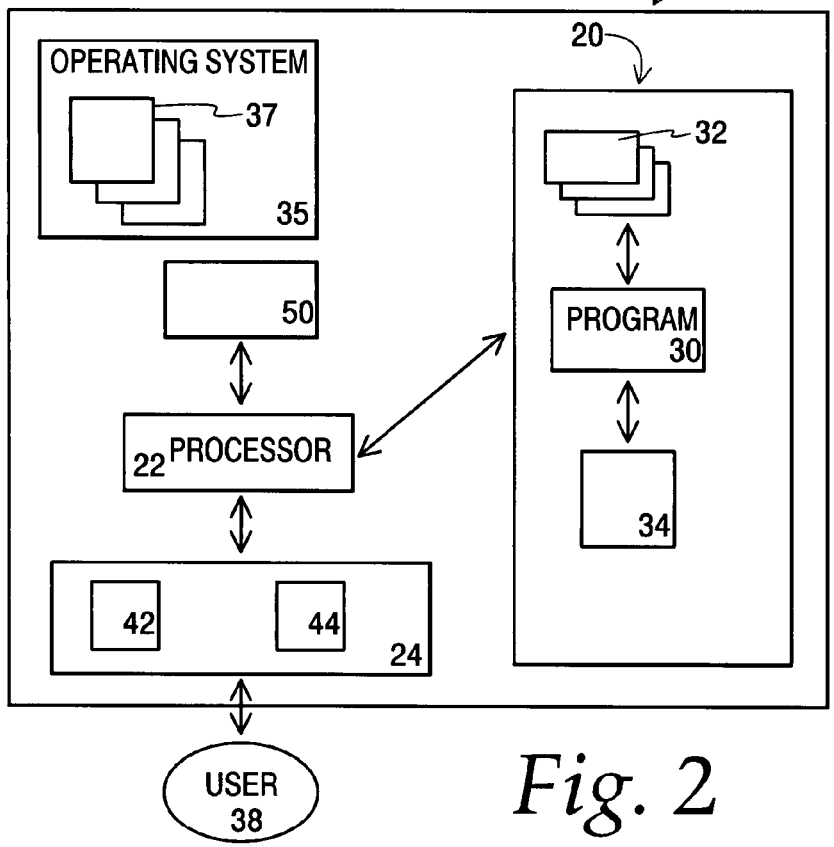
FIG. 2 is a schematic representation of a financial activity apparatus implementing the present invention.

Turning to FIG. 2, financial activity system 100 includes system apparatus 13 embodying the central managing system 12 shown in FIG. 1. In one example, system apparatus 13 comprises one or more storage devices 20, one or more processors 22, and one or more interface components 24. The processor 22 in one example comprises a central processor unit ("CPU"). The processor 22 executes one or more instructions of one or more programs 30, under control of an operating system 35 employing one or more system programs 37. The program 30 in one example comprises one or more subroutines and one or more variables, as will be understood by those skilled in the art. The storage device 20 in one example comprises at least one instance of a recordable data storage medium, as described herein. The storage device 20 stores the program 30, and one or more databases 32, and one or more data files 34.

The interface component 24 in one instance comprises a graphical user interface ("GUI"). In one example, the interface component 24 allows a service provider or other user 38 to execute one or more programs 30. The program 30, in one example, comprises one or more subroutines, to carry out the financial activity methods and operations to be described herein. In one instance, program 30 includes one or more subroutines to collect, publish, interpret or otherwise process information which supports principles and other aspects of operation of the financial activity. In another instance, program 30 includes one or more subroutines for implementing rules of operation for the financial activity.

In another example, the interface component 24 allows the user 38 to verify or otherwise interact with one or more results of the program 30. In yet another example, the interface component 24 allows the user 38 to set one or more input values or operating parameters for the program 30. In the preferred embodiment illustrated in FIG. 2, interface component 24 includes a display device 42 and a data input device 44 which allow a user 38 to set up the central managing system according to desired operating objectives. With the interface component 24, a user can access, read or write to the program 30, the databases 32 and the data files 34

Included in the apparatus 13 embodying system 12 is a communication port 50 which provides two-way communication with the terminals 14-18. Communication port 50 can employ virtually any communications protocol, data format and other organizational, communication or other known content that is in use today. It is generally preferred that the communications network employed between the central managing system and the participant terminals comprise an interactive device taking any suitable form.

The financial activity system 100, in one example, comprises a plurality of components such as one or more of electronic components, hardware components, and computer software components. A number of such components can be combined or divided in the financial activity system 100. An exemplary component of the financial activity system 100 employs and/or comprises a set and/or events of computer instructions written in or implemented with any of a number of programming languages, as will be appreciated by those skilled in the art. The financial activity system 100 in one example comprises any (e.g., horizontal, oblique, or vertical) orientation, with the description and figures herein illustrating one exemplary orientation of the financial activity system 100, for explanatory purposes.

The financial activity system 100 in one example employs one or more machine (e.g. computer)-readable (hereinafter "computer-readable") signal-bearing media. The computer-readable signal-bearing media store software, firmware and/or assembly language for performing one or more portions of one or more embodiments of the invention. Examples of a computer-readable signal-bearing medium for the financial activity system 100 comprise a storage component such as the one or more storage devices 20. The computer-readable signal-bearing medium for the financial activity system 100 in one example can comprise one or more of a magnetic, electrical, optical, biological, and atomic data storage medium. For example, the computer-readable signal-bearing medium can comprise floppy disks, memory devices, magnetic tapes, CD-ROMs, DVD-ROMs, hard disk drives, and electronic memory. In another example, the computer-readable signal-bearing medium comprises a modulated carrier signal transmitted over a network comprising or coupled with the financial activity system 100, for instance, one or more of a telephone network, a local area network ("LAN"), a wide area network ("WAN"), the Internet, and a wireless network.

Data Structures

In a general sense, data needed for a financial activity may be located entirely on site, as contemplated herein. Alternatively, the present invention also contemplates situations where administrators of a financial activity may decide to divide responsibilities with an outside service. For example, a credit or other financial service may be engaged to provide credit checks, authorize financially responsible individuals to participate, or even handle all financial matters, including the collection, payout and other handling of funds. As another alternative contemplated by the present invention, financial activities may be conducted with authorized brokers, financial institutions as well as regulated exchanges such as stock and futures exchanges. Such activities may reflect predefined financial arrangements. In any of these or possibly, other instances, the data handling, participant authorization and other interactions concerning the participant may reside off-site, that is, remote from the operation (and possibly the responsibility) of the financial activity.

Figure 3:
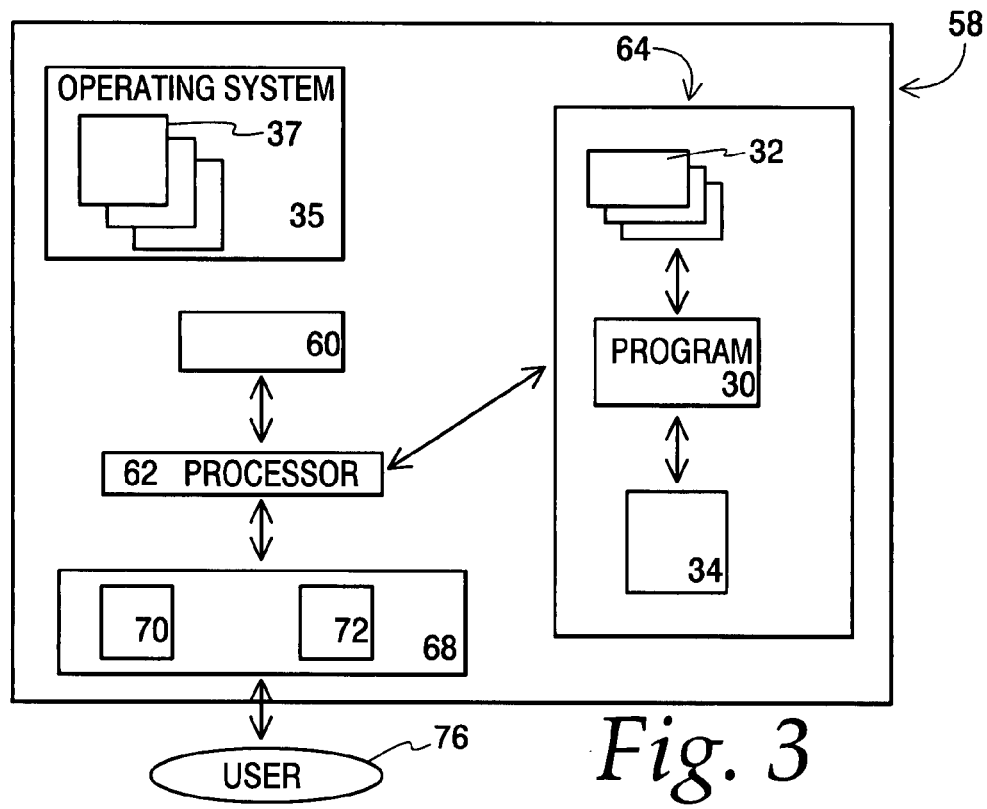
FIG. 3 is a schematic representation of a first participant terminal.
Figure 4:
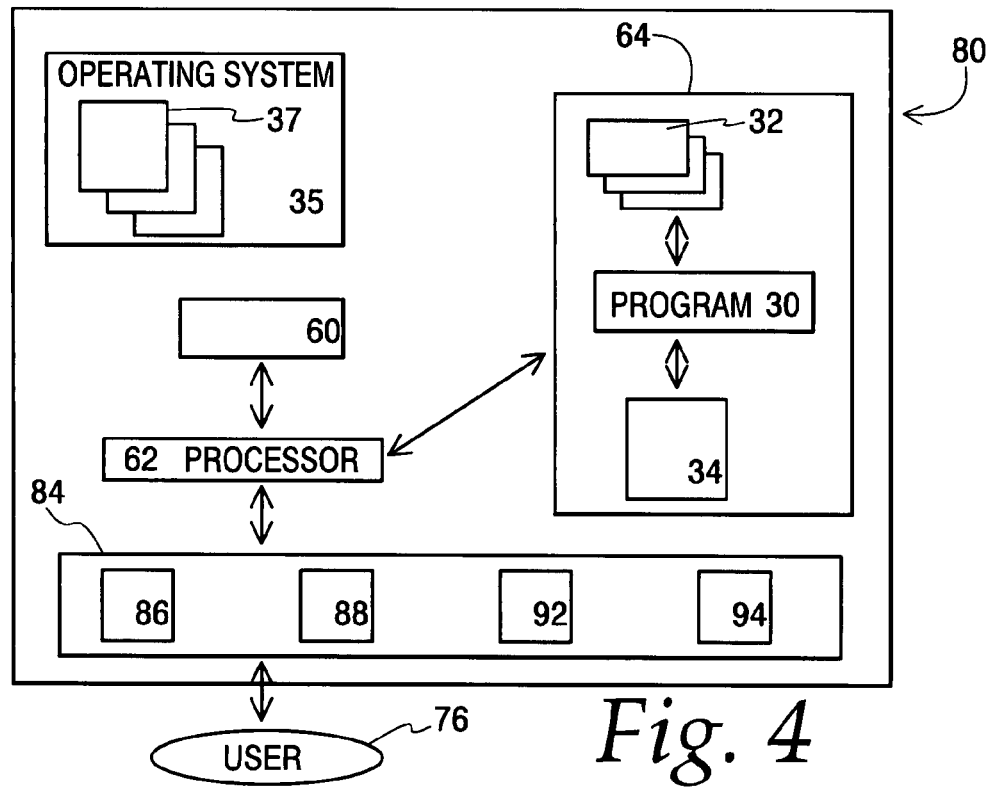
FIG. 4 is a schematic representation of a second participant terminal.

With reference to FIGS. 2-4, the databases 32 in one example comprise a participant database, an administrator or system database, a credit provider's database, a storm watch database, a rules database and a push database. The credit provider database contains a list of credit providers and their accepted methods of payment, as well as any credit related information of any type, such as authorization codes usually provided to merchants or the like to authorize transactions acceptable to a credit provider. The credit provider database may also contain other financial information associated with the credit provider, such as the credit provider's identification number and account information. In the preferred embodiment, the system administrator in one aspect provides services similar to that of a merchant selling goods and/or services to participants. If desired, the system administrator can comprise a reseller of goods and services such as proprietary weather reports and cartographic or weather information, as well as maps, forms and other materials relating thereto. In another example, operators of the financial activity may rely entirely on outside services to provide the needed credit and other financial arrangements.

The participant database maintains a list of participants and their associated personal financial information. The participant database stores a set of personal payment methods which are registered by the participant with a transaction processing service, which in the preferred embodiment is engaged by the system administrator as an accommodation to the participant. The participant database further includes information regarding the eligibility of participants to participate in the financial activity. In the preferred embodiment, the system administrator employs a known screening service to enforce those rules set down pertaining to restrictions on participation. For example, the system administrator may choose to implement requests by government officials to curtail or otherwise limit transactions originating in or communicated to those areas subject to an evacuation order or one or more legal restrictions. Further details concerning an exemplary screening service is provided in U.S. Pat. No. 6,508,710, issued Jan. 21, 2003, the disclosure of which is hereby incorporated by reference in its entirety.

For example, a participant could specify by checking a box on a list as to whether he is registering as an individual, corporation, partnership, trust, etc. Depending upon which box is checked, another display will ask what the entity's net worth is. Should that net worth meet or exceed a set amount for that particular entity, then the participant will be registered for that activity based upon a minimum net worth set by the financial activity provider or regulated exchanges (i.e. —eligible contract participant, institutional trader, retail trader, etc.)

The storm watch database tracks storm activity of interest to participants. Included, for example, are circulating storm systems which have not yet matured into hurricanes, but which have the potential for doing so. If desired, historical data concerning previous storm systems may be made available to participants, either on an unrestricted basis or at additional cost to the participant.

The administrator database contains data and other information needed to operate the financial activity. Included, for example, are ongoing "real-time" or "moving" totals of the number of participants, the total invested, the number of other participants that have positions (e.g. financial investment units) corresponding to a participant's prediction choice, and the amount invested by the other participants. If desired, the administrator database can also include real-time estimates of payout amounts corresponding to the participant's prediction choice, assuming that the choice proves to be accurate. Such payouts may include consideration of some form of minimum return the participant may expect, for those financial activities providing such expectations. The administrator database can also include a list of known users who are to be barred from participating or otherwise restricted in their participation activity. This information can be contained in a separate database, if desired. Also, the administrator database preferably contains participation statistics and financial statistics, useful in providing an updated estimate of the cost of doing business for operating the financial activity. If desired, adjustments to cover fluctuations in overhead costs can be made with regard to future participants.

The rules database contains rules or other principles of operation for the financial activity. The rules database contains a set of "rules" or principles which govern the ongoing financial activity, in a specific or in a general way (e.g. rules defining the authorities, or external objective independent information sources to be relied upon for a final, factual decision or conclusion). Examples of such authorities include expert governmental agencies responsible for monitoring natural peril events, as well as weather stations which provide reports. The rules also include eligibility requirements, personal financial payment requirements, and sliding scales affecting payouts such as timing and deadlines.

The rules may be wholly or partially public (i.e. available to participants) or private (i.e. available only to those authorized by the system administrator). In one instance, the rules database also governs the course of conduct of specific aspects of the financial activity. For example, in one instance, the rules include definitions relating to the natural peril events to be considered by the financial activity, the external objective independent information source which manages information and determinations concerning a natural peril event which will be relied upon during the course of conducting the financial activity, parameters associated with the natural peril events, especially those parameters which are used to uniquely define each particular natural peril event as well as parameters for determining remuneration points or other value.

If desired, the points or other value pertaining to the participant's remuneration can be "hidden" or incorporated within a calculation, and need not be expressed in an explicit reference. In another instance, the rules database contains definitions of those participants eligible to engage in the financial activity, as well as those participants which qualify as finalists ("winners") eligible or who otherwise qualify for remuneration. In a further instance, the rules database contains principles of operation governing transfers between the financial activity and qualifying participants. The rules database may also govern access that a participant has to certain information concerning the financial activity, such as the number of individuals participating, the average or largest financial investments currently being made, and the raw total currently collected for the event of interest.

In another instance, the rules database can include principles of operation relating to safety and public interest considerations. For example, the rules database can provide for automatic suspension of operation upon public announcement of an evacuation order or recommendations to prepare to evacuate a particular area. The rules database can provide for selective activity based upon the location of the participants. For example, suspension of financial activity can be limited only to those counties or other areas where government safety warnings have been issued, while allowing financial activity to continue for those areas not affected by the government warnings.

The push database contains information useful for generating interest and encouraging participant activity. For example, push data can include recent designations of officially recognized storm systems that may become candidates for future investment opportunities. Push data can also include brief analyses and/or statistics of ongoing or recent natural peril events. Different amounts of push data and different lists of push participants can be set up by a computer program according to pre-defined "trigger levels" such as storm location, intensity and speed, for example. The push database can also include rules of operation pertaining to push data, such as local times during which push data is or is not sent.

The data files comprise data information which, preferably, is relatively static, such as the official designations of natural peril events to be issued in an upcoming activity season, official and unofficial historical reporting of natural peril events activity and statistics compiled from historical information, for example. This historical data can be combined with climatological and other probabilities to determine investment price and/or payouts. If desired, the data files can be replaced by one of the available databases, or a special database can be provided, if desired.

A land area database can contain geographic items such as maps and other data relevant to conducting a financial activity. For example, in the United States, maps can be provided for those states at risk to a hurricane strike. Preferably, the maps would be "clickable" to allow a participant to readily indicate the state of interest. In response, more detailed maps such as maps of the counties within the state would be displayed to the participant and again, would be clickable to provide ready indication of the participant's choices of predicted strike areas. If desired, this same functionality can be provided in table form or some other form convenient for user participation. In addition, a cross reference "finder" tool can be provided to receive Zip code information or the like, and return with a colored or other visually distinctive area on the displayed map, or a textual response to the inquiry, ready for the participants' selection to the indicated. As mentioned, it is generally preferred that the maps, tables, or other geographic location information contain a visual indication of those areas which lie outside of the financial activity, providing a ready indication of ineligibility to participants surveying their possible choices for a prediction entry. If desired, the geographic location data can be linked to meteorological or climatological data for the given area.

A weather database is preferably provided for information concerning weather, meteorological or climatological or other natural forces such as precursors to earthquakes or volcanic eruptions. The weather database preferably contains historical information helpful to those preparing a prediction of future natural peril events.

Participant Terminals

Turning now to FIG. 3, terminal apparatus 58 comprises one or more of the participant terminals 14-18 and includes a communications port 60, one or more processors preferably comprising a central processing unit 62 and a memory storage unit 64. Also included is an interface component 68 which preferably comprises a display 70 and a data input device 72. Interface component 68 allows a participant or other user 76 to communicate with apparatus 58 and in turn with apparatus 13 of the central managing system 12. The present invention also recognizes other types of devices, such as pda's laptop computers and cellular communication devices, as means for conducting financial activities according to the present invention. As will be seen herein the present invention also contemplates an organization of equipment and services that may be loosely be referred to as a network in which third party services such as clearing houses or exchanges participate in the financial activity, along with the aforementioned participants and the originators or managers of the financial activity.

Turning now to FIG. 4, terminal apparatus 80, comprising another example of the participant terminals, includes a communication port 60, one or more processors preferably comprising a central processing unit 62, a memory storage unit 64 and an interface component 84. In the arrangement illustrated in FIG. 4, interface component 84 includes, in addition to a display 86 and a data input device 88, a card read/write device 92 and an output device 94 for dispensing a printed receipt, confirming a participant's transaction.

Figure 5:
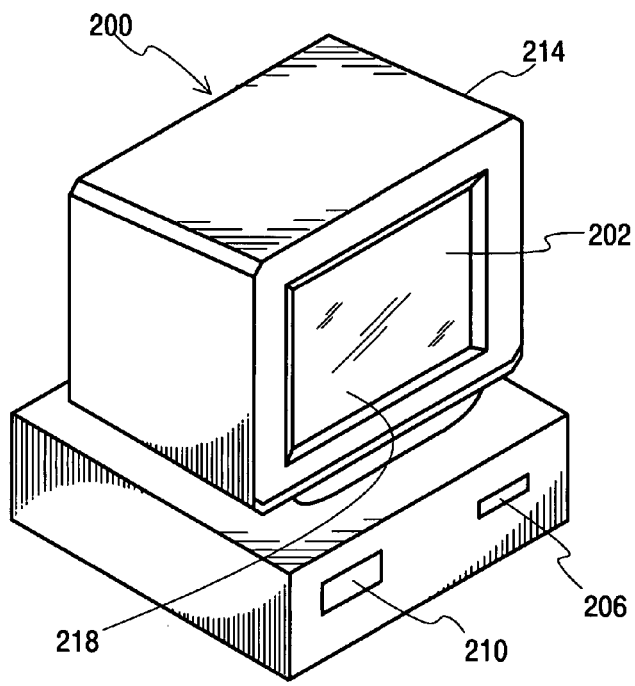
FIG. 5 is a schematic representation of a point-of-purchase participant terminal.
Figure 6:
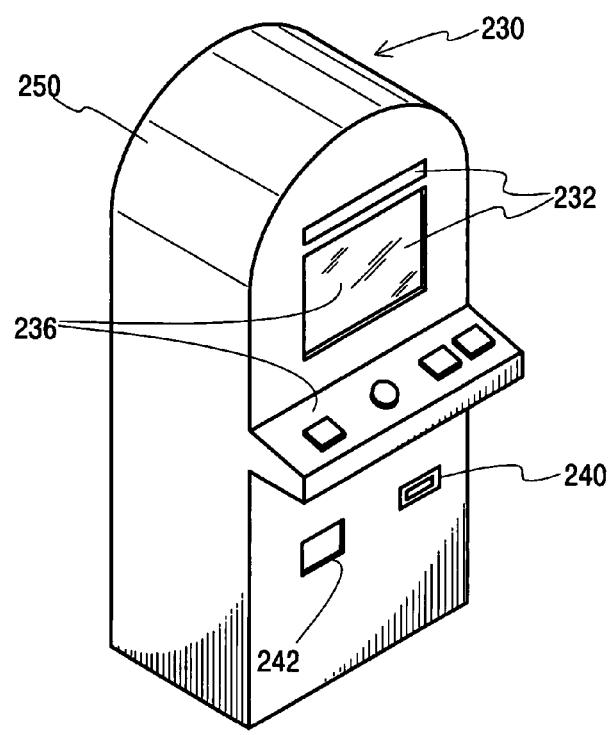
FIG. 6 is a schematic representation of a standalone participant terminal.

With additional reference to FIGS. 5-6, two additional examples of participant terminals are shown. With reference to FIG. 5, participant terminal 200 is shown comprising a display 202 for presenting information about the selected natural peril events, a user interface integrated with the display for viewing event information and placing investments on a selected natural peril event, an optional card read/write device 206 for receiving an electronic or magnetic-stripe card encoded with a participant's account information, an optional ticket dispensing device 210 for providing a ticket comprising purchase information for a selected natural peril event and a housing 214 for retaining the display, the user interface, the card read/write device and the ticket dispensing device.

The participant terminal 200 also includes a processor and may also include a speaker (not shown) for playing audio associated with the financial activity information. The display preferably comprises a CRT or a flat screen display 218 for displaying information regarding the natural peril events and preferably, the display comprises a touch-sensitive display, including a touch-sensitive membrane (not shown) in communication with the processor for selecting the desired investment information such as the desired investment in terms of dollars or the number of financial investment units, as well as "scrolling" between next and previous information. As will be apparent to those skilled in the art, any appropriate type of display may be used.

Turning now to FIG. 6, another embodiment of the at least one participant terminal, generally indicated at 230, is shown comprising a display 232 for presenting information about the selected natural peril event, a user interface 236 for viewing event information and making investments, an optional card read/write device 240 for receiving an electronic or magnetic-stripe card encoded with a user's account information, an optional ticket dispensing device 242 for providing a ticket comprising investment information for a selected natural peril event and a stand-up type housing 250 for retaining the display, the user interface, the card read/write device and the ticket dispensing device. The participant terminal also includes a processor (not shown) for facilitating financial activity. The participant terminal 230 may also include a speaker (not shown) for playing audio associated with the financial activity information. The examples shown in FIGS. 5 and 6 are only exemplary implementations for the at least one participant terminal, and other configurations are also contemplated. For example, the user interface may include a plurality of hardware or software buttons, each identifying different functions for facilitating various aspects of the financial activity.

Central Managing Apparatus

The central managing apparatus 13 and the participant terminal apparatus (together, referred to as "the apparatus") in one example comprise a plurality of components such as one or more of electronic components, hardware components, and computer software components. A number of such components can be combined or divided in the apparatus. An exemplary component of the apparatus employs and/or comprises a set and/or series of computer instructions written in or implemented with any of a number of programming languages, as will be appreciated by those skilled in the art. The apparatus in one example comprises any (e.g., horizontal, oblique, or vertical) orientation, with the description and figures herein illustrating one exemplary orientation of the apparatus, for explanatory purposes.

The apparatus, in one example, employs one or more computer-readable signal-bearing media. The computer-readable signal-bearing media store software, firmware and/or assembly language for performing one or more portions of one or more embodiments of the invention. Examples of a computer-readable signal-bearing medium for the apparatus comprise the storage components 20, 64. The computer-readable signal-bearing medium for the apparatus in one example comprises one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, or a wireless network.

The present invention also contemplates arrangements where some or all of the central managing services are performed by one or more third parties, such as clearing houses as well as professional third party services authorized to conduct financial or management functions.

Graphical User Interface

Figure 7:
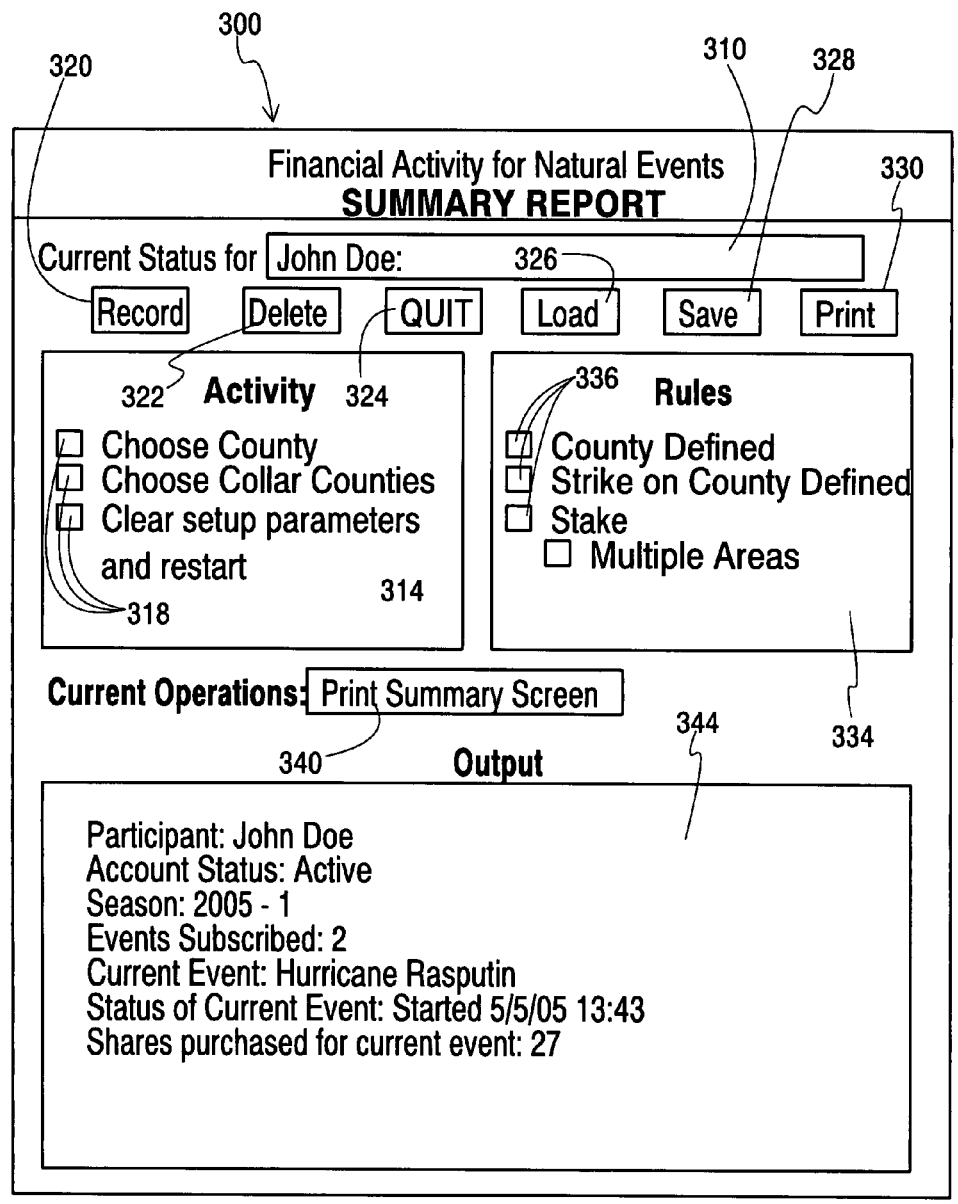
FIG. 7 is a schematic representation of a first data display.

Turning now to FIGS. 7 and 8a-8f, and initially to FIG. 7, program 30 includes one or more subroutines for communicating with a participant located at a remote participant terminal. In one instance, program 30 includes one or more subroutines for generating one or more screens performing a number of functions, including sending information to a participant, and receiving information from the participant. In FIG. 7, window or screen 300 schematically represents a summary screen for participant John Doe, as indicated at 310. As mentioned, screen 300 is a summary screen, and works with a number of supporting screens which query the participant for specific information such as the participant's name, and receives responsive information which is then reviewed for form and content, recorded in one or more databases such as the participant database, and is reported in the area 310.

Other supporting screens receive other participant application information, such as the participant's location of residence or location of other property holdings, along with information regarding the participant's credit information, or approval from an external service, such as a participating brokerage service. Upon approval, either internally or through an exchange clearing organization or the like service, the participant's credit and other qualifications, an account is opened for the participant and details concerning the account, credit qualifications and other related financial information are stored in one or more databases, such as the participant database. Alternatively, operators of the financial activity may rely entirely on outside services to provide the needed credit and other financial arrangements. The steps referred to herein regarding credit check and the like may be replaced by an authorization from the external service. In other instances, operators of the financial activity may interact directly with an approved exchange service, with financial arrangements being made according to rules governing operation of the exchange.

In any event, the summary screen 300 is then presented to the participant/confirming the participant's active status in the financial activity. During this process, one or more queries, multiple-data choices, multiple activity choices or other interactions with the participant are listed in the area 314. If desired, each choice presented to the participant can have an adjoining checkbox 318, provided for the ready data input into program 30. If desired, one or more command buttons 320-330 can be provided for the user, to execute one or more commands or otherwise control some portion of data is stored in one or more databases, or to control some portion of program 30 allocated to the participant by the system administrator. If desired, area 334 can be provided to display context-sensitive rules of play to the participant, or to provide appropriate prompts or other helpful information. If desired, checkboxes 336 can be provided adjacent each entry in window or pane 334 to allow the participant to obtain further information related to the topic of interest.

In the area 340, the participant is alerted to the current operation being performed by program 30. If desired, a sequence of operations appearing in area 340, along with appropriate responsive indications from the participant may be listed in area 344. If desired, information in area 344 can be saved or printed using command buttons 328, 330, thus affording the participant the opportunity to obtain a written record of the activities in either electronic or printed paper form.

Figure 8A:
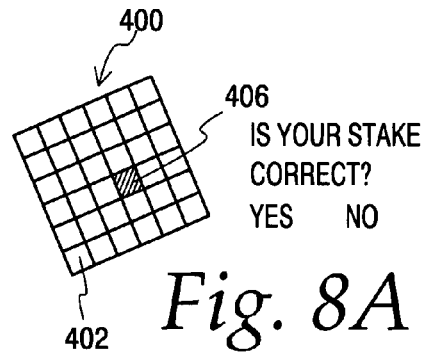
FIGS. 8a-8f are schematic representations of a series of screen displays.

Turning now to FIGS. 8a-8f, a events of exemplary data input screens are shown in schematic form. These screens pertain generally to the selection of the locations chosen by the participant for investment. For example, if the natural peril event is a hurricane, the location may be the participant's prediction of where a hurricane strike will make terrestrial contact. Alternatively, the location may be the epicenter of the storm's strike, the point of landfall, or a point along the over land track of the tropical cyclone. Landfall can be defined in any number of ways. For example, landfall can be measured using the center of the eye of hurricane, or the eye wall of the hurricane or different portions of the structure of the hurricane. Referring to FIG. 8a, a screen 400 presents a map 402 of a land area, which is preferably subdivided into smaller portions, each of which may either be selectable by the participant or shaded or otherwise made visually distinctive to the participant so as to indicate an area which is not eligible for the financial activity.

If desired, the rules stored in one or more databases may provide further information regarding this topic of ongoing activity. Preferably, each subdivided portion of map 402 is selectable by touch screen, click and point, or by an input pen device, for example. It is also preferable, in one instance, that the area 406 selected by the participant is shaded, colored, or otherwise made visually distinctive so as to indicate graphically the choice made by the participant. In FIG. 8a, area 406 is chosen by the participant and receives a distinctive contrasting color value to provide visual feedback to the participant. As indicated in FIG. 8a, the screen 400 also includes a query to the participant to confirm and finalize the choice of location.

Figure 8B:
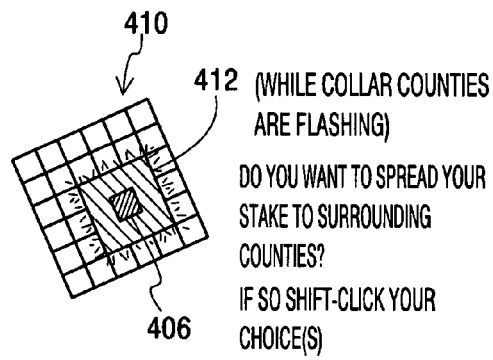

Turning now to FIG. 8b, screen 410 is presented as a prompt to the participant to expand the indicated area so as to include one or more surrounding areas. In screen 410, an enlarged area 412 surrounding the initial chosen location 406 (the "collar countries") is made to flash or blink on and off or undergo a color change. An optional text message is presented to draw the participant's attention to the advantages of enlarging the selected location in which a natural peril event strike is predicted to occur. The participant can indicate additional locations by shift-clicking, for example.

Figure 8C:
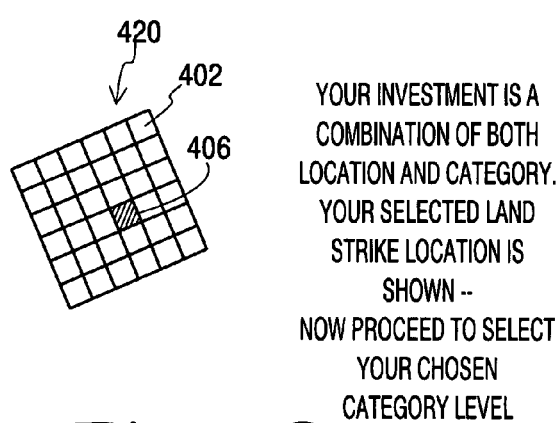
Figure 8D:
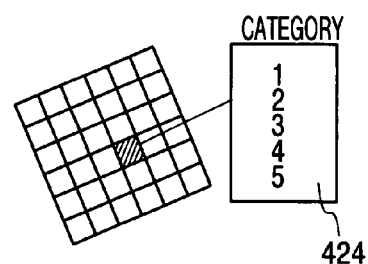
Figure 8E:
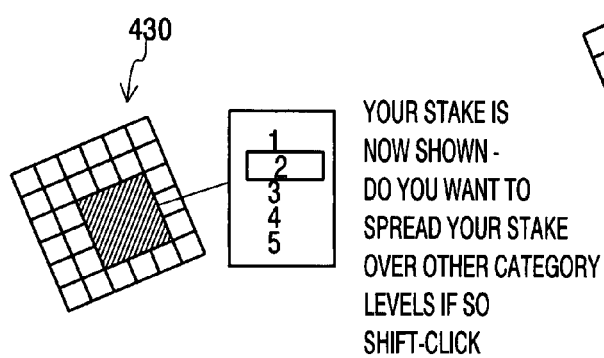
Figure 8F:
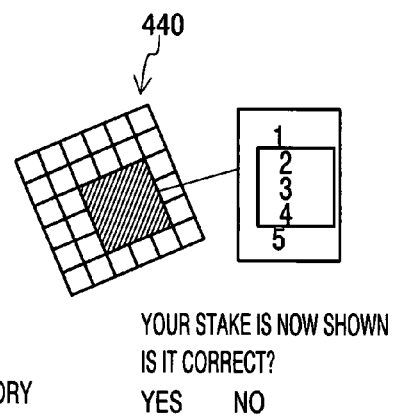
Figure 9:
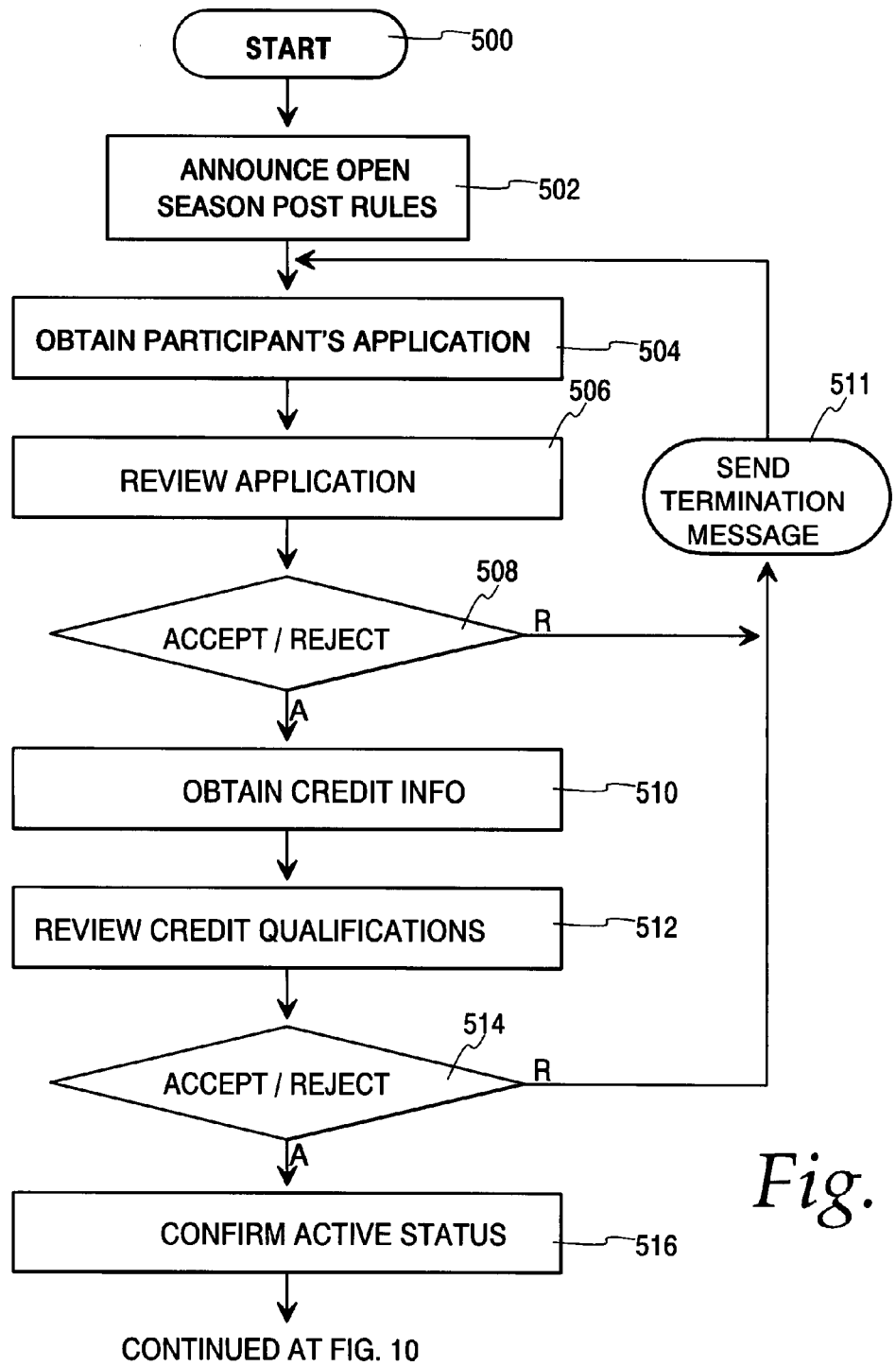
FIGS. 9-12 together comprise a schematic flow diagram representing one example of system operation.

In one instance, it may be desirable to establish a rule of play allowing the use of so-called secondary parameters. These secondary parameters require a participant to select not only a location of strike by a natural peril event, but also to indicate some characterizing factor associated with the natural peril event, such as binary events including the strength of the tropical storm measured according to a numerical category value, according to the Saffir-Simpson scale, for example. Another example of a secondary parameter for a tropical storm could be the strength of the storm, and such is contemplated in FIGS. 8c-8f. Referring to FIG. 8c, screen 420 provides notice to the participant that a secondary parameter is to be provided, in addition to the strike location. In FIG. 8d, a pull-down window 424 is provided in screen 426 to indicate a range of values to be chosen by the participant as the predicted category strength of the hurricane strike. In FIG. 8e, it is assumed that a participant has previously enlarged the area of strike location to be covered by the chosen investment or "stake". In screen 430, the participant's choice of category 2 is confirmed along with an invitation to spread the participant's stake in category strength, as well as in land area. In FIG. 8f, a screen 440 shows the participant's selected range of category strength. Following, is a screen (not shown) which summarizes the participant's stake. For example, for the investment indicated in FIG. 8f, a user has selected nine geographic areas and three category strengths, for a total purchase cost of 27 financial investment units (9 areas×3 strength values). In one instance, it is generally preferred that this summary total of financial investment units purchased is reported in area 344 of screen 300, shown in FIG. 7.

Methods and Operations

An illustrative description of exemplary operation of the system is considered with initial reference to FIGS. 9-12. As will be seen, the financial activity discussed here is modeled after a game of skill or the like. Other types of financial activities will require different methods, apparatus and operations.

FIGS. 9-12 indicate a series of steps to be carried out during the course of the financial activity. These method steps may be implemented in a number of different ways, including, for example, but not limitation, execution of program 30 by the central managing apparatus 13, and one or more participant terminals. The program 30 may be implemented by either a general-purpose computer or a special purpose electronic device, for example. The method steps may be incorporated into an article of manufacture such as a data storage device. As will be seen herein, the steps indicated in FIGS. 9-12 indicate that portion of financial activity as taken from the viewpoint of the system administrator.

Referring initially to step 500, the financial activity is initiated by virtually any appropriate means. For example, if the rules of operation provide that the financial activity begins at a given date and time, the start step 500 may be implemented in software that monitors the system clock and executes program code which publishes invitations to participants to engage in financial activity as of the referenced date and time. Alternatively, start step 500 may be initiated by the system administrator pressing a key switch or otherwise activating a switch to initiate transmission to participants indicating that the financial activity season has been opened. An event season may be related to a single natural peril event or a number of different natural peril events or a number of portions of an ongoing natural peril event. In one instance, an event season is defined by calendar dates, by a number of occurrences of a defined natural peril event, or by a mixture of both, or may rely upon a report or other dissemination of data from an external objective independent information source.

In step 502 in addition to announcing the opening of the financial activity season, an optional offer is made to make available certain rules of operation which govern financial activity for the season of operation. In step 504 application information is obtained from the participants. This information can include, for example, an indication of the identity of the participant, the participant's residential location or location of property interests, and the participant's credit information needed to allow the system administrator to authorize opening of an account for the participant. Alternatively, the administrator may rely upon external credit or other financial services to take the necessary action culminating in authorization of a participant's account. Preferably, the system administrator predefines acceptance criteria in the rules which govern the financial activity. These rules may include intervention by an external agency, such as an external credit agency from which credit is purchased by the participant, using the system administrator as a broker, as is currently done by many merchants offering goods or services for sale.

In step 506, the application information is reviewed and the decision made in step 508 is to either accept or reject the participant's application. For example, a participant's application may be rejected because the participant has failed to disclose a property interest needed to base financial activity on property losses caused by occurrence of natural peril events. If the participant's application is rejected, control is passed to step 511 which sends a termination message to the participant and returns control to step 504.

If the participant's application is accepted, control is passed to step 510 in which credit information is obtained from the participant. The participant's credit qualifications are reviewed in step 512 and a decision is rendered in step 514 to accept or reject the participant based upon the added requirements of appropriate credit qualifications. Again, if the participant fails to meet sufficient credit qualifications, control is passed to step 511 which sends a termination message to the participant and then transfers control to step 504. If the decision in step 514 is positive, indicating acceptance of the participant's application and credit qualifications, control is passed to step 516 which confirms the active status of the participants with respect to the financial activity. Such confirmation may be indicated, for example, by a report rendered by screen 300 as explained above, with reference to FIG. 7.

Figure 10:
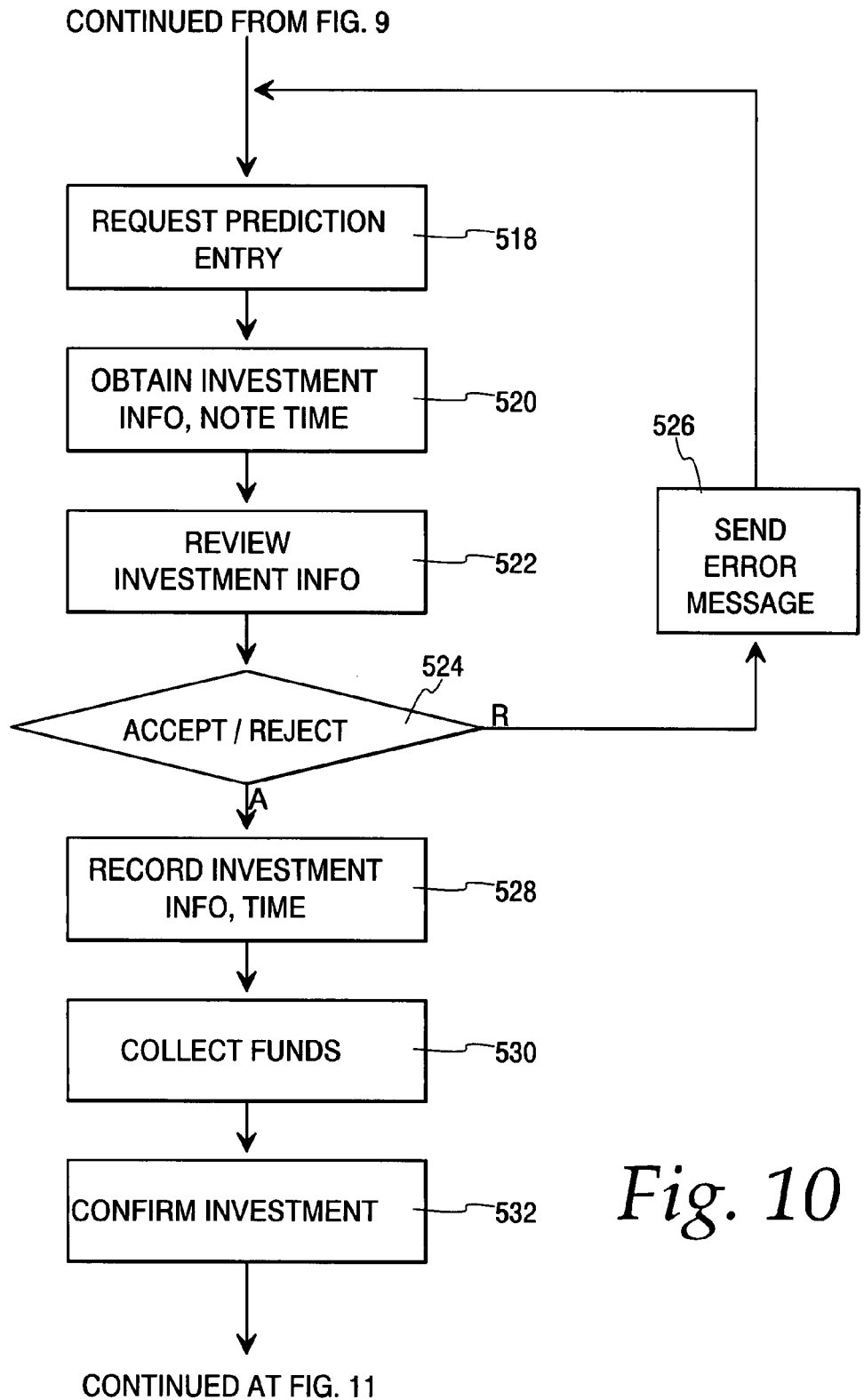

Referring to FIG. 10, in step 518 the prediction entry is requested from the participant. In the step, the participant provides information defining the investment to be made. After confirming the unique identity of the natural peril event, the participant declares the primary parameter information which, in one instance, comprises the location of the land strike predicted for the natural peril event. Thereafter, the participant declares any secondary parameters required by the rules of operation, such as the severity of the strike, and the strike duration, for example. In step 520, the prediction entry and other investment information is obtained from the participant and stored in one or more databases, for future reference. In one instance, the time at which the investment information is obtained is noted and stored along with the participant's investment data. In one instance, the amounts of payout or remuneration to a successful participant is weighted according to the amount of time between the investment transaction and occurrence of the event, with greater time durations being weighted more favorably, on the premise that later investments have the benefit of accumulated knowledge which will benefit the ability to predict occurrence of an event.

The investment information is reviewed in step 522 and judgment is made in step 524 as to whether the investment information is acceptable or not. If the investment information is rejected in step 524, control is passed to step 526 which sends an error message to the participant, passing control to step 518 to repeat the information gathering process. If desired, step 526 can cause relevant information to be offered or displayed to the participant to help raise the participant's level of skill in making a prediction. If desired, the participant can be asked to answer a number of questions relating to the skills involved in making a prediction for the particular natural peril event.

Assuming that the investment information is in the correct form and meets other automated criteria, control is passed to step 528 in which the investment information is recorded along with the current time. As mentioned, this information, and resulting decisions to authorize a participant may be as simple as receiving a favorable indication from an external credit entity, clearing house, or the like service. The system administrator has the option of determining at what point in the ongoing financial activity a participant is deemed to have completed the investment process for the purpose of determining the time difference between the investment and occurrence of the natural peril event. For example, the times noted in either steps 520 or 528 (or some other time if desired) can be used. As a further alternative, a system administrator may wish to defer appointing an investment time to the participant until monies for the transaction have been obtained from the participant. As a concession to the participant, the system administrator may provisionally appoint an investment time at an earlier step.

Figure 11:
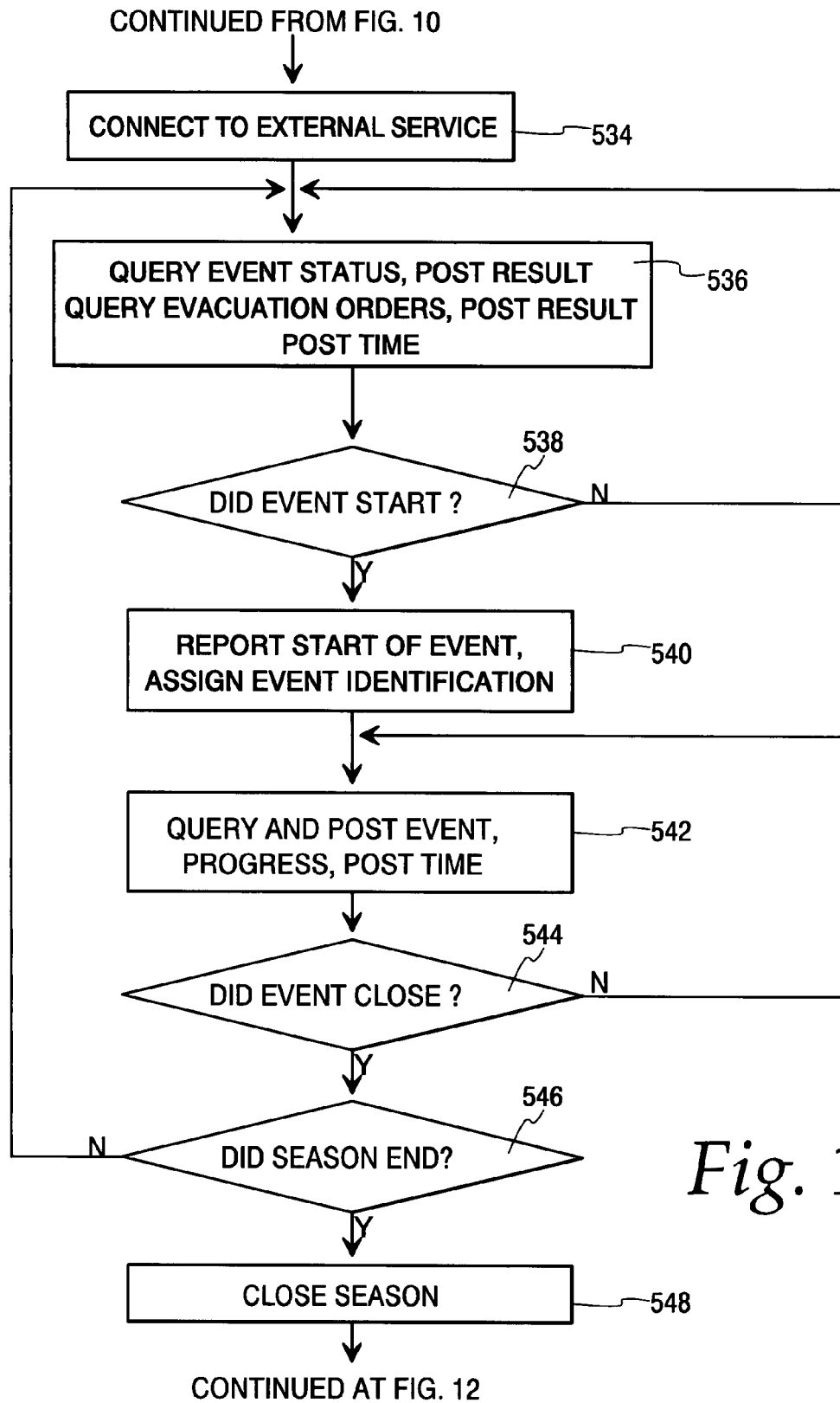

Assuming the investment information has been successfully obtained and recorded, control is passed to step 530 in which necessary monies are collected from the participant. If desired, the participant's ability to pay can be guaranteed before hand to eliminate any time delay at this point in the ongoing financial activity. Further, as mentioned above, these and other financial arrangements may be handled by an external agent or service, or may be otherwise provided for according to various regulatory bodies. In step 532, the participant's investment is confirmed by an entry to the summary screen 300, for example. With reference to FIG. 11, control is then passed to step 534 in which contact is made with an external objective independent information source that observes the natural peril event and manages information concerning the natural peril event and optionally, renders related decisions, such as assigning a severity level according to established scales of measure.

Generally speaking, it is preferred that the system administrator not be required to render decisions concerning occurrence of a natural peril event, such as primary and secondary event parameters. In one instance, a system administrator provides in the rules of operation that a financial activity will rely upon a designated external objective independent information source for information concerning the occurrence and characteristics and other parameters of natural peril events upon which investments are to be based. In step 534, connection to an external objective independent information source may be initiated or alternatively, data from the external objective independent information source previously obtained may be accessed for use by the financial activity. In step 536 updates to ongoing developments received from the external objective independent information source may be posted for the benefit of existing and prospective participants. In one instance, updates are made on an ongoing "live" basis, either with little or no time delay, or at a minimum, at a time prior to closing of a natural peril event.

In step 538, information from the external objective independent information source is queried to determine if the external objective independent information source has established start of a natural peril event of interest to the financial activity. If an event has not yet started, control is passed to step 536. When the external objective independent information source determines that an event has started, a unique identifier for the natural peril event is assigned and recorded to one more databases. In one instance, the unique identifier is thereafter associated with each investment by a participant concerning the natural peril event. In step 540, the start of the event is reported to the participants and the time of event starting as "officially" determined under rules of the system administrator is posted or otherwise made available to participants, and is recorded in one or more databases for possible future reference by the financial activity. In step 544, if the event has not yet closed, continuous updates regarding event progress are obtained and in one instance, are reported or otherwise made available to the participants.

Once an event has closed, control is passed to step 546 to determine if financial activity has ceased. In one example, the system administrator provides the rules of operation defining the starting and ending times for a financial activity season. This can be based upon an arbitrary date and time, or upon occurrence of a particular event, such as occurrence of the fourth, fifth, or sixth tropical cyclone since the season opened. In one instance, closing of one season may be followed by an immediate or delayed opening of a subsequent season. For example, a subsequent season can be declared by the system administrator to accommodate financial investments based upon occurrence of the fourth, fifth or sixth tropical cyclone occurring in a given hurricane season, as defined by the National Hurricane Center.

Figure 12:
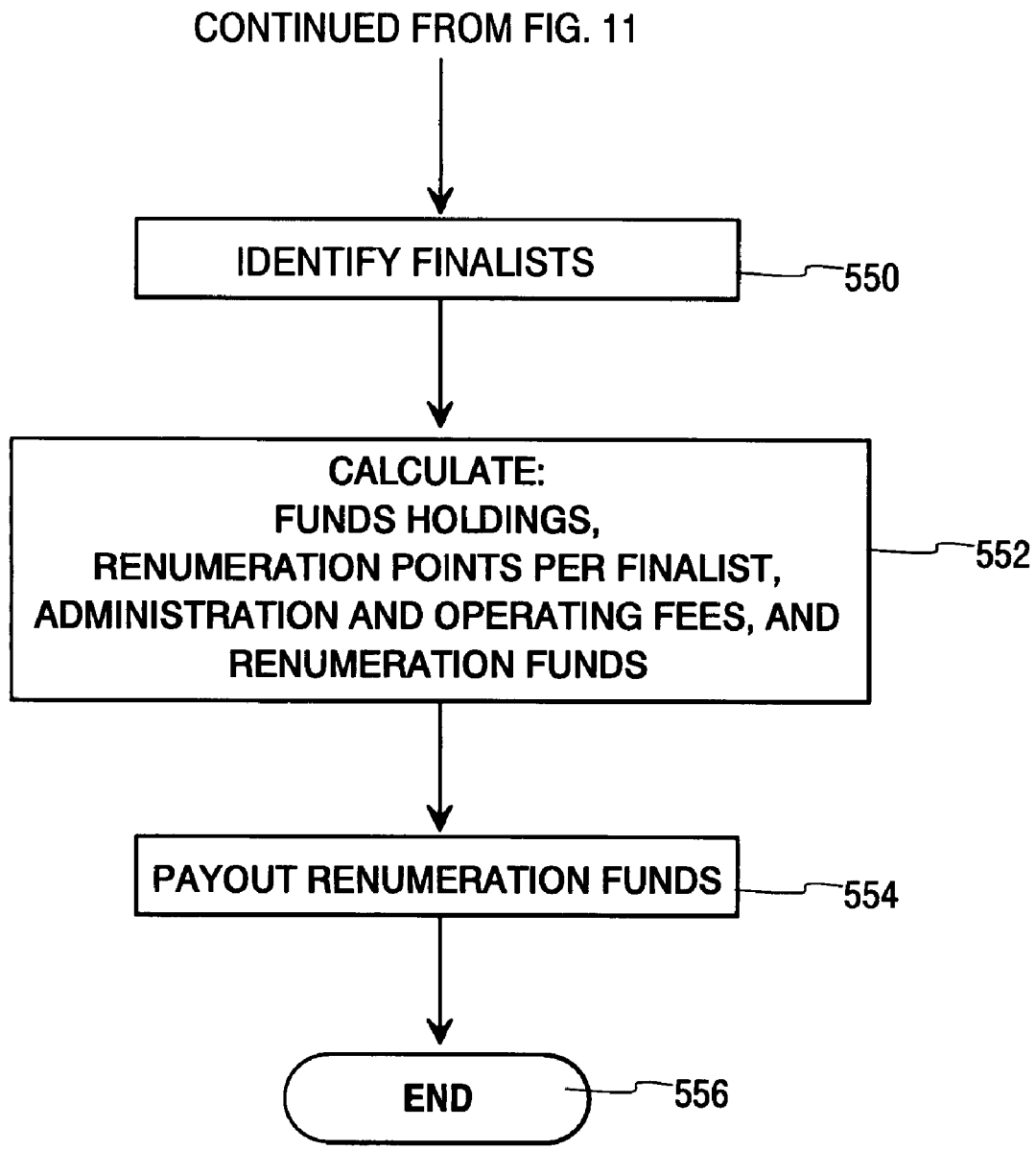

Referring to FIGS. 11 and 12, if it is determined in step 546 that a season has ended, the season of financial activity is closed in step 548 and accumulated data and other information is reviewed in step 550 to determine and identify the finalists which have made successful predictions concerning the natural peril event, as provided in the rules of operation for the financial activity. In step 552 a number of calculations are made in preparation for making payouts to the successful finalists. In one instance, calculations are made to determine the total holdings, the remuneration points per finalist, the administration and operating fees associated with conducting the financial activity, and the amounts of remuneration for each finalist. Remuneration points, in one instance, are based solely upon the primary parameter, which is preferably the strike location of the natural peril event. In another instance, remuneration points are determined not only by the strike location but by other natural peril event parameters, secondary or otherwise.

If desired, an additional outcome, called a "null" event may be defined for a financial activity. The null event is an investment choice made to participants, giving them the opportunity to invest in the possible outcome where there is no U.S. hurricane landfall in the current operating period, such as any number of different weather events, seasons or years. Participants investing in the null outcome, for example, may receive a return at the end of hurricane season or other operating period.

In one instance, a single primary parameter is defined by the system administrator in the system rules of operation. In another instance, one or more secondary parameters are also defined in the system rules of operation. In a further instance, secondary parameters are assigned a lesser weighting than the primary parameter. In any event, the primary and secondary parameters, if any, can have equal or unequal weighting, as may be desired. In one example, relating to hurricane events, location of the hurricane's strike is defined as a primary parameter, with time delay between the investment time and the time of the hurricane strike at the investment location being defined as a secondary parameter.

In one instance, the time delay secondary parameter is weighted less than the primary parameter. In another instance, severity of the natural peril event at the predicted location declared by a participant is defined as a tertiary parameter, and the secondary and tertiary parameters are assigned unequal weighting. Remuneration points may be determined according to a mathematical formula, algorithm, market prices or other operation which does not require human intervention at the time of execution. Thus, the formula, algorithm or other operation may be incorporated in an analog or digital electronic circuit or a hydraulic circuit, for example. If desired, and especially with financial activity providing a hedge against property losses, remuneration points may be determined, contingent upon or otherwise based upon confirmation of the participant's property interests.

In step 554 payouts are made to the successful participants, or finalists. In step 556 the financial activity is closed.

The steps or operations described herein are just exemplary. There may be many variations to these steps or operations without departing from the spirit of the invention. For instance, the steps may be performed in a differing order, or steps may be added, deleted, or modified.

In addition to the above, other types of activities are contemplated. As mentioned above, a participant may elect to contact a system administrator or other service provider to engage in a financial activity. Investments are paid into a system account to purchase financial investment units in the financial activity. Assuming a participant's activities are successful and perhaps if certain qualifications are met, payouts are made from the system account to the participant. Other types of transactions include, for example, financial investment units purchased in the course of the financial activity can either be uniquely assigned to a participating individual, or they can be made freely transferable. Accordingly, a financial activity may be organized such that either payouts must be made to the participant making the investment or payouts can be made to any individual possessing sufficient identification, such as an account number and password.

In either example, the investment positions are referred to herein as financial investment units or stakes, whether in the nature of a derivative holding or not, can be bought and sold between various parties, either with or without interaction with personnel associated with the financial activity. If desired, the aftermarket activity in financial investment units transfer can be offered by the operator of the financial activity as a service to members of the public. In any event, the financial activity, from investment to pay out would be carried out by operators of the financial activity. In another embodiment, financial activities can also be carried out between two or more participants, with the operator of the financial activity providing a service that facilitates financial interactions between the parties involved. Alternatively, the administrators of the financial activity may elect to engage a brokerage institution, exchange, or clearing organization, for example, to handle financial and related functions.

Variability Factors

Different factors affecting price and/or payout or settlement of the financial activity can be employed as an alternative to, or in combination with, market pricing that depends on market activity of the financial operation. By way of introduction, two considerations are contemplated in one instance, one relating to probability (e.g. one or more probabilities) and the other relating to a calendar or timing of events. In one instance, a price or cost variation in the purchase of a financial investment unit (or "stake") representing a quantification of a participant's financial involvement is provided. Other variability factors include numerical expressions, either continuous or discontinuous, of the impact, predicted impact or risk of an impact or degree of impact of a natural peril event.

In one instance, assuming a point in time before occurrence of a natural peril event, participants are able to invest in a financial activity at prices which are set by the financial activity provider, and which vary depending on time and/or on one or more probability factors. A first component of price variability, in one instance, keeps track of the timing of the investment. It should be borne in mind that investments can be made a long time (e.g. months) before a natural peril event, such as the time a hurricane would be likely to occur. One purpose of this variability factor (namely that of timing), is to encourage investments to be made earlier, rather than later. This variability factor, in effect, preferably operates as a price discount factor, although the variability factor could also be applied to payout distributions.

One or more probability assessments are preferably made at the time of a participant making an investment in the financial activity. One probability assessment preferably takes the form of a probability calculation based on current conditions, of the likelihood of a "hit," "successful outcome" or "qualification" that a participant's prediction will occur. For situations involving hurricane natural peril events, the price of a unit available for purchase by a participant at a given time is calculated based upon a probability that the county (or other geographical designation for a purchase unit) chosen by the participant will suffer a hurricane strike. If desired, probabilities can be based upon storms other than hurricanes and if desired the strength of the storm or other factor can be employed to alter the purchase price at any given time.

Related to probability-type variability factors are scales or indexes upon which a financial activity may be based, in whole or in part, in combination with other types of variability factors and other treatments considered herein. Scales can be employed to provide a basis for pricing, payout or other settlement of a financial activity. As will be discussed in greater detail below, scales can be based upon observed natural activity, as well as characterizations, measurements and other quantifications thereof. Thus, the scales may be used to introduce a certain measure of variability into the financial activity, which can be combined, if desired, with algorithms or other devices, as discussed herein. Scales, play a role in financial activities involving derivative securities interests, as where indexes are traded bilaterally or multilaterally, as discussed herein. Scales are usually termed "indexes" in this context.

As a further consideration, financial activities can take into account one or more conditional probabilities. The following example employs three stages of probabilities, with reference to one example of a natural peril event dealing with hurricane activity. It has been observed that the average number of hurricane landfalls on the U.S. in a given year is 1.7. This value is sufficient to define a Poisson distribution, according to conventional techniques, for numbers of U.S. landfalls, which yields a probability of 0.817 that at least one US landfalling hurricane will occur in a given year. Similarly, from this Poisson distribution, the conditional probability that there will be at least two US landfalling hurricanes, given that one has already occurred, is 0.620.

In one instance, financial investment units in later portions of the financial activity (held, for example, for subsequent natural peril events) can be priced more cheaply than earlier events according to conditional probabilities of K strikes, given that K−1 strikes have already occurred, so that, in addition, prices go up in subsequent events when an earlier event closes.

As mentioned, the financial activity, cited as an example of variability factors, incorporates three stages of probability assessment, with different probability treatments being given at each stage. Preferably, three probability treatments are applied to investment price, but could also be applied to payout distributions if desired. In a first stage of probability assessment, no storms or other precursors to hurricanes are in existence, and the first stage probabilities preferably are based on climatological relative frequencies.

Second stage probabilities are in play where at least one storm or other natural peril event exists in the field of interest (usually, a geographic area such as the Atlantic basin) but is far enough away from the area of interest (e.g., the coastline of the continental United States and adjacent coastlines) that no forecasts of imminent impact of the natural peril event, such as landfall, can be made. Preferably, for hurricane natural peril events, attention is paid at this stage to tropical depressions, and tropical cyclones such as hurricanes and to their location and tracks at sea. Preferably, in addition to the distance between the tropical depression and the area of interest, attention is paid to the historical tracks or paths of storms in previous years that subsequently made landfall in the area of interest.

In the third stage, occurrence of a natural peril event such as the imminent impact of the natural peril event (e.g. landfall of a hurricane) is officially recognized and preferably quantified as to its immanency. It is generally preferred that the existence of the third stage is declared, based upon an indication of an independent objective information source, such as the National Hurricane Center/Tropical Prediction Center. For example, a provider of a financial activity may look to the issuance of hurricane watches, and especially hurricane warnings from the National Hurricane Center (NHC) where a hurricane watch is issued when it is determined that hurricane conditions may threaten an area within 24 to 36 hours. At this point, preparations may be made for an imminent evacuation, if one is ordered. A hurricane warning is issued when hurricane conditions (i.e. maximum sustained wind speeds of 74 mph or more) are expected in a specified coastal area within 24 hours or less. Local government agencies make independent assessments and independently issue evacuation orders for people in the affected areas. Notification of these types of events to the financial activity provider can be used to close further participant activity, or alternatively to trigger a shift from stage two probability assessments to stage three probability assessments. The NHC forecasts go out 72 or 120 hours into the future, depending on the nature of the forecast product. It should be noted that in this scenario, the effect of stage three probability assessments is intentionally weakened by the calendar or the timing variability factor. Since the natural peril event is imminent, price discounts for unit purchases is preferably very low or nil. If desired, payout penalties can be assessed for stage three investments because of their close timing to occurrence of the natural peril event.

Considerations Regarding Pricing

In general, the pricing paid by participants of the financial activity is in one instance, based on the concept that the participants are given the option of investing more or less, as they may desire. It is preferred that this be implemented by offering the participants the ability to purchase investment positions in discrete quantities, generally referred to herein as "financial investment units." In some instances, depending on the financial activity, these financial investment units may be identified as shares or options. However, the present invention also contemplates financial activities where the amount of investment available to each participant is fixed, with the price for the fixed amount being either constant or changing throughout the financial activity.

In general, pricing may be held at a fixed level, or may vary throughout one or more portions, as well as the entirety of the financial activity. For example, operators of the financial activity may choose to vary price according to variability factors, such as those described herein (e.g. according to an algorithm or according to the timing of the investment). As a further alternative, pricing may vary in whole or in part according to market conditions, with pricing reacting to market activity. In such instances, the pricing may vary directly, in proportion to, or in some amount, but in the same general trend as, changes in market activity. Further, market activity can be characterized in a variety of ways, such as direct relation to the total number of units in play or in some proportional or nonproportional manner based on some aspect of market activity. Pricing and/or market activity may take into account "current" and "recent" market changes.

Examples of pricing methods are given herein, with reference to exemplary types of financial activity. It will be appreciated, however, that pricing methods can be readily adapted to other types of financial activities, as well. A detailed consideration of one type of pricing strategy will now be discussed.

Pari-Mutuel Market with Endogenous Prices

1. Introduction

Pricing operations are discussed for a pari-mutuel market relating to first hurricane landfalls. Other natural peril events could be chosen, as well. Included are a series of binary options for a set of mutually exclusive and collectively exhaustive events relating to the location of the next U.S. landfalling hurricane at one of 83 coastal segments (most are individual counties) spanning the U.S. east and Gulf coasts from the Mexican to Canadian borders. In the event that no further U.S. hurricane landfalls occur in a given hurricane season, an 84th event, termed "Null," is deemed to occur. However, the market structure is more general and could be used to support hedging and speculation in other contexts also.

This market allows participants to hedge or speculate on the first county where the next hurricane makes landfall in the U.S. by trading the options on an exchange, which will be a designated contract market under the Commodity Exchange Act. These instruments are commodity options—the commodity being defined in exchange rules to be where a hurricane will make landfall first. Under exchange rules, a market participant selects one of the 84 outcomes which the market participant fears (or believes, or both) will be the U.S. county where a hurricane will first make landfall. That market participant is "long" the county selected and "short" all the other counties. The market participant pays a premium reflecting this combined "call" on the county selected and "put" on all the other counties. The market participant can lose only the amount of the paid premium. If the hurricane makes landfall first in the county selected, the option holders for that county receive a pro-rata share of the combined proceeds from premia received and deposited with the exchange in a pari-mutuel pool, for all purchases for all counties in that option series. In other words, purchases of options in all 84 outcomes fund the payout to the holders of options for the county where the hurricane first makes landfall.

Subsequent to sales of "primary" options, as just described, a conventional bilateral bid/ask market in the options can also be supported. Both primary sales and this secondary market can operate simultaneously, even though the two will be linked to a degree.

2. Mathematical Exposition of the Market Structure

Mathematically, denote the dollar total in the pari-mutuel pool at a time t as $M_t$, and denote the number of options that have been purchased for county k at time t as $N_t^k$. When it has been determined which of the k=1, ..., 84 outcomes has occurred, the payout for each option held in county k is $$W_t^k = M_t/N_t^k, \text{ if the storm has first landfall at county } k \quad (13)$$
$$= 0, \quad \text{otherwise.}$$

If $t=\tau$, a time at which the landfall outcome (if any) is known, Equation 13 specifies the actual payout per option. At previous times, $t<\tau$, Equation 13 specifies the "indicative" payouts; that is, it indicates the payout that would be received if no further purchases were to be made in any of the outcomes, and outcome k were ultimately to occur.

A pari-mutuel market for hurricane landfalls in a given year begins in January, and may extend through the end of hurricane season, on 30 November. Because available information about the eventual location of the first hurricane landfall will change substantially during this period, it is not appropriate for the option prices to remain static. Rather, the prices are updated dynamically as such information changes, and in particular are determined in proportion to the (time-evolving) probabilities for each of the outcomes. A straightforward and natural measure for the probability of outcome k at any given time, as assessed in aggregate by the market, is the ratio of the premium risked (the price) to the potential reward (the indicative payout) per option, $$v_t^k = \frac{p_t^k}{W_t^k} = \frac{p_t^k N_t^k}{M_t}, \quad (14)$$

where $p_t^k$ is the price paid for an option in outcome k at time t.

Unfortunately, it is not feasible to use the market-assessed probabilities in Equation 14 for setting prices because of a circularity in definition: Equation 14 specifies market probability as a function of price, yet price is determined in proportion to probability. This difficulty is circumvented through the introduction of a set of pricing probabilities $\pi_t^k$, for the outcomes k at time t. These pricing probabilities are continually updated in a way that makes them "shadow" the market probabilities in Equation 14. Using these pricing probabilities $\pi_t^k$, prices are determined according to $$p_t^k = \pi_t^k c\exp[rj/365], \quad \pi_t^k > \beta \quad (15)$$
$$= \beta c\exp[rj/365], \quad \pi_t^k \le \beta,$$

where c is a constant dollar amount (perhaps c=$1000) called the "par" value; r is an annual interest rate reflecting time value of money, which is introduced in order not to penalize early investors; and j indicates the day of the year (e.g., j=1 for January 1, j=32 for February 1, etc.). Here $\beta$ is a minimum pricing probability, taken to be $\beta=0.0001$ in the simulations described below. The scaling constant c is called "par" because, if the pari-mutuel market is functioning smoothly, an investor purchasing an option for $p_t^k$ dollars can expect a payout in the neighborhood of c dollars if county k receives the first landfall.

Optionally, the payout given in Equation 13 can be modified to include a "floor", or guaranteed minimum payout to holders of options in the outcome that eventually occurs. In this case, Equation 13 is modified to yield $$W_t^k = \max(Fc, M_t/N_t^k), \text{ if the storm has first landfall at county } k, \quad (16)$$
$$= 0, \quad \text{otherwise.}$$

where the floor F is a guaranteed fraction of the par value, c. In this case, the prices in Equation 15 must be modified in order to be able to honor the floor guarantees, i.e., $$p_t^k = Fc, M_t/N_t^k \le Fc \quad (17)$$
$$= \pi_t^k c\exp[rj/365], M_t/N_t^k > Fc, \pi_t^k > \beta$$
$$= \beta c\exp[rj/365], M_t/N_t^k > Fc, \pi_t^k \le \beta.$$

Of course Equations 16 and 17 reduce to Equations 14 and 15, respectively, when there are no guarantees (F=0).

Before the market is opened, it must be "seeded" with a modest stake in each of the outcomes. This can be done on the basis of prior (in the case of the hurricane market, long-term climatological) probabilities $\pi_0^k$. An initial total pool $M_0$ is apportioned among the 84 outcomes consistent with Equations 14 and 15, so that $N_0^k = M_0/c$, equally for each of the k outcomes. The result is congruence between the initial market and pricing probabilities, $v_0^k = \pi_0^k$.

The pricing probabilities $\pi_t^k$, are updated each time a new purchase is made. The time index t in this updating process is not chronological time, but rather is incremented with each individual purchase, and so is equal at any moment to the total number of options that have been purchased in all counties:

$$t = \sum_k N_t^k. \quad (18)$$

Following each purchase of an individual option, the pricing probabilities for all of the outcomes are updated using an adaptive control algorithm:

$$\pi_t^i = \pi_{t-1}^i + \alpha_t^k \pi_{t-1}^k (1 - \pi_{t-1}^i), \quad i = k \qquad (19)$$

$$= \pi_{t-1}^i (1 - \alpha_t^k \pi_{t-1}^k), \qquad i \neq k.$$

Here the updated pricing probability $\pi_t^i$ at step t for outcome i depends on the pricing probability $\pi_{t-1}^k$ pertaining to the option in the outcome (k) that was most recently purchased (at the previous time, t−1). Accordingly, the first line of Equation 19 is used to update the pricing probability for the outcome k most recently purchased, and the second line is used to update pricing probabilities for all other outcomes. Here $\alpha_t^k$ is a small adjustment parameter, $0 = \alpha_t^k \ll 1$, that varies according to the state of the market, as described below. The effect of this updating procedure is that, for $\alpha_t^k > 0$, the pricing probability for the outcome in which the last purchase was made increases, and the pricing probabilities for the remaining outcomes decrease. The structure of Equation 19 ensures that the updated probabilities are coherent, i.e., $0 < \pi_t^i < 1$ for all outcomes i, and $\Sigma_i \pi_t^i = 1$.

For each new purchase, the adjustment parameter $\alpha_t^k$ is chosen according to the relationship between the pricing probability $\pi_{t-1}^k$ and the market probability $v_{t-1}^k$ (Equation 14) for the outcome k just purchased. In particular, $\alpha_t^k$ is chosen in order to move these two probabilities toward equality, allowing the pricing probabilities $\pi$ to track, or "shadow" the market probabilities v. Three cases can be distinguished:

Case I: $\pi_{t-1}^k > v_{t-1}^k$. Here the pricing probability for outcome k is too high relative to the aggregate market opinion from Equation 14. This condition can also be diagnosed from the relationship between the indicative payout and the par value (adjusted for time value of money), since $$\pi_{t-1}^k > v_{t-1}^k = \frac{\pi_{t-1}^k c \exp[rj/365]}{W_{t-1}^k},$$

so that $$W_{t-1}^k > c \exp[rj/365] \qquad (20)$$

That is, options for outcome k are overpriced if the indicative payout is greater than the (interest-adjusted) par value. For this case, increasing the pricing probability for outcome k would produce even greater separation between the pricing and market probabilities, so $\alpha_t^k = 0$ is used in Equation 19, and pricing probabilities for all of the outcomes are unchanged. Any further purchases in outcome k will reduce the indicative payout $W^k$ through increases in $N^k$, so that $v^k$ will rise toward $\pi^k$. Subsequent purchases in any outcome other than k will drive $\pi^k$ downward, toward $v^k$.

Case II: Market equilibrium where $\pi_{t-1}^k = v_{t-1}^k$. Here the market is in equilibrium before the purchase of the next option t for outcome k. This purchase will raise the market probability for this outcome, $v_t^k > v_{t-1}^k$, so the pricing probability $\pi_t^k$ should increase correspondingly. Explicit indication of outcome k using superscripts will be suppressed for notational simplicity). We wish to increase the pricing probability $\pi_t$, using Equation 19, to match the increase in $v_t$ resulting from the payout dilution for this outcome produced by the purchase of one additional option. Therefore, $$\pi_t = \pi_{t-1} + \alpha_t \pi_{t-1} (1 - \pi_{t-1}) \qquad (21)$$

$$= v_t$$

$$= \frac{\pi_{t-1} c \exp(rj/365)}{W_t}$$

$$= \frac{\pi_{t-1} c \exp(rj/365)(N_{t-1} + 1)}{M_{t-1} + \pi_{t-1} c \exp(rj/365)}$$

$$= \frac{\pi_{t-1} c \exp(rj/365)(N_{t-1} + 1)}{N_{t-1} c \exp(rj/365) + \pi_{t-1} c \exp(rj/365)}$$

$$= \frac{\pi_{t-1}(N_{t-1} + 1)}{N_{t-1} + \pi_{t-1}}.$$

Here use has been made of the fact that, because of the equilibrium at step t−1, $M_{t-1} = N_{t-1} c \exp(rj/365)$. Solving for the equilibrium adjustment parameter, $$\alpha_t = \left[ \frac{\pi_{t-1}(N_{t-1} + 1)}{N_{t-1} + \pi_{t-1}} - \pi_{t-1} \right] / [\pi_{t-1}(1 - \pi_{t-1})] \qquad (22)$$

$$= \frac{\pi_{t-1}[(N_{t-1} + 1) - N_{t-1} - \pi_{t-1}]}{\pi_{t-1}(1 - \pi_{t-1})(N_{t-1} + \pi_{t-1})}$$

$$= \frac{1}{(N_{t-1} + \pi_{t-1})}$$

$$\approx \frac{1}{N_{t-1}}.$$

Since, in all realistic cases $N_t \gg \pi_t$, the appropriate value for the adjustment parameter is $\alpha_t^k = 1/N_{t-1}^k$. Thus, an additional purchase moves prices relatively little if there are already a large number of options in existence for outcome k, but results in larger price changes if there are relatively few such options. Following the algebra in Equation 20, this condition can also be diagnosed from equality of the indicative payout and the (adjusted) par value.

Case III: $\pi_{t-1}^k < v_{t-1}^k$. Here the options for outcome k are under priced, and $\alpha_t^k$ should be chosen to adjust $\pi_t^k$ upward. Intuitively, this adjustment should be relatively modest ($\alpha_t^k \sim 1/N_{t-1}^k$) for $\pi_{t-1}^k \sim v_{t-1}^k$, and increase as the discrepancy between $\pi_{t-1}^k$ and $v_{t-1}^k$ increases, until a maximum value $\alpha_{max}$ is chosen corresponding to the maximum discrepancy between $\pi_{t-1}^k$ and $v_{t-1}^k$. This maximum discrepancy occurs for $W_{t-1}^k = Fc$. However, the specific form that the function for $\alpha$ should take between these two endpoints is not clear. Referring now to FIG. 43. two candidate pricing curves for specifying the parameter $\alpha$, in the range Fc=W=c are shown. FIG. 43 shows two candidate pricing curve functions, the consequences of which are explored through simulation in the next section. A value for $\alpha_{max}$ must also be chosen. When $N_{t-1}$ is small, so that $\alpha_{max} < 1/N_{t-1}$, then $\alpha_t = 1/N_{t-1}$.

In one example of financial activity according to principles of the present invention, equation 19 implements an adaptive control mechanism. Adaptive control here concerns the situation when the exact model of the controlled system is not known and has to be 'learnt on line' while controlling it. Further information regarding adaptive control mechanisms is given in: 1) K J Åström, B Wittenmark, Adaptive Control, Addison-Wesley, 1995 2) Narendra, K. S., and Balakrishnan, J. "Adaptive control using multiple models," IEEE Transaction on Automatic Control," February 1997, Volume: 42, Issue: 2 pp. 171-187 and 3) Bellman, R., and R. Kalaba, "On Adaptive Control," IRE Transactions on Automatic Control, November 1959, Volume: 4, Issue: 2, pp. 1-9.

Using first landfall of hurricanes as one example, it is preferred to use an adaptive algorithm that "learns" as it works, and reprices options in multiple regions according to probabilities that the market "believes" to reflect the landfall risks, which are themselves influenced by meteorological forecasts for hurricane activity. The adaptive control mechanism is preferred in a one-sided market, rather than a traditional bilateral market where there are both buyers and sellers. When changes in forecast information become available to the participants in this financial activity (such as updates providing for changes in a hurricane's potential landfall area, direction of movement, wind speed, strength, etc.), the pricing algorithm is able to react quickly to the resulting changes in investment positions as selected by the participants. For example, as a hurricane becomes closer to landfall, the algorithm reacts to relatively higher buying levels for the now-more-likely outcomes, by raising prices to appropriate new levels for those outcomes. Otherwise, earlier investors in those outcomes will be disadvantaged as later buyers with better or more recent information, to extract value from those early investors by buying more cheaply into a given location than is justified. This type of monitor is not preferred in bilateral markets because, when information changes such that an asset has more value than before, potential sellers will hold out for higher (new) prices rather than settling for the lower (old) price.

Optionally, in another variation, the adjustment parameter alpha in Equation 19 could be defined as a decreasing function of the number of options, Nk, that have been previously purchased in county k. In one implementation, since Equation 22 shows that alpha should decrease in inverse proportion to Nk, alpha would be defined as the quotient of a fixed constant divided by Nk. This fixed constant is chosen to be larger than 1 (the value implied by Equation 22), in order for the resulting prices to be able to respond quickly to deviations from market equilibrium, such as might be brought on by changes in meteorological circumstances that would make some counties more likely, and some counties less likely, targets than previously.

3. Simulation Example

This section describes stochastic simulations of the pari-mutuel hurricane market, using the 2004 hurricane season through the first landfall of Hurricane Charley, as an example. That is, the 2004 hurricane season is simulated many times, using different random but conceptually reasonable sequences of investments in the various counties. Charley formed in the eastern Caribbean, and tracked south of Jamaica and over western Cuba before making landfall on the west coast of Florida, at Lee county, on 13 August.

The overall flow of money into the pari-mutuel pool is taken as the fixed but plausible sequence shown in Table 4 (see FIG. 46), with figures in millions. Here it is assumed that the initial seeding is $2M, averaging about $25K per each of the 84 outcomes. Table 4 specifies strong investment interest from January through mid-February, with a relative lull until May, and then an increase again near the beginning of hurricane season on 1 June. During the hurricane season, investment interest increases beginning on 31 July. The tropical depression that becomes hurricane Alex materializes on 31 July, but does not make landfall. The tropical depression that will become tropical storm Bonnie first appears on 3 August. The tropical depression that will become hurricane Charley first appears on 9 August. The dollar total in the pool when closed by the approach of Hurricane Charley on 12 August is $2B, of which about ⅓ has been invested before the beginning of hurricane season on 1 June, and ⅔ during hurricane season.

This assumed daily sequence of dollar flows is a very challenging one for the algorithm, on two counts. First, the initial seeding is very light relative to the funds coming into the pool during the first two weeks, so that substantial price volatility is expected. Second, 45% of the eventual $2B pours into the fund during the last two days in response to the imminent landfall of Hurricane Charley. These new purchases are concentrated in counties on the west coast of Florida, so the internal market probabilities v must respond very quickly to the event if the eventual payout $W_\tau$ at Lee county is to be maintained near the par value.

The simulation time step is once daily, meaning that during hurricane season only one of the 6-hourly NHC advisories is used to forecast the meteorological risks of first landfall. From 31 July through 2 August these are for Alex, from 3 August through 8 August these are for Bonnie, and for 9 August through 12 August these are for Charley. For each simulated 2004 season, the dollars specified for each day in Table 4 are allocated to the 84 outcomes according to a combination of meteorological risks and random factors. Specifically, let D(j) be the dollars invested over the entire pool on day j, from the middle column in Table 4. Define $g_k(j)$ to be the random relative allocation of D(j) to county k on day j, so that the money invested in county k on day j is $$m_k(j) = \frac{g_k(j)}{\sum_{i=1}^{84} g_i(j)} D(j). \tag{23}$$

The random relative allocations $g_k(j)$ are gamma-distributed random variables, with mean $$\mu_k(j) = \omega_k(j), \tag{24}$$

where $\omega_k(j)$ is the forecast probability for county k on day j. The gamma distributions from which the relative dollar allocations $g_k(j)$ are drawn have common coefficient of variation (i.e., standard deviation divided by mean) CV=½, which is independent of both time and county. The result is that simulated investments in counties exhibiting stronger (mean) buying interest on a given day will be more variable from run to run of the simulation. This effect is especially strong during the last few days of the simulation, in which the $\omega_k(j)$ are relatively large for the counties on the west coast of Florida.

Having defined the dollar allocations on each day, the numbers of options bought for each of the 84 outcomes are determined using the mathematics in Section 2. For the specific results reported here, fixed values are taken for the parameters F=0.5, r=0.05, and β=0.0001. The effects of each of the pricing curves labeled "full logistic" and "half logistic" in FIG. 43 are investigated, using values of $\alpha_{max}$ ranging from 0.00001 through 0.005. In addition, three levels of overall buying volume are simulated through variation in the par value. For c=$1000 relatively large ($\tau$~1.8×10$^8$) numbers of options are purchased overall in a given simulated year. An order of magnitude fewer ($\tau$~1.8×10$^7$) options are purchased for c=$10000; and still fewer ($\tau$~1.8×10$^6$) are needed when and c=$10000 but all the dollar amounts in Table 4 reduced by a factor of 10. For each combination of parameter values, 100 simulated years are calculated.

In order to induce disequilibrium in the simulated market, options are bought in lots, rather than individually, even though prices are recalculated after each individual purchase, as per Equation 19. After random allocation of the day's investment dollars to each county using Equations 21 and 22, the number of options that could be purchased for each county are calculated, using prices for the end of the previous day. The lot size for each county for the upcoming day is then 1/50 of the median of these numbers of options. Having chosen this lot size for the day, the simulation program randomly chooses among the counties for which the day's dollars have not yet been exhausted, and buys one lot. The result is that counties that have a relatively small random dollar allocation for the day are finished early, so that toward the end of a simulated day the buys are concentrated in the few counties with relatively large random allocations. This procedure simulates the effect of a few large players investing large sums into those counties with the larger random allocations for the day.

Figure 44:
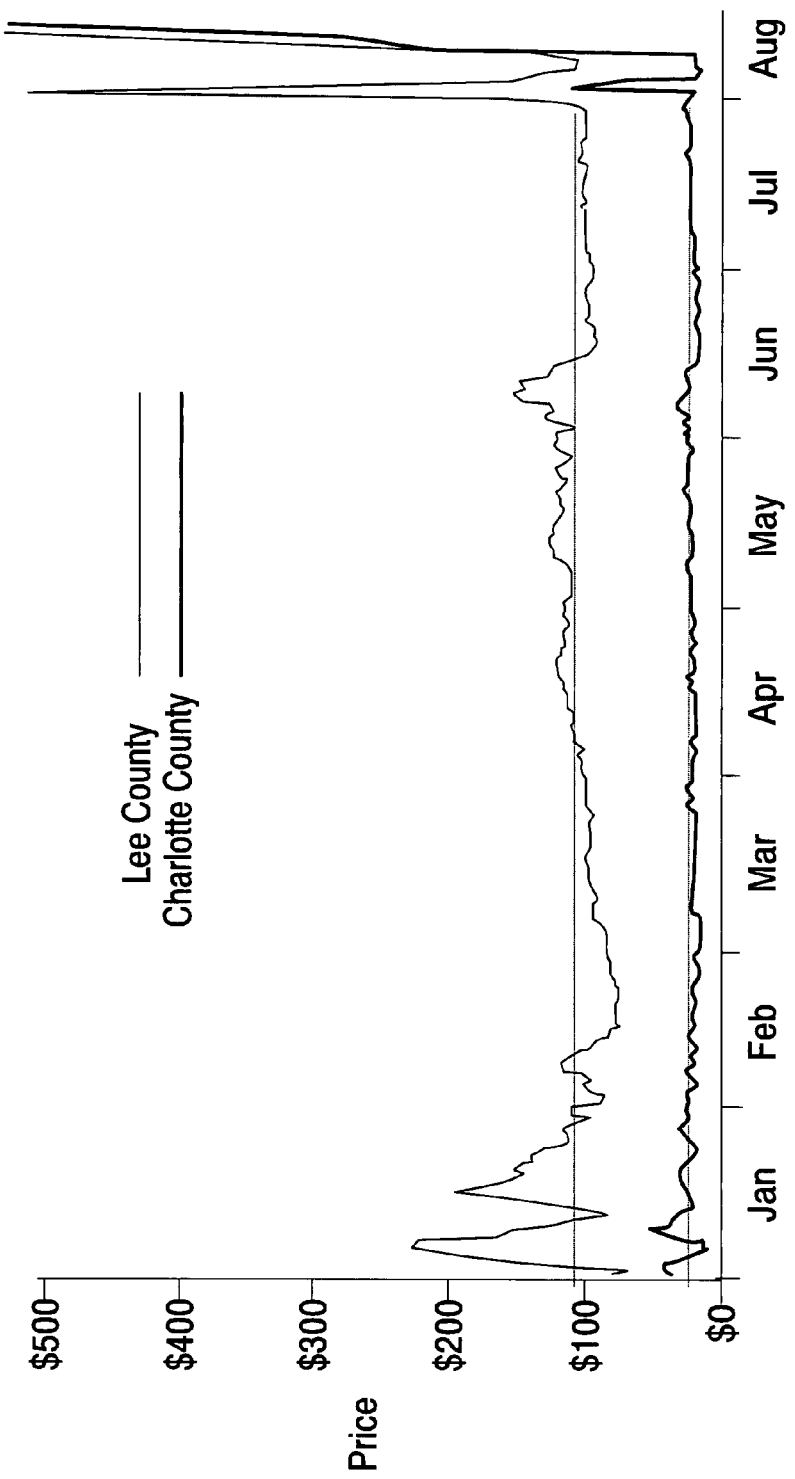
FIG. 44 shows an exemplary time series of prices for an exemplary study.

Referring now to FIG. 44, an example time series of prices for Lee county, and the adjacent but smaller Charlotte county, are shown for one model realization of the pari-mutuel market. Horizontal dash-dot lines through 30 July indicate the product of the respective forecast probabilities $\omega$ and the par value of c=$10,000 ($\tau$~1.8×10$^7$), toward which the market prices should move as they recover from random perturbations during this time period. January volatility results from the initial seeding being small relative to the large sequence of early investments. Large price increases in mid-August reflect the large sums being invested in counties on the west coast of Florida as Charley approaches. Prices for the final two days are offscale, and are not plotted for clarity in showing the rest of the time series. The half-logistic pricing curve with $\alpha_{max}$=0.0005 has been used.

FIG. 44 shows time series of prices for one of the 100 realizations produced with c=$10,000 ($\tau$~1.8×10$^7$), using the half-logistic pricing curve with $\alpha_{max}$=0.0005. Prices are shown for Lee county (red), and the adjacent but smaller Charlotte County (black). The dash-dot lines indicate the levels, given by the product $\omega$c, toward which the prices should move as they recover from random perturbations, during the period 1 January through 30 July. Appreciable price volatility is evident in January as the market responds to the very large sums, relative to the small initial seeding, that are invested during that time. Subsequently, until the meteorological probabilities $\omega$ change on 31 July, these internally generated market prices correctly track the levels that they should move toward (given the dollar allocations specified by Equations 21 and 22), confirming the stability of the internal pricing mechanism described above.

Figure 45B:
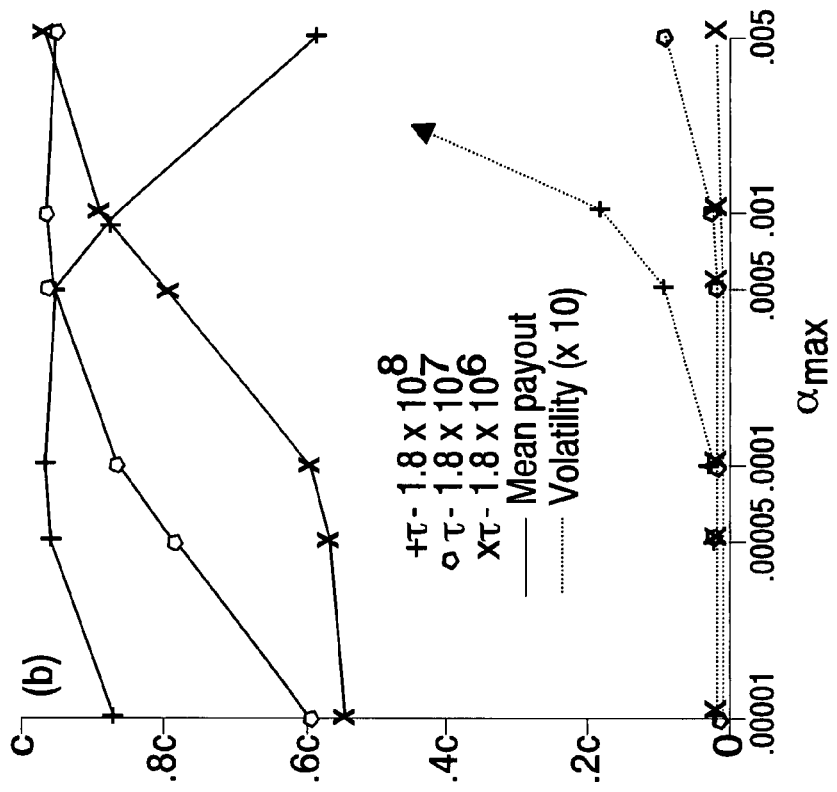
FIGS. 45(a) and 45(b) show average payouts and price volatility for a particular study.
Figure 45A:
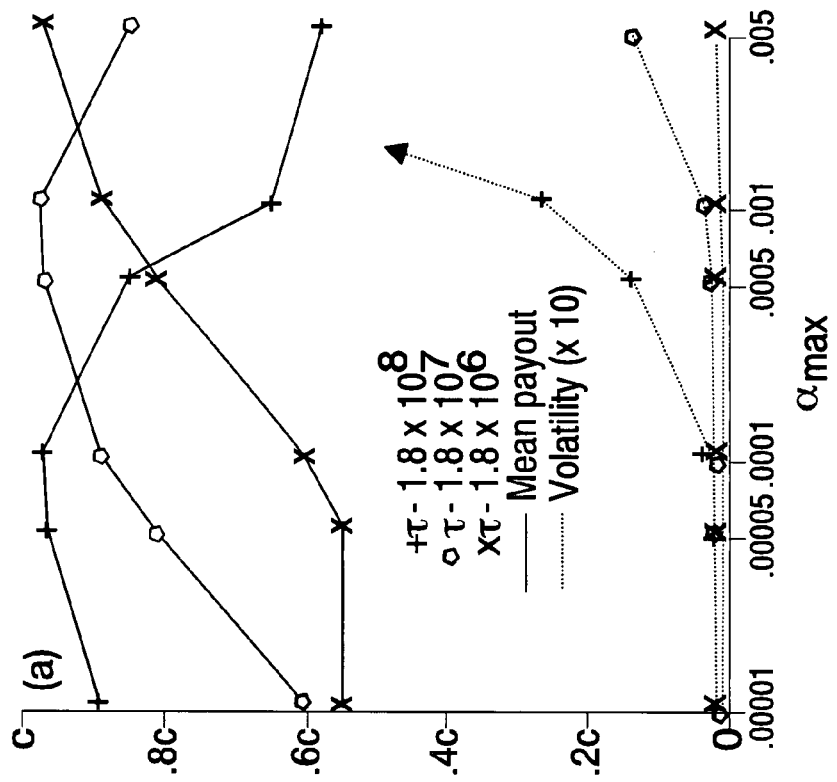

FIG. 45 shows average payouts and price volatility for Lee county, using (a) the full logistic, and (b) the half logistic pricing curves from FIG. 43; as functions of the adjustment parameter $\alpha_{max}$. Volatility is calculated as the standard deviation of end-of-day prices between 11 January and 30 July, averaged over the 100 realizations for each parameter combination. Parameter combinations for which the average payouts (solid lines) are near the par value reflect good functioning of the market. Values of $\alpha_{max}$ that are too small result in average payouts that are unacceptably small, as a result of prices not adjusting sufficiently quickly to the large flux of money into the market during the last two simulated days. Reduced average payouts for large values of $\alpha_{max}$ reflect price increases that are too strong, with the result that prices for other counties decrease too much, allowing payout dilution. Not surprisingly, volatility (dashed lines) increases monotonically with increases in $\alpha_{max}$. Therefore, the optimal $\alpha_{max}$ appears to be a compromise between prices responding quickly enough to maintain payouts near par, versus responding slowly enough to suppress excessive price volatility.

Referring now to FIG. 45, average payouts (solid) and volatility (dashed) for Lee County, are shown using (a) the full logistic, and (b) the half-logistic pricing curves shown in FIG. 42, as functions of the adjustment parameter $\alpha_{max}$. All quantities are expressed as a fraction of the par value, c.

The simulated market responses to the two pricing curves from FIG. 43 are similar, but overall results for the half-logistic pricing curve (FIG. 45b) exhibit lesser sensitivity to choice of $\alpha_{max}$, and lower price volatility overall. Both panels in FIG. 45 exhibit a dependence of market response on the overall volume, $\tau$, suggesting that a better pricing curve than either of the two shown in FIG. 43 could probably be found. However, these results indicate that choosing the half-logistic pricing curve together with $\alpha_{max}$=0.0005 yields a market that behaves well over a wide range of possible conditions.

In these simulations, threatened breaches of the payout floor Fc, requiring implementation of the first line of Equation 17 for pricing, occurred only in the first 2 weeks of the simulated years, or during the last few days. For the most part, parameter combinations yielding average payouts within 80% to 85% of par exhibited few or no such threatened breaches in August. Between these two difficult times, the simulated market was well able to adjust internally to the day-to-day variations in the amounts invested and their relative random allocations among the counties.

The price volatility and threatened floor breaches occurring very early in the simulations are nearly unavoidable given the relatively quite small initial seeding of the market. Clearly these would be smaller if early investment interest is not as large as assumed here, and of course could be reduced by seeding the pool with a larger initial sum. However, a less costly and likely more profitable approach would be for the seeding agency to monitor early market performance closely, and act to suppress the price volatility that leads to threatened floor breaches by buying the most under priced counties. Stability could be ensured in this way through purchase of relatively few of the 84 outcomes, and at prices that would be very favorable relative to their eventual expected payouts.

Application of Pari-Mutuel Market With Endogenous Prices to First Hurricane Landfalls 4.1. Introduction Operation of a pari-mutuel market involving another series of binary options for a set of mutually exclusive and collectively exhaustive events is discussed. This operation is similar in some ways to the operations set out in Section 1 above, but presents the operator of the financial activity with a number of different options. These events also relate to the location of the next U.S. landfalling hurricane at one of 83 coastal segments (most are individual counties) spanning the U.S. east and Gulf coasts from the Mexican to Canadian borders. In the event that no further U.S. hurricane landfalls occur in a given hurricane season, an 84th event, termed "Null," is deemed to occur.

The market structure herein is also more general and could be used to support hedging and speculation in other contexts. For example, this market structure allows participants to hedge or speculate on the first county where the next hurricane makes landfall in the U.S. by trading the options on an exchange, which will be a designated contract market under the Commodity Exchange Act. These instruments are commodity options—the commodity being defined in exchange rules to be where a hurricane will make landfall first.

Under exchange rules, a market participant selects one of the 84 outcomes which the market participant fears (or believes, or both) will be the U.S. county where a hurricane will first make landfall. That market participant is "long" the county selected and "short" all the other counties. The market participant pays a premium reflecting this combined "call" on the county selected and "put" on all the other counties. The market participant can lose only the amount of the paid premium. If the hurricane makes landfall first in the county selected, the option holders for that county receive a pro-rata share of the combined proceeds from premia received and deposited with the exchange in a pari-mutuel pool, for all purchases for all counties in that option series. In other words, purchases of options in all 84 outcomes fund the payouts to the holders of options for the county where the hurricane first makes landfall.

Additionally, a "floor" on the payout to option holders in the affected county can be supported, which is expected to be especially appealing to retail investors who would enter the market to hedge against actual property- and other storm-related losses. Under this mechanism, a participant's hedge against hurricane landfall in a particular county can be guaranteed a minimum monetary return, conditional on landfall in that county, which amount would be specified at the time of the investment. The pricing algorithm is structured such that the pari-mutuel payouts, including these conditional guarantees, are entirely self-funded, so that the exchange assumes no risk.

Subsequent to sales of "primary" options, as just described, a conventional bilateral bid/ask market in the options can also be supported. Both primary sales and this secondary market can operate simultaneously, even though the two will be linked to a degree.

4.2. Mathematical Exposition of the Market Structure

The dollar total in the pari-mutuel pool at a time t is denoted as $M_t$, and the number of options that have been purchased for county k at time t are denoted as $N^k_t$. Upon been determination of which of the 84 outcomes has occurred, the payout for each option held for that outcome is $$W^k_t = M_t/N^k_t, \text{ if the storm has first landfall at county } k \quad (25)$$
$$= 0, \quad \text{otherwise.}$$

If t=τ, a time at which the landfall outcome (if any) is known, Equation 25 specifies the actual payout per option. At previous times, t<τ, Equation 25 specifies the "indicative" payouts; that is, it indicates the payout that would be received if no further purchases were to be made in any of the outcomes, and outcome k were ultimately to occur.

A pari-mutuel market for hurricane landfalls in a given year begins in January, and may extend through the end of hurricane season, on 30 November. Because available information about the eventual location of the first hurricane landfall will change substantially during this period, it is not appropriate for the option prices to remain static. Rather, the prices are updated dynamically as such information changes, and in particular as market activity adjusts to the changing information, as reflected by a set of time-evolving "pricing probabilities" $\pi^k_t$ for the outcomes k at time t. FIG. 41, discussed below, shows an example of a display of such information to an investor, along with other data. These pricing probabilities are continually updated in a way that makes them converge toward, or "shadow," the aggregate market opinion of the outcome probabilities, according to an algorithm that will be described shortly. Using these pricing probabilities $\pi^k_t$, prices are determined according to $$p^k_t = \pi^k_t c\exp[rj/365], \; \pi^k_t > \beta \quad (26)$$
$$= \beta c\exp[rj/365], \; \pi^k_t \le \beta,$$

where c is a constant dollar amount (perhaps c=$1000) called the "par" value; r is an annual interest rate reflecting time value of money, which is introduced in order not to penalize early investors; and j indicates the day of the year (e.g., j=1 for January 1, j=32 for February 1, etc.). Here β is a minimum pricing probability, taken to be β=0.0001 in the simulations described below. The scaling constant c is called "par" because, if the pari-mutuel market is functioning smoothly, an investor purchasing an option for $p^k_t$ dollars can expect a payout in the neighborhood of c dollars if county k receives the first landfall.

Optionally, the payout given in Equation 25 can be modified to include a "floor", or guaranteed minimum payout to holders of options in the outcome that eventually occurs. In this case, Equation 25 is modified to yield $$W^k_t = \max(Fc, M_t/N^k_t), \text{ if the storm has first landfall at county } k, \quad (27)$$
$$= 0, \quad \text{otherwise.}$$

where the floor F is a guaranteed fraction of the par value, c. In this case, the prices in Equation 26 must be modified in order to be able to honor the floor guarantees, i.e., $$p^k_t = \pi^k_t c\exp[rj/365], M_t/N^k_t > Fc, \pi^k_t > \beta \quad (28)$$
$$= \beta c\exp[rj/365], M_t/N^k_t > Fc, \pi^k_t \le \beta$$
$$= Fc, M_t/N^k_t \le Fc.$$

Of course Equations 27 and 28 reduce to Equations 25 and 26, respectively, when there are no guarantees (F=0).

Before the market is opened, it must be "seeded" with a modest stake in each of the outcomes. This can be done on the basis of prior (in the case of the hurricane market, long-term climatological) probabilities $\pi^k_0$. An initial total pool $M_0$ is apportioned among the 84 outcomes consistent with the initial pricing probabilities quantifying the risk, given by the ratio of price to indicative payout, $$\pi^k_0 = \frac{p^k_0}{W^k_0} = \frac{\pi^k_0 cN^k_0}{M_0}. \quad (29)$$

Thus, $N^k_0 = M_0/c$, equally for each of the k outcomes.

The pricing probabilities $\pi^k_t$, are updated each time a new purchase is made. The time index t in this updating process is not chronological time, but rather is incremented with each individual purchase, and so is equal at any moment to the total number of options that have been purchased in all counties:

$$t = \sum_k N_t^k. \tag{30}$$

Following each purchase of an individual option, the pricing probabilities for all of the outcomes are updated using a variant of the Robbins-Monro stochastic approximation algorithm:

$$\pi_t^i = \pi_{t-1}^i + \alpha_t^k \pi_{t-1}^k (1 - \pi_{t-1}^i), \quad i = k \tag{31}$$
$$= \pi_{t-1}^i (1 - \alpha_t^k \pi_{t-1}^k), \quad i \neq k.$$

This is an adaptive control mechanism, in which the aggregate of market opinion regarding (the possibly time-evolving) probabilities for each of the possible outcomes is learned in response to the sequence of purchases made by market participants. Here the updated pricing probability $\pi_t^i$ at step t for outcome i depends on the pricing probability $\pi_{t-1}^k$ pertaining to the option in the outcome (k) that was most recently purchased (at the previous time, t−1). Accordingly, the first line of Equation 31 is used to update the pricing probability for the outcome k most recently purchased, and the second line is used to update pricing probabilities for all other outcomes. Here $\alpha_t^k$ is a small adjustment parameter, $0 < \alpha_t^k \ll 1$, that varies according to the state of the market, as described below. The effect of this updating procedure is that the pricing probability for the outcome in which the last purchase was made increases, and the pricing probabilities for the remaining outcomes decrease. The structure of Equation 31 ensures that the updated probabilities are coherent, i.e., $0 < \pi_t^i < 1$ for all outcomes i, and $\Sigma_i \pi_t^i = 1$.

For each new purchase, the adjustment parameter $\alpha_t^k$ is inversely proportional to the number of options previously purchased in that outcome, $$\alpha_t^k = \frac{H}{N_t^k}. \tag{32}$$

If few options have been bought previously, then an additional purchase will move prices relatively more than if many options are already in existence. Section 4.4 below shows that, if the market is in equilibrium, H=1 in Equation 32. However, in practice one should choose H>1 in order for prices to be able to respond quickly to deviations from market equilibrium, such as might be brought on by changes in external information (e.g., the meteorological situation) relevant to the market. Simulations indicate that 30=H=40 produce a smoothly operating market with relatively small price volatility.

4.3. Simulation Example

This section describes stochastic simulations of the pari-mutuel hurricane market, using the 2004 hurricane season through the first landfall of hurricane Charley as an example. That is, the 2004 hurricane season is simulated many times, using different random but conceptually reasonable sequences of investments in the various counties. Charley formed in the eastern Caribbean, and tracked south of Jamaica and over western Cuba before making landfall on the west coast of Florida, at Lee county, on 13 August.

The overall flow of money into the pari-mutuel pool is taken as the fixed but plausible sequence shown in Table 5, with figures in millions. Here it is assumed that the relatively small initial seeding is $2M, averaging about $25K per each of the 84 outcomes. Table 5 specifies strong investment interest from January through mid-February, with a relative lull until May, and then an increase again near the beginning of hurricane season on 1 June. During the hurricane season, investment interest increases beginning on 31 July. The tropical depression that becomes hurricane Alex materializes on 31 July, but does not make landfall. The tropical depression that will become tropical storm Bonnie first appears on 3 August. The tropical depression that will become hurricane Charley first appears on 9 August. The dollar total in the pool when further investment in this option series is closed by the approach of Hurricane Charley on 12 August is $2B, of which about ⅓ has been invested before the beginning of hurricane season on 1 June, and ⅔ during hurricane season.

This assumed daily sequence of dollar flows is a very challenging one for the pricing algorithm, on two counts. First, the initial seeding is very light relative to the funds coming into the pool during the first two weeks, so that substantial price volatility is expected initially. Second, nearly a quarter of the eventual $2B pours into the fund during the last two days in response to the imminent landfall of hurricane Charley. These new purchases are concentrated in counties on the west coast of Florida, so the pricing probabilities must respond very quickly to the event if the eventual payout $W_\tau$ at Lee county is to be maintained near the par value.

The simulation time step is once daily, meaning that during hurricane season only one of the 6-hourly NHC advisories is used to forecast the meteorological risks of first landfall. From 31 July through 2 August these are for Alex, from 3 August through 8 August these are for Bonnie, and for 9 August through 12 August these are for Charley. For each simulated 2004 season, the dollars specified for each day in Table 5 are allocated to the 84 outcomes according to a combination of meteorological risks and random factors. Specifically, let D(j) be the dollars invested over the entire pool on day j, from the middle column in Table 5. Define $g_k(j)$ to be the random relative allocation of D(j) to county k on day j, so that the money invested in county k on day j is $$m_k(j) = \frac{g_k(j)}{\sum_{i=1}^{84} g_i(j)} D(j). \tag{33}$$

The random relative allocations $g_k(j)$ are gamma-distributed random variables, with mean $$\mu_k(j) = \omega_k(j), \tag{34}$$

where $\omega_k(j)$ is the forecast probability for county k on day j. The gamma distributions from which the relative dollar allocations $g_k(j)$ are drawn have common coefficient of variation (i.e., standard deviation divided by mean) CV=½, which is independent of both time and county. The result is that simulated investments in counties exhibiting stronger (mean) buying interest on a given day will be more variable from run to run of the simulation. This effect is especially strong during the last few days of the simulation, in which the $\omega_k(j)$ are relatively large for the counties on the west coast of Florida.

Having defined the dollar allocations on each day, the numbers of options bought for each of the 84 outcomes are determined using the mathematics in Section 4.2. For the specific results reported here, fixed values are taken for the parameters F=0.5, r=0.05, and β=0.0001. The parameter H, controlling the step size in the adaptive control of prices, is varied through the range 1-100. In addition, four levels of overall buying volume are simulated through variation in the par value. For c=$100 a very large ($\tau$~$1.8\times10^9$) number of options is purchased overall in a given simulated year. An order of magnitude fewer ($\tau$~$1.8\times10^8$) options are purchased for c=$1000; and still fewer ($1.8\times10^7$ and $1.8\times10^6$) are needed when and c=$10,000 and $100,000, respectively. For each combination of parameter values, 100 simulated years are calculated.

Simulated option purchases are made in lots, rather than individually, even though prices are recalculated after each individual purchase, as per Equation 31. After random allocation of the day's investment dollars to each county using Equations 33 and 34, the number of options that could be purchased for each county are calculated, using prices for the end of the previous day. The lot size for each county for the upcoming day is then 1/50 of the median of these numbers of options. Having chosen this lot size for the day, the simulation program randomly chooses among the counties for which the day's dollars have not yet been exhausted, and buys one lot. The result is that counties that have a relatively small random dollar allocation for the day are finished early, so that toward the end of a simulated day the buys are concentrated in the few counties with relatively large random allocations. This procedure simulates the effect of a few large market participants investing large sums into those counties with the larger random allocations for the day.

FIG. 44 shows a time series of prices for one of the 100 realizations produced with c=$1000 ($\tau$~$1.8\times10^8$), using H=30. Prices are shown for Lee county, and the adjacent but smaller Charlotte County. The dash-dot lines indicate the levels, given by the product $\omega c$, toward which the prices should move as they recover from random perturbations, during the period 1 January through 30 July. Appreciable price volatility is evident in January as the market responds to the very large sums, relative to the small initial seeding, that are invested during that time. Subsequently, until the meteorological probabilities ($\omega$=0.0106 for Lee county, and $\omega$=0.0021 for Charlotte county) change on 31 July, these internally generated market prices correctly track the levels that they should move toward (given the random dollar allocations specified by Equations 33 and 34), confirming the stability of the internal pricing mechanism described in Section 4.2. Similarly, on the final two days of the simulation, the respective meteorological probabilities for Lee and Charlotte counties are approximately 0.11 and 0.04, and the prices adjust quite rapidly to levels consistent with these values. Importantly, the pricing algorithm is able to recover from the initial volatility that arises because of the very thin initial seeding, and converge toward the simulated market consensus "opinion," even though that is masked by considerable randomness in the allocation of investments among the counties. The initial volatility could be reduced by a larger initial seeding of the market, but this example emphasizes the robustness of the pricing adaptation algorithm in Equation 31. This initial volatility could also be reduced by introducing a ceiling on the parameter $\alpha$, although probably at the expense of a more frequent need to invoke the payout floor protection (third line of Equation 28).

FIG. 44 shows a time series of prices for Lee county, and the adjacent but smaller Charlotte county, during one model realization of the pari-mutuel market. Horizontal dash-dot lines through 30 July indicate the product of the respective forecast probabilities $\omega$ and the par value of c=$1000 ($\tau$~$1.8\times10^8$), toward which the market prices should move as they recover from random perturbations during this time period. January volatility results from the initial seeding being small relative to the large sequence of early investments. Large price increases in mid-August reflect the large sums being invested in counties on the west coast of Florida as Charley approaches. H=30 has been used in Equation 32.

Table 6 shows the effect on market performance of different choices for the parameter H, in connection with different overall levels of market volume (controlled by different choices for the par, c). Tabulated are average returns for Lee county, as a fraction of par, and standard deviation of these returns over 100 simulated years, although similar results are obtained for the other counties also. Defining the adjustment parameter a in Equation 31 as being inversely proportional to $N^k$ results in similar average returns for a given value of H, regardless of the level of overall volume. In contrast, when a constant value for $\alpha$ is used (i.e., no dependence on $N^k$, results not shown), larger $\alpha$'s are needed when market volume is small, and smaller $\alpha$'s are needed when market volume is large.

For the larger values of H in Table 6 the standard deviation of payout can be rather large. For the smaller values of H the price adjustments respond too slowly to the large influx of investment into the western Florida counties in the final days of the simulation, so that the pari-mutuel pool is diluted by the rush of late investment that is allowed at prices that are too low, and accordingly average payouts are substantially below par. This dilution does not occur for moderate values of H, indicating that the market mechanism is resistant to manipulation attempts when the pricing adjustment parameter is defined appropriately. The very large investments in the final two days specified in Table 5 can be interpreted as simulating the actions of large speculators seeking to profit from overwhelming the market just before the hurricane landfall. But for such attempts to be successful it would be necessary for them to extract value from earlier investors, so that payouts near par imply failure of this manipulation strategy.

Asterisks in Table 6 indicate parameter combinations for which the 50% payout floor was never challenged in any of the 100 simulated years (for any of the counties, not just Lee), which would have required use of the third line of Equation 28. "Plus" symbols in Table 6 indicate three cases where the 50% floor was challenged for a single county, during the first few days of January. Together, these cases coincide with the range of H for which minimum payout variability is also achieved throughout the range of overall market volumes.

Finally, the rightmost column in Table 6 shows price volatility for Lee county, measured as the standard deviation of end-of-day prices for the period 11 January (to exclude early, very high price volatility deriving from the light initial market seeding) through 30 July (just before the first tropical depression is declared, changing the meteorological probabilities), and averaged over the 100 simulated years. These are shown only for c=$100, but results for other cases are comparable. Not surprisingly, the volatility increases monotonically with H, since the step size in the price adjustment algorithm (Equation 31) increases with H. The optimal H will be large enough for average payouts to be near par, but as small as possible consistent with this condition in order to minimize price volatility. The results in Table 6 suggest that 30=H=40 is an appropriate range. A typical screen display presenting investment information to an investor is shown in FIG. 41.

4.4 Derivation of the Correct Adjustment Parameter α at Economic Equilibrium This section treats the case of a market in equilibrium, in which Equation 29 holds at time t−1 for all outcomes k. In this section, explicit indication of outcome k using superscripts will be suppressed for notational simplicity.

Let $v_t = p_t/W_t$ be the outcome probability implied by the ratio of risk (price) to potential reward (indicative payout), as in Equation 29. In one example, the objective is to increase the pricing probability $\pi_t$, using Equation 31, to match the increase in $v_t$ resulting from the payout dilution for this outcome produced by the purchase of one additional option. Therefore, $$\pi_t = \pi_{t-1} + \alpha_t \pi_{t-1}(1 - \pi_{t-1}) \quad (35)$$
$$= v_t$$
$$= \frac{\pi_{t-1} c \exp(rj/365)}{W_t}$$
$$= \frac{\pi_{t-1} c \exp(rj/365)(N_{t-1} + 1)}{M_{t-1} + \pi_{t-1} c \exp(rj/365)}$$
$$= \frac{\pi_{t-1} c \exp(rj/365)(N_{t-1} + 1)}{N_{t-1} c \exp(rj/365) + \pi_{t-1} c \exp(rj/365)}$$
$$= \frac{\pi_{t-1}(N_{t-1} + 1)}{N_{t-1} + \pi_{t-1}}.$$

Here use has been made of the fact that, because of the equilibrium at step t−1, $M_{t-1} = N_{t-1} \, c \exp(rj/365)$. Solving for the equilibrium adjustment parameter, $$\alpha_t = \left[\frac{\pi_{t-1}(N_{t-1} + 1)}{N_{t-1} + \pi_{t-1}} - \pi_{t-1}\right] / [\pi_{t-1}(1 - \pi_{t-1})] \quad (36)$$
$$= \frac{\pi_{t-1}[(N_{t-1} + 1) - N_{t-1} - \pi_{t-1}]}{\pi_{t-1}(1 - \pi_{t-1})(N_{t-1} + \pi_{t-1})}$$
$$= \frac{1}{(N_{t-1} + \pi_{t-1})}$$
$$\approx \frac{1}{N_{t-1}}.$$

This final approximation will be a very close one, because in realistic cases $N_t \gg \pi_t$.

Considerations Regarding Payout

In general, the basis or methodology of the payout can be either pari-mutuel or non pari-mutuel (e.g. a fixed or a varying payout price, such as one based on a scale or index). As a further alternative, payout can be structured on a modified pari-mutuel basis. For example, a pool of money can be split (after recovering overhead costs) among the qualifying participants in an unequal, i.e. modified manner, depending, in one instance, on an algorithm, or on a scale or index or in another instance, on a requirement to fund an expected minimum payout, or "floor," as will be discussed herein.

If desired, financial activities relating to hurricane natural peril events can be structured around hurricane landfall or hurricane land tracks, either individually, one exclusive of the other, or in combination. A question arises, for example when a hurricane landfall is made on or close to a border between two unit areas (i.e. geographical areas, such as counties used to define purchase units). An arbitrary width can be assigned to the point of landfall if desired, by the provider of the financial activity.

The passage of a hurricane over inland geographical areas can raise a number of different possibilities made available to the provider of a financial activity. For example, if the National Hurricane Center is designated as the external objective independent information source, one report currently available to providers of financial activities is the so-called "best track" report which issues after a hurricane event is concluded. The "best track" report defines the inland path of a hurricane according to a table of discrete position values. Thus, it is left to the provider of the financial activity to determine the best way to define the hurricane path between published points on the "best track" table. If desired, the points of the "best track" table can be connected by straight lines or by curved lines according to a predefined curve-fitting method, for example. As a further possibility, an arbitrary width can be assigned to the hurricane path.

If desired, other sources of information can be employed since the "best track" report is not the only possible source of scoring information, and may not be desirable in certain instances because of the time delay associated with issuance of the report after conclusion of the natural activity. For example, the same kind of information (lat/lon and maximum sustained winds) are available in near-real time in what are called "advisories" issued by the National Hurricane Center, which do not suffer from prolonged time delays. Preferably, the most rapid satisfactory resolution of the outcome of the natural peril event is preferred, so that distributions can be made promptly to individuals who suffer from the natural peril event.

For other types of natural activity, such as tornadoes, the path and/or intensity can be reported by an official source, and for earthquakes, the path of damage and intensity can be specified according to an independent third party.

Different possibilities are presented when considering a particular geographical land unit. For example, payout for a geographical land unit can be based upon one or more external factors, such as a simple hit/no-hit treatment for the land unit of interest. In another example, payout for a land unit of interest can be based upon the published strength of the hurricane according to the "best track" or other table. As a further possibility, it is recognized that the strength of a hurricane can vary in intensity or strength when passing over a given geographical land unit of interest. The possibility is thus presented for a mathematical treatment taking into account the difference of strengths at entry and exit points of the hurricane with respect to the geographical unit of interest. As a further possibility, the geographical unit of interest can lie between points published on the "best track" table, and some manner of interpolation of values can be made with respect to the geographical unit of interest. If desired, payouts can be calculated based upon the strength of the hurricane for the qualifying geographical unit. For example, one payout possibility is to award greater payout for geographical units suffering greater strengths of hurricane activity, under the premise that more help will be provided for those participants that suffer greater damage, as measured by hurricane strength.

Variability factors other than those presented above can also be considered when calculating payouts to qualifying participants. For example, in addition to timing factors and probability factors discussed above (which are preferably employed for price variability as well as payout variability) an account can be made of the residence time of a hurricane in a given geographical unit of interest, under the premise again that more help will be provided for those participants that suffer greater damage as measured by the time that a hurricane is present in a given geographical unit of interest.

It is sometimes preferred to provide an expectation of a minimum payout or "floor" for participants that suffer damage from a hurricane or other natural peril event. The "floor"

is a minimum payout, conditional on the chosen geographical location (in which a market participant holds an investment unit) being "hit" (i.e. suffers a predefined amount or type of contact with a storm).

In one example, the floor is the same fixed dollar value for all financial investment units in a given county (or other geographical region), and for all counties (all such regions). In one example, it is computed in the following way: One parameter in the pricing algorithm is provided as the "par" value. Prices are computed as the product of the probability (as assessed at any given time for the county or region in question) multiplied by the par value (and also multiplied by a time-value-of-money escalator). The par value is called "par" in this example, because, if the market is working smoothly, the payout a market participant might expect is at or near the par level.

In instances where there is very strong buying activity, the actual payout may fall below the par level. If it falls far enough below, the floor is triggered. The floor, in one example, is a fixed percentage (specific value to be determined as a percentage of the par. For the following example: it is assumed that a probability of the selected county (or region) being hit, as assessed at the time of purchase, is 5%, and that par value has been set at $1000. Neglecting the time-value-of-money escalator, $50 is paid for one financial investment unit. If the market works smoothly, the eventual payout, should the selected county be first hit, will be in the neighborhood of $1000. But if market circumstances (e.g., very strong buying interest just before landfall) pushes the actual payout low enough, an expectation is, in the example, given that a payout of least $800, will be received if the floor has been set at 80%.

A mechanism is needed to honor the floor. One possibility is that, if a new purchase would drive the current indicated payout (total in an assumed pari-mutuel pool divided by number of financial investment units for this county or region) below the floor level, the price for that new purchase suddenly spikes to the floor level. In most cases this will dissuade the would-be purchaser from buying in a primary market, and motivate that person to seek a better price in a secondary market, if one is made available.

The present invention also contemplates considerations pertaining to payout, that address the timing of the payout, or conditions precedent to a settlement of the financial activity.

If desired, the payout can employ a sliding scale, based on any number of factors that may be in play for a given financial activity.

Modularity

In one instance, one or more systems, one or more methods, and/or one or more devices for carrying out the financial activity are provided. A number of important issues are addressed by the databases and/or program. In one instance, it is a generally preferred that these issues be addressed as much as possible, on a modular basis. In this manner, a system administrator is able to quickly and easily tailor the financial activity to meet a number of particular needs, and can modify the financial activity on an ongoing basis, if necessary. A brief description of some of the "modular" issues will now be given.

1. Definition of an external objective independent agency which monitors a natural peril event, measures, observes, or otherwise obtains and records data concerning a natural peril event, as well as drawing conclusions and making analytical determinations concerning a natural peril event. In one instance, it is generally preferred that the external objective independent agency be independent of the participant's financial activity, and in another instance be readily observable by the public, or at least the participants. For example, the external objective independent agency can comprise a unit of the United States government which routinely makes public announcements and which is subject to Freedom of Information inquiries from members of the public.

2. Definition of an event eligible for payout. For example, relating to hurricane natural peril events, it is generally preferred in one instance that the event be "officially" declared a "hurricane" as defined by the National Hurricane Center. However, in other instances, other recognized pre-hurricane stages can be treated by the financial activity, with or without weighting the points upon which payout is based. In one instance, payout for the financial activity can be based upon an occurrence of a natural peril event or a termination of a natural peril event.

3. Definition of participant eligibility needed to be permitted to engage in the financial activity. Included, for example, is the level of skill of the participant (needed, to qualify to participate in a financial activity structured as a game of skill), or the property rights of participant (needed, for example, to qualify to participate in a financial activity structured as a vehicle for recouping losses to property rights caused by a natural peril event). It may be desirable, in certain instances to have an outside party handle these types of activities. For example there are a number of known enterprises that assess the financial responsibility of individuals and businesses. This activity may or may not be combined with an outside party that handles cash transfers and related matters.

4. Definition of a "season" for the financial activity. The financial activity season can, for example, coincide with a particular time interval such as a "hurricane season" as defined by the National Hurricane Center. In another instance, the financial activity season can be chosen to lie outside of a recognized or customary time period such as the National Hurricane Center "hurricane season" and that this is preferred for hurricane natural peril events.

5. Number and length of financial activity seasons in a given year. In one instance, there can be but one financial activity season. In one instance, the financial activity season can begin at the beginning of a calendar year. In another instance, the financial activity season can begin at any time during a calendar year. In one instance, the length of a financial activity season can be a predefined number of natural peril events. In another instance, a financial activity season can be defined to comprise a predetermined number of natural peril events, which is either concluded or is followed by a subsequent financial activity season upon the occurrence of those predetermined number of natural peril events.

6. Defining the types of natural peril events and activities upon which payouts are based. For example, for hurricane events, recognized activities can include coastal strikes, inland strikes and near-shore hurricanes which do not make landfall (such as hurricanes which come within one quarter mile of eligible coastal shore). Other definitions of "sub-characteristics can be made for other types of natural peril events, other than hurricanes.

7. Defining areas or regions eligible for inclusion in the financial activity. In one instance, only terrestrial areas or regions may be declared eligible for inclusion in the financial activity. In another instance, the terrestrial areas or regions eligible for inclusion in the financial activity are geographically defined according to convenient delineations, such as established political boundaries. In a further instance, portions of geographic regions can be declared ineligible for inclusion (for example, some of the many island areas of the Eastern Seaboard of the United States can be declared ineligible for inclusion, because of small size, few or no inhabitants, or for other reasons which are or are not stated).

8. Defining the areas stricken by a natural peril event. In one instance, the stricken areas can be defined according to external objective independent agencies such as the National Hurricane Center. In one example, stricken areas eligible for the financial activity include those areas as defined by the National Hurricane Center "best-track" or other, interim reports which are typically published either during or shortly after the conclusion of a hurricane event. In one instance, the size or width of the National Hurricane Center "best track" (preferably, of the center of the eye of the hurricane) can be infinitely thin, or it can be of a predetermined width. In one instance, stricken areas eligible for the financial activity can be calculated by connecting points given in the National Hurricane Center table data of a hurricane's "best-track" or other table with either a straight line, or a curved line preferably defined by a predetermined curve-fitting method.

9. Defining the nature of the natural peril event to be eligible for the financial activity. For example, events officially determined to be well-defined "hurricanes" by the National Hurricane Center can be declared by the rules of operation as the only eligible natural peril event recognized by the financial activity. In another instance, the financial activity can treat "hurricanes" defined by the National Hurricane Center according to their storm intensity as defined by the National Hurricane Center. For example, only a hurricane defined as reaching category three severity by the National Hurricane Center can be declared eligible for the financial activity. In one instance, payouts can be based upon hurricane strikes, weighted according to their storm intensity as defined by the National Hurricane Center. For example, distributions based upon a hurricane's "best track" can pay out different amounts for different qualifying participants, depending upon the severity of the hurricane at the time and/or point of contact with the hurricane, or other primary, secondary, tertiary or other criteria.

In one instance, observed information from an independent external source regarding the land track of a tropical weather event may not be continuously reported. For example, the use of a "best track" or other table inherently assumes discrete points of data spread out over a time interval. Questions can arise when the reported data does not correspond to boundaries of geographical areas defined by the financial activity. Various treatments can be given. For example, an average value can be established between two adjacent data points (e.g. two adjacent points of a "best track" or other table) and this average value can be used to determine the value of the natural peril event as it passed through a given geographical area. In another treatment, if a data point (e.g. a point on the "best track" or other table) occurs within a geographical area of financial activity, the value attributed to the data point can be used for all investments made within the geographical area predicted by a participant. Other treatments are also possible.

10. Determining the amount of payout for those participants eligible to receive payouts, as well as the conditions that must be present for a payout or other settlement to occur. Several instances of payouts varied according to a number of different factors and considerations are given herein. These variations can be accounted for in a number of different ways including, for example, a simple linear weighting or a more complex algorithm, formula, index or table, based upon historical events, or observed natural peril events, for example. In another instance, variations in payout between different participants can be based upon one or more related or independent factors, as may be desired. In one instance, determining the amount of payout for qualifying participants can be based upon primary, secondary and if desired, tertiary and other criteria. For example, for tropical weather events, primary criteria can be chosen to be the "locus" of landfall of a tropical weather event. If desired, the land track of a tropical weather event can be treated as another primary criterion (especially where an equal weighting among primary criteria is assumed) or can be treated as a secondary criterion (especially where unequal, preferably a lesser, weighting is assigned, relative to the primary criteria). In another instance, other secondary or lower level criteria can be chosen, such as residence time in a given geographical area, or wind speed or range of wind speed associated with a tropical weather event, preferably while the tropical weather event is resident in the geographical area predicted by the participant. As a further possibility, multiple criteria can be established in tertiary or other additional levels (preferably assuming unequal weighting among the levels of the criteria).

Other examples of variability factors are discussed herein.

Derivative Trading Financial Activity Model

As mentioned above, financial activities may, in one instance, be modeled to include or resemble financial trading of derivative securities interests (e.g. options), such as those monitored by the Commodity Futures Trading Commission (an independent agency of the United States government), the New York Stock Exchange, the Chicago Mercantile Exchange, the Iowa Electronic Market, and others. These financial activities may include, for example, futures contracts, options contracts, options on futures contracts and other forms of derivative products Generally speaking, compared to other types of financial activities considered herein, activities under the "derivative trading type" financial model may, in one instance, incorporate price controls driven more by market conditions and less by direct control via the rules, principles of operation and other structures of the financial activity being undertaken. If desired, the financial activity may be entirely market driven.

According to one example of this financial activity model, and assuming a hurricane or tropical weather type of natural peril event, initially all geographical areas (e.g. counties) in play are available for individual investments at the beginning of the declared financial activity season at some predefined minimum investment amount (i.e. purchase price). A first example of a derivative trading financial example is referred to herein as the FIRST LANDFALL OPTIONS, or FLO. As mentioned herein, the principles set out in the following and other examples, may be readily applied to other types of natural peril events. For instance, the following first landfall options could be readily recast as a first tornado or earthquake strike options based on geographically defined areas of these types of natural peril events.

First Landfall Options, or FLO

1. Background. On average for the last 130 years, two hurricanes make landfall in the U.S. each year. The activity will assume there are 78 individual counties, parishes or other land units on the Atlantic coast of the U.S. plus five groups of Mid-Atlantic and New England counties. For simplicity, we will call each of these five groups a "county." Any of these 83 "counties" could be the first place a hurricane makes landfall in the U.S. (or the place another natural peril event occurs). Or none of these counties could be hit by a hurricane. It will be readily appreciated that the FLO financial activity can be conducted for other numbers of geographical areas, and for other types of natural peril events where a loss or other significant event occurs, arising from natural forces, i.e. other than man-made, intentional events.

2. First Landfall Options (FLOs) allow parties to hedge or speculate on whether their selected county will be the first county where a hurricane makes landfall in the U.S. FLOs are commodity options—the commodity being defined in exchange rules to be where a hurricane will make landfall first. FLOs will be traded on an exchange, a designated contract market under the Commodity Exchange Act. Under exchange rules for FLOs, a market participant selects one of 84 counties (including the "no hurricane makes landfall" county, called the "null" county) which the market participant fears (or believes, or both) will be the U.S. county where a hurricane will first make landfall. That market participant is "long" the county selected and "short" all the other counties. The market participant pays a premium reflecting this combined "call" on the county selected and "put" on all the other counties. The market participant can lose only the amount of the paid premium. If the hurricane makes landfall first in the county selected, the FLO holders for that county receive a pro-rata share of the combined proceeds from premia received and deposited with the exchange for all FLOs purchased for all counties in that option series. In other words, all FLO purchases fund the pay-out to the holders of FLOs for the county where the hurricane first makes landfall. As indicated herein, payouts can be adjusted to offer an expected minimum payout, especially for those geographical areas in play that suffer verifiable damage.

3. FLO Series. Three options series of FLOs will be offered initially. Based on the historical data, three FLO option series would seem to be adequate because in 90% of the years three hurricanes or less make landfall in the U.S. Each FLO options series would be comprised of options on each of the 83 counties plus the null county.

4. FLO Example. In a first instance, there is only one county where a hurricane makes land fall "first." Therefore, a FLO buyer for Monroe County is "long" Monroe County and "short" all other 83 counties. If the hurricane makes landfall at Monroe County first, the holders of FLOs on Monroe County receive a return on their option. If the hurricane makes landfall first in any other county, then the holders of FLOs on Monroe County receive nothing. Their option expires and can not be exercised. No holder of a FLO can ever lose more than the purchase price (the premium) for the FLO. If desired, in another example, a natural peril event can strike two adjacent geographical areas simultaneously, if the natural peril event is broad enough to do so.

5. FLO Trading Information Market Participants Would Always See. Through a link on the exchange web-site, all market participants will be able to view FLO market data for each of the 84 counties. First, for each county, the market participant would see a percentage number reflecting the likelihood, based on historical data analyzed algorithmically, that a particular county would be the first county, out of the 84 possible counties, where a hurricane would make landfall first in the U.S. or that no landfall would occur. Second, based on that likelihood for each county, each market participant would see what the FLO for each county then costs—the premium for the combined call-put option. Third, each market participant would see updated in real-time the number of market participants who have bought a FLO for any county and the proceeds received by the exchange to date for all FLOs for all counties. Fourth, on a real-time basis market participants would always be able to see the current value of the FLO for each county. That is, market participants would know what a FLO holder for Monroe County would receive if no additional FLOs were bought by market participants and a hurricane made landfall first in Monroe County. It is anticipated that exchange rules will set out the length of the trading day to be 12 hours, from 8 am to 8 pm eastern time. Market participants would be able to access the exchange-web site at any time (maintenance may require a short hiatus at some time during the night) for informational purposes but would be able to execute FLO purchases only during the 12 hour trading day period. If desired, activities can be conducted for other time durations, such as extending trading to 15 hours, from 8 am to 11 pm, for example.

6. FLO Market Value Variables. The variables that would affect the FLO's market value for any county at any time are fully transparent and available to all market participants: a) number of FLO purchasers in the selected county; b) number of FLO purchasers in all other counties; and c) the monetary amount paid for all FLOs to date. This information is updated dynamically on the web-site. No market participant should have an information advantage over any other market participant.

7. FLO Primary Trading: Pre-Tropical Storm Period. Until the first tropical storm is reported in the Atlantic Ocean, usually July, no data is available on hurricane landfall probability other than historical data. Until that first tropical storm is reported, the exchange web-site will provide market participants with the price for each FLO county (the FLO premium), including the "null" county, based on an algorithm derived from the historical likelihood that a hurricane will make landfall first in a particular county. The exchange expects to discount these premia for the earlier calendar months and then increase the premia as the time for the expected first reported tropical storm approaches. It would be cheaper to purchase a FLO in January, for example, than in April. Assume Monroe County's historic risk premium is $100, the exchange could decide to reduce that premium for market participants purchasing in January to $50. Again, all market participants would be able to buy each FLO for a particular county at the same price and all would receive the same amount of advance notice of any discounts granted by the exchange. One exception to this rule might be for hedgers. The exchange could reduce the FLO premium just for hedgers—those who represent and show that they have property or business operations in the FLO county selected (or in contiguous counties). Other arrangements can be made for the discounting of the premia. These FLO premium prices would be disclosed to every potential buyer on the exchange's web-site. Buyers also can see on the web-site how the market forces are driving the potential strike price for each FLO—or what each FLO holder would receive if the county selected was, at that point in time, the first county where the hurricane made landfall. This information is updated dynamically on the web-site. No secondary trading will be permitted in FLOs during this phase.

8. FLO Primary and Secondary Trading: Post-Tropical Storm. Once a tropical storm is reported by the National Hurricane Center, the exchange will offer both primary and secondary trading facilities for the FLOs that are part of the first options series. (When the second and third tropical storms are reported, the exchange will offer primary and secondary trading facilities for the FLOs in the second and third options series, respectively). In primary trading, the exchange will continue to publish the prices at which FLOs may be purchased at a premium priced to reflect the historic algorithmic likelihood of the first landfall plus the data analyzed from the actual storm tracking software. These primary trading prices will be eligible to be updated at least four times a day in accordance with the four daily storm tracking reports issued by the National Hurricane Center. In short, the primary trading price will be an algorithmically-determined combination of history and environment updated dynamically. Secondary trading will be based solely on offers to sell or offers to buy FLOs received from market participants through an electronic auction market trading system. Offers to sell FLOs would have to be made by those that already owned FLOs, no naked short selling will be allowed. The exchange will provide for clearing of all secondary trades, including the settlement transfer of any FLO from the seller to the buyer.

9. Landfall. Exchange rules will establish the criteria, based on credible third-party observations, for determining when and where a hurricane makes landfall first or a geographical area suffers damage caused by other types of natural peril events. They are expected to be based on the publicly-available NHC estimates of the position of the storm center through time, and on geographic boundaries for the counties provided by Census Bureau data bases. Once the hurricane hits, that event is over. At some point before the hurricane makes landfall, the exchange rules will have to specify when FLO trading is suspended as the hurricane nears. The exchange does not want market participants in certain regions to be disadvantaged by a storm's imminent arrival. Exchange rules, for example, could specify that primary trading ends once a hurricane watch is issued for one of the 83 U.S. counties and secondary trading ends once a hurricane warning is issued for one of the 83 U.S. counties. As mentioned elsewhere, public safety and the need to coordinate various government agencies may require adjustments to the activities described herein, without departing from the spirit and scope of the invention.

10. Bounce-back Effect. Sometimes a hurricane will make landfall and then head back out to sea before returning to make landfall a second time. For purposes of FLO trading, this occurrence can, in one instance, be considered to be two hurricanes, each with a FLO and resulting payout. Exchange rules will specify the criteria for how far out to sea a hurricane must go before it is considered to be a "new" hurricane for purposes of the FLO product.

11. Null County. Under exchange rules, payouts to holders of the null county FLO occur only at the conclusion of "hurricane season," generally considered to be December 1. If no hurricane makes landfall in the U.S., for example, the null county holders for all three FLO series will receive a pay out from their respective options series premia. If one hurricane made landfall, then the holders of null county FLOs for FLO series 2 and 3 would receive payouts. Timing of payouts would be set by exchange rules.

12. Other issues. Adding new options series during storm season could receive different treatments. For example, a new FLO could be listed whenever a third storm appears, and a new FLO could be listed when a fourth storm appears. Although these FLOs could be funded in a number of different ways, build up from the early winter sales will be avoided because there will preferably be no winter sales in these FLOs; and they wouldn't be authorized until storm season, in July or August as the likely earliest time. Either a funding or seed funding source could be provided or market forces can be relied upon exclusively. In one example, it is contemplated that FLOs can be purchased through intermediary FCMs only, or, alternatively, FLOs can be purchased either directly by consumers or through the services of an FCM. Market participants can have access either through an exchange website or through an authorized intermediary (FCM) to execute the purchase of the commodity option. The FCM can then collect the customer's money and will forward the funds to the exchange or its custodian of the funds.

The concept of a first landfall can be regarded as addressing the coastal areas that are exposed to hurricane damage. Of course, damage often continues as the natural peril event travels inland, and provision can be made for inland geographical areas as well. Receipts collected can be disbursed to a greater number of geographical areas, based on a prior contract or other rules establishing a condition for qualification, as where a natural peril event impacts inland geographical areas. Such impact could be qualified based upon an official track, or a minimum amount of damage or damage claims, for example. Such damage could also be caused by a tornado, an earthquake, or other type of natural peril event.

Trading Utilizing a Severity or Property Damage Scale

A second example of a derivative trading financial example also contemplates financial activity concerning property owners' exposure or risk of exposure to damage related to hurricanes and other naturally occurring events. It has long been recognized that a hurricane's or tornado's potential to inflict damage to property can be estimated from vectored wind speeds, such as translational and rotational wind speeds, and other observed characteristics such as the storm's radius or other size-indicating data. According to the present invention, a scale or index of measurement is derived from a events of observed facts concerning hurricane characteristics. The observed facts are preferably provided by a responsible third party, such as a government agency or weather information specialist service or a damage prediction service, for example. Examples of observed facts include temperature, humidity, wind speed, and wind area relating to a storm. Observed facts also include storm intensity forecasts provided by the National Hurricane Center, for example.

Values on the scale provide an indication or measurement of the risk of property damage as a result of the exposure to an historical or forecasted hurricane (or other like natural peril event). In one instance, the values are calculated or computed numbers and the scale of values may be in the form of an index, table or other data construct. The indication or measurement of the risk of property damage can, for example, relate solely to the likelihood of landfall, or could relate to the prospect of landfall with or without consideration of storm intensity and with our without consideration of property values exposed to the storm. In another instance, indication of damage is based upon actual or estimated insurance claims. Claims for certain types of damage (hurricane or flood or earthquake) could be excluded, if desired.

In one variation of financial activity according to principles of the present invention, derivative products such as futures (forward contracts), and options (option contracts) are traded multilaterally (one or many trading with many) or bilaterally via an exchange or other dealer or privately, i.e. directly, between a buyer and seller. As a further alternative, a manager of a financial activity may allow private contracts and other dealings to be later cleared through an exchange's clearing system. Preferably, the various contracts are settled against a scale, expressed, for example, as an index, a table, or other data construct, that is calculated with reference to observed facts relating to natural peril events, such as those mentioned elsewhere, herein. The scale could relate, for example, to the likelihood of first landfall, or the potential of the naturally occurring event to cause damage to property exposed to the naturally occurring event. The scale could be employed as an index, used in the manner of conventional futures trading, with financial activities modeled after conventional futures trading (i.e. forward contracts and options contracts) in indexes. The indexes could, for example, be allowed to vary in value as the natural peril event matures, with trading being settled according to index values on separate days The scale can be expressed in terms of continuous or discontinuous numerical series. Virtually any basis for the scale(s) can be used. For example, scales or indexes measuring expected property damage can be based on meteorological data such as velocity (e.g. high wind speeds) and overall size such as radius data for storm (hurricane) winds. Such data can include, for example, a single radius of hurricane force winds, or arrays of hurricane force winds in a more complex analysis. Other bases for the scales could chosen from data relevant to insurance interests, such as property damage claims as well as established insurance and reinsurance indicators of damage, damage risk as well as claims presented for settlement according to accepted insurance practices. If desired, the financial activity can employ more than one scale. For example, different scales could be used at different stages of a hurricane's progression, such as the storms development at sea, first landfall (usually, for a specified region). Multiple scales could be employed, for example, where a number of indexes are put in play for successive hurricane landfalls in a given season. Each index could be separate from the others, and allowed to fluctuate according to ongoing market valuations and activities. For example, the indexes could fluctuate in value according to market performance of the financial activity, or alternatively, according to technical information such as changing forecasts by the NHC or other independent third party The separate indexes could be settled separately, for example, shortly after the hurricane makes landfall. Different scales could also relate to the overall cumulative effect of natural peril events over a period of time, such as a hurricane season, for one or more regions of interest. Further possibilities include scales relating to a largest or most powerful or most sustained storm in a particular area, as defined by the activity. If desired, a cumulative long-term index based upon two or more shorter term indexes, can be traded. Alternatively, a cumulative index can be based upon individual indexes for two or more geographic regions. If desired, indexes based upon permutations or combinations of different types of indexes can be used, including indexes for different geographic regions and indexes for different time durations.

Contracts for the futures and options on futures, and other financial activity products are preferably created for defined geographical regions exposed to hurricane and other naturally occurring events. If desired, where hurricanes are the naturally occurring event of interest, the scale(s) employed could relate to the hurricane's first landfall, a range of geographical regions over which all hurricanes for a season make landfall, or geographic regions suffering exposure to a minimum storm force. First landfall could be on a geographic region-by-geographic region basis, or on the basis of all defined geographic regions taken together, or in multiple-region subdivisions or other defined manner. If desired, derivative products or other financial activity could be defined for natural pre-hurricane events. For example, derivative products can be defined when a storm activity reaches a tropical depression stage as determined by the NHC or other authorities. Further, such products can be defined for different geographical areas defined by the activity, such as storms occurring in different regions of the sea, such a more northerly Atlantic regions and more southerly gulf coast regions. Such activities could be tied to market interests relating to more southerly gulf coast exposures as compared to more northerly Atlantic coast exposures. Trading for such products can continue, for example until landfall or until the storm expires at sea without making landfall. As a further alternative, products related to natural peril events originating in one geographical region can be expired or converted into different products when the underlying natural peril event leaves one geographical region and enters another.

In one example, the financial products including derivative contracts can be delivered or otherwise settled in a variety of ways. For example, they can be settled with reference to a final price determined according to a scale, or according to market activity or according to one or more algorithms or any permutation or combination of these. Further, settlement can be made in the context of a pari-mutuel activity, or a fixed settlement method, or a combination of these. If desired, the financial activity can allow, or regulate or facilitate secondary trading, where financial products are traded between participants before or after settlement. In one example, futures and options on futures based on first landfall of a hurricane with respect to one or more defined regions, are traded during a hurricane season, prior to first landfall. Market forces can control prices in this secondary trading, if desired, or prices can be regulated by the financial activity, in some manner. Settlement is made after first landfall, either at a fixed price or a price determined by the financial activity, for example, according to principles set forth herein.

In one variation of financial activity according to principles of the present invention, financial products such as futures contracts, options contracts and options on futures contracts, are cleared through a futures exchange. The contracts may be created for defined geographical regions exposed to hurricanes and other naturally occurring activity, and are preferably settled against one or more embodiments of a scale of measurement of the type described above, or herein, derived from a events of observed facts concerning characteristics of natural peril events, especially characteristics related to a potential of a naturally occurring event to inflict property damage. Values on the scale may be expressed in the form of an index, a table, or other data construct as may be desired. The contracts may set a lower limit on the amount of damage contemplated. The contracts may be limited to future potential damage exposure, or may be implemented for actual sustained damage, preferably damage estimates provided by a responsible external third party, such as a government entity or insurance or reinsurance service. If desired, the scale may be based in whole or in part on information provided by such government entity or insurance or reinsurance service.

In general, contracts considered herein could be defined in terms of actual or estimated future damage, with or without a set minimum amount of damage, or the likelihood that a defined amount of damage is reported for a particular storm, a range of dates or an entire season. If desired, the contracts could be defined on a storm-by-storm basis, or could be limited to the storm having the greatest impact in the chosen category (damage caused, size of storm, strength of the storm, measured in some predetermined manner, size of coastal area or land area affected). If desired, contracts could also include offshore properties such docks, or harbors, or ships that are moored, tethered or otherwise present within a defined proximity to land.

If desired, multiple scales can be provided for each geographic region, or different time divisions, such as different date ranges, and could be provided for different natural peril events, in which each first landfall of a season terminates the current part of the financial activity, with a new, subsequent part being started. In each of the variations herein, contracts could also be offered for a "null" event in which no landfall is reported for a given season or other defined time period.

Sarasota County Example

As a further variation, one financial activity according to principles of the present invention contemplates trading of contracts utilizing a futures index. As will be seen herein, the contracts are written for a first landfall criteria, although different criteria based on other types of natural peril events could be employed, as well. This variation assumes interest in a particular geographical region, referred to herein as Sarasota County. It is assumed in this variation, that, although the storm is still some days away from occurring (e.g. away from landfall), that it is becoming more likely that the storm may be heading for Sarasota County.

An index is provided as a basis for trading geographical regions, and futures contracts are offered for trade. The Sarasota County Index rises as it becomes more likely Sarasota will be First Landfall (or otherwise subjected to damage), and falls as it becomes less likely. The futures contract on that Index are based on the proposition that, when the first storm makes landfall, all futures contracts expire and buyers or sellers must pay off based on what the last index price was before Landfall. The variation focuses on two participants, a first participant that thinks Sarasota will be hit first, and a second participant that doesn't. The first participant buys a Sarasota Index futures contract at $100 on Monday, and accordingly is long on Sarasota County The second participant sells a Sarasota Index futures contract at $100 on Monday, and accordingly is short on Sarasota County. Both participants pay margins as required by exchange rules and by contracts with the participant's "clearing firms." For discussion purposes, each participant pays $5 in margin to their clearing firm.

By Thursday, it looks like Sarasota will be hit over the weekend. The Sarasota Index rises. The price of the Sarasota futures contract also will rise. It is assumed that, based on bids and offers from all market participants, the price for the futures contract on Thursday is $125. If the first participant decides to settle for this profit, the broker is instructed to liquidate the first participant's future position through an offsetting trade. The broker for the first participant then goes into the market and sells a second Sarasota contract at $125 on behalf of the first participant. The resulting sell contract cancels out or offsets the first participant's buy contract. In the sale, the buyer is assumed to be a third participant. The first participant receives a profit of $25 (along with return of the margin paid).

On Friday, the storm turns sharply and heads towards Texas. The Sarasota Index plummets. The price of the Sarasota future is assumed to drop to $10. Assuming the first participant wants to maintain a position on Sarasota County, and the first participant's broker finds a participant willing to sell at $10, the resulting buy order at $10 cancels the sell order at $100 and leaves the first participant with a profit of $90.

Additional Considerations

In one example, once an investment is made for a particular geographical area, the next investment to be made for that same geographical area is set at a higher purchase price. For example, the rules of the financial activity can provide that the second investment will undergo a flat rate pricing increase, such as $0.25 per financial investment unit. If desired, pricing increases can be assigned in steps according to step increases in the volume (either dollar amount or number of financial investment units traded) of trading. If desired, other types of increases can be employed, including linear and nonlinear mathematical treatments of purchase price. The prices for subsequent investments in a particular geographical area may either continue to increase or will plateau at a constant price until a set point minimum number of financial investment units is reached. In this example, preferably, the set point is chosen to reflect a pool of money of substantial size, which would justify a substantial step in price increase. If desired, several steps of price increases can be employed and related to similar or different sized blocks of financial investment units. If, for example, a particular geographical area suffers a lull in trading, the purchase price can be reduced, based on the time value since the last trading activity. Once activity resumes for a particular geographical area, price increases can go into effect. Each geographical area will have different initial prices and could have different step sizes or blocks, as financial investment units are traded, if desired. Thus, in this example, financial investment unit price varies according to market activity (e.g. a stepwise or a smoothly varying increase as trading activity increases). Optionally, in this example financial investment unit price can also vary according to time factors, such as factors centered around a falloff (or optionally a rise) in trading activity.

It is generally preferred that pricing follows a number of principles. For example, it is generally preferred that trading begins with a set minimum price which could be different for each geographical area. In one instance, it is generally preferred that the minimum price depends on market activity. In a second instance, it depends on the climatological probability, (as currently estimated), of the particular geographical area being hit, and, as trading progresses, how many financial investment units have been sold for a particular geographical area, and also the total amount of money in the pot. If desired, each of these principles can be applied in different amounts, (e.g. according to different increments, different rates or other mathematical treatment). It is generally preferred that the minimum price increases as the probability for a hit in the geographical area increases, and the minimum price should also go up as the total dollars in the pool of money goes up. In one instance, it is generally preferred that the minimum price goes down as the number of financial investment units potentially splitting the pool of money (i.e. for a particular geographic area) goes up. Other considerations regarding pricing are mentioned herein.

Auction-Based Financial Activities

As another example, in a maturing market, the ongoing financial activity can be alternated (less preferably, replaced) with an "auction" form of financial activity. In one instance, the auction form of financial activity, once initiated, is scheduled to occur at different intervals. For example, multiple auctions would preferably occur periodically throughout the season, in one instance, with the time spacing between auctions being sparser (e.g. weekly or monthly) early in the process, and more frequent (e.g. multiple auctions per day) when tropical cyclones are in existence and especially when hurricanes are threatening imminently. this example, the event price for an auction is preferably made proportional to the probability that a particular geographic area will be hit, multiplied by the funds available, and that product divided by the number of financial investment units outstanding for that particular geographical area. If desired, the proportionality constant applied could be unity or some number smaller or greater than one.

Variation 1: Assuming a first auction has concluded at a time in January, before the conventional hurricane or other natural peril event season, the "stage 1" probability, calculated as set forth herein, is 0.02. Assuming the previous financial activity sold 5000 financial investment units for the geographical area of interest, and that collectively, all the auctions took in $25 million overall. The minimum unit price would then be (0.02)×($25 million)/5000=$100, and therefore, nobody could bid less than a $100 minimum price. If there were more takers than financial investment units, some or all of the bidders at $100 would be out of luck.

Variation 2: Assuming a time in July, when there is a tropical storm or other natural peril event in existence, in a location that is favorable for hitting the geographical area (e.g. county of interest. The "stage 2" probability for that area is calculated as set forth herein to be 0.10. There are now 100,000 financial investment units that have been bought for the geographical area of interest, and the total pool of money is $2 billion. Minimum bid price would be (0.10)×($2 billion)/100,000=$2000.

Variation 3: That tropical storm or other natural peril event contemplated in variation 2 has dissipated and now poses no threat to the geographical area of interest. Also, there are currently no other storms or other natural peril events that are threatening, and the probability drops back to 0.02. There's now $2.1 billion in the pot, and 105,000 financial investment units have been bought for the geographical area of interest. The minimum bid price has gone down because the probability has gone down: (0.02)×($2.1 billion)/105,000=$400.

In each of the variations above, there would preferably be separate auctions for each geographical area in play (with one or more auctions for each geographical area), with the degree of market participant interest determining whether and/or how much the price would rise above the levels indicated. Also, it is generally preferred that the number of units on offer at any one time would be limited to a fixed number, it being expected that, if the total offer is unlimited, there would be no incentive to bid higher than the price.

If desired, special treatment could be given later in a financial activity season when it becomes clear that certain geographical areas are unlikely to ever be perceived as generating substantial market participant interest (e.g. inland geographical areas that historically have not, or only very rarely, been hit.

Additional Examples

In another example, trading contracts corresponding to different geographical sections, have contract prices set by market forces, that is, by the participants, rising and falling based on their degree of confidence of where landfall will occur. The value of these contracts will rise and fall based on market acceptance of a forecasted storm occurrence.

In a further example, derivatives trading is based entirely on "market-based" pricing. Here, "market-based" pricing refers to pricing that is based on recent or cumulative market activity. If desired, the market-based pricing may or may not be driven by algorithms, or only partially driven by algorithms, as may be desired.

In another example, futures contracts, options contracts, options on futures contracts and other forms of derivative products may pay out upon occurrence of a specified condition (e.g. first landfall of a hurricane), preferably on a non-pari-mutuel basis, are offered for sale to prospective purchasers. Most of the contracts represent different coastal areas subject to first strike by a hurricane, typically, portions of the Atlantic and the Gulf seacoast. If desired, contracts for non-landfall conditions can be added to the offering, such as a storm at sea entering a defined zone. Prices of the futures contracts will vary during a storm season, with prices for particular contracts rising according to market activity as a storm approaches the territory (or other condition) defined in the futures contract.

As can be seen from the above, the present invention contemplates a number of features concerning derivative products, including financial activities directed to catastrophic events, especially non-human created (e.g. "natural") events (landfall for a hurricane, location for a earthquake or tornado, etc.), a prediction of the location and/or the potential for disaster of the future event. Settlement is determined against information provided by an independent, responsible third party (that provides, for example, a determination of landfall, location or damage amount). Settlement may be of a pari-mutuel type, market-driven type, or a mixture of market forces and pari-mutuel types. The financial activities may contemplate scales or indexes concerning the subject matter involved, such as a third party estimate of the degree of damage sustained (such as the amount of insurance claims asserted or an index based upon such data), or the severity of the event (such as wind speeds or other damage potential of a hurricane). Derivative activities may be conducted between pairs of participants, or between unequal numbers of participants or between one or more participants and a financial institution. Derivative activities may involve algorithms, such as algorithms for setting pricing of some portion or all of an activity, or may react solely r partially to supply and demand and other market forces. The above features may be entirely or partially aggregated in virtually any permutation or combination, or may be left out altogether or may be replaced by other features contemplated herein.

In other aspects, the present invention contemplates futures contracts, options contracts, options on futures contracts and other forms of derivative products, traded multilaterally or bilaterally, where the contract's or product's value increases or decreases based upon a measure or index of estimated or actual: property damage or likelihood of property damage, whether caused by a weather event or other form of natural peril, in a specified region or geographic locations. The contract's or product's value may increase or decrease based upon a measure or index concerning where a weather or other natural peril event will occur (e.g. make landfall first) in a region or geographical area. The contract's or product's value may also increase or decrease based upon what the seasonal impact of weather or other natural peril events will be in a specified region or geographic area and may also be based upon what the maximum or largest weather or other natural peril event will be in a specified region or geographical area. Again, permutations and combinations of these financial activities are possible.

"Hurricane Pools" Financial Activity

I. Summary

The following description is directed to examples of financial activities according to principles of the present invention that are referred to as "Hurricane Pools" or "Storm Pools." The following is one example of financial activity contemplated by the present invention. As mentioned, different types of financial activity models may be employed. The following example is given in terms of a financial activity model of the type comprising a game of skill, although many of the principles set forth herein are applicable to other financial activity models, as well. The financial activity contemplated herein is generally referred to as "Hurricane Pools", emphasizing the investment nature of the financial activity as a hedge against unforeseen loss. In the example given, the Hurricane Pools are games of skill that focus on a particular type of natural peril event, namely hurricanes making landfall in the United States. That is, in this example, only tropical cyclones having a strength meeting the minimum criteria to be termed "hurricanes" are considered. Those skilled in the art will readily appreciate that other types of natural peril events can be treated as well.

It is recognized that a tropical cyclone originates at sea, and grows in intensity over time, before making landfall. It is possible that the intensity of the tropical cyclone may rise and fall. The criteria chosen here is that the tropical cyclone has a minimum category one hurricane intensity at the time of landfall. The Hurricane Pools are structured to allow market participants to use them in a way that can augment hurricane insurance, while simultaneously providing income to participating states to help defray costs associated with disaster management. Homeowners and business insurance policies typically contain deductible provisions ranging from 2% to 15% of a home's value. In addition, these same policies do not provide any coverage for the outside areas of a home or business, such as landscaping, outside lighting, docks, fencing and the like. Often, property owners do not have sufficient flood insurance and have other omissions or insufficient coverage which result in catastrophic financial losses in even the lowest rated hurricanes. Also, losses are suffered when rates are lost and also, where temporary housing is needed.

Because financial activities can be carried out according to different financial models. The Hurricane Pools, for example can be distinguished from insurance instruments, with payouts for qualifying investments not being tied to actual property losses, and thus being dispensed more quickly. Payouts here do not involve inspection by adjusters, and therefore can be made much more promptly—(e.g. within a few weeks). This promptness and flexibility can be achieved because the Hurricane Pools operate in a way that emphasis is placed on payouts that primarily depend upon apportioning Hurricane Pools that have been invested into a particular Hurricane Pool, and on the amounts and timing of Hurricane Pool entries for counties that experience a hurricane strike.

As mentioned above, financial activities may be constructed around models that cover the natural peril event activity either on an event by event basis, or on a "seasonal" basis for events occurring during a predefined span of time. In the example given above, choice was made to operate on the "seasonal" basis. Accordingly, the number of Hurricane Pools in which market participants may participate can vary from year to year, depending on the number of officially declared eligible events. In this instance, the Hurricane Pools may be regarded as different events occurring in a season. Initially, two or three Hurricane Pools may be opened to investment, beginning on 1 January. Each of these initial Hurricane Pools relate to one of the first two or three tropical cyclones passing over a portion of the U.S. with at least hurricane-force winds during the upcoming calendar year, as determined, in one instance, from the tropical cyclone Advisories issued by the National Hurricane Center (NHC). The overwhelming majority of these events occur during the span of time, popularly referred to as the "hurricane season" (1 June through 30 November). In active hurricane seasons, additional Hurricane Pools may be opened as the hurricane season progresses.

Each investment in a Hurricane Pool is preferably made in the form of financial investment units or the like, purchased for one or more of the geographical regions, such as counties (or county equivalents, for example Louisiana parishes) that are plausible hurricane targets. When these financial investment units have been purchased for counties that later receive a hurricane strike, they qualify their owners to receive payouts from that Hurricane Pool. All of the investments in a given Hurricane Pool, less items which may be defined in a given instance (e.g. portions designated for participating state governments and fees for Hurricane Pool management), are paid to market participants in the qualifying county or counties. The formula determining these payouts accounts both for the chances of a hurricane striking the qualifying county(s), as assessed at the time a Hurricane Pool investment is made, and a reward for earlier investments into that Hurricane Pool.

II. Structure of Hurricane Pool Investments

A. Hurricane Pool Financial Investment Units

Entries in the Hurricane Pools are made for individual counties, in the form of "financial investment units" in one of the specific Hurricane Pools available for investment. The first Hurricane Pool relates to the first tropical cyclone to make landfall as a hurricane over the U.S., including Puerto Rico and the U.S. Virgin Islands; the second Hurricane Pool relates to the second hurricane striking the same area; and so on. For example, suppose the first U.S. hurricane landfall in a hypothetical year is at Galveston County, Texas, and the second is at Miami-Dade County, Florida. Financial investment units purchased in Hurricane Pool #1 for Galveston would qualify their owners for a portion in all of the money invested in that Hurricane Pool, but market participants in Hurricane Pool #1 for Miami-Dade would receive nothing from that Hurricane Pool. On the other hand, market participants in Hurricane Pool #2 for Miami-Dade would be entitled to a portion of all of the money invested in that Hurricane Pool, whereas Galveston market participants in Hurricane Pool #2 would receive nothing from that Hurricane Pool.

Figure 13:
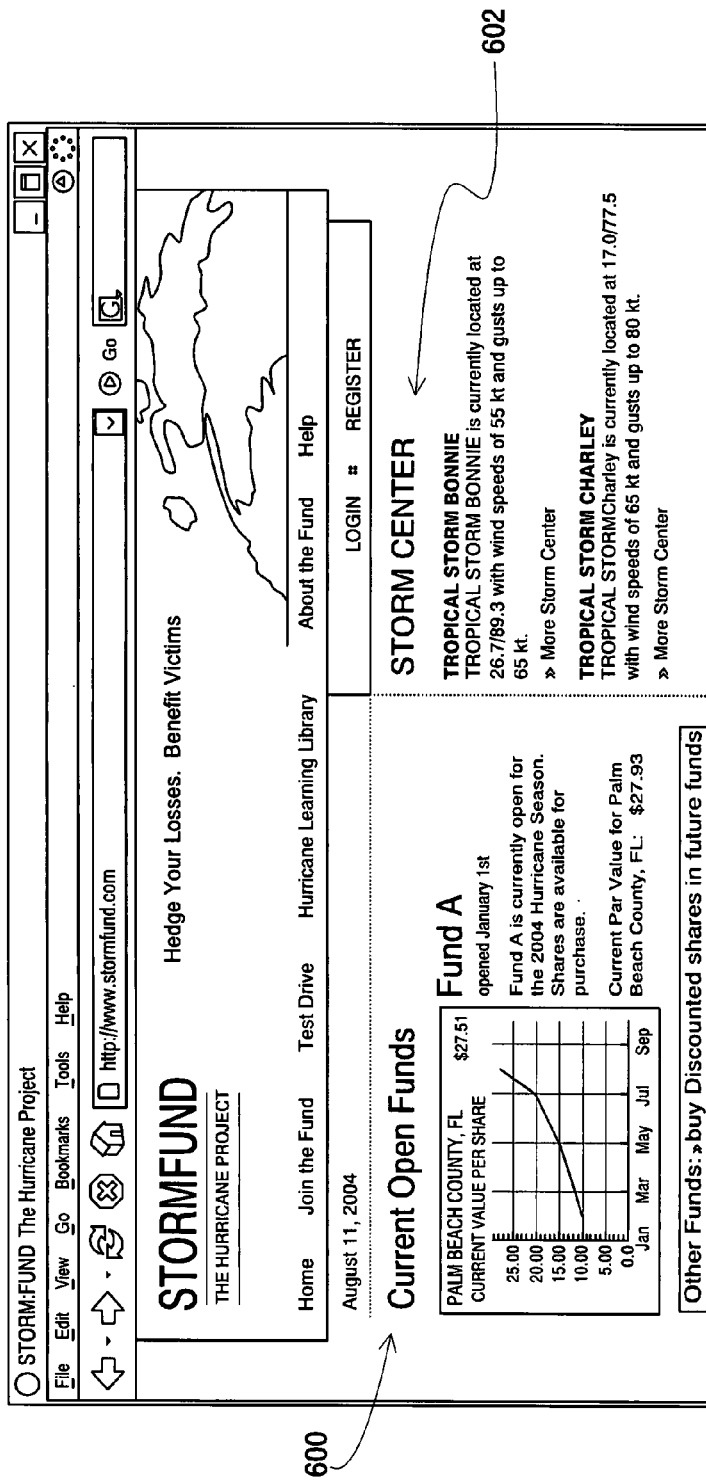
FIGS. 13-18 are graphical depictions of data screens implementing a financial activity.
Figure 14:
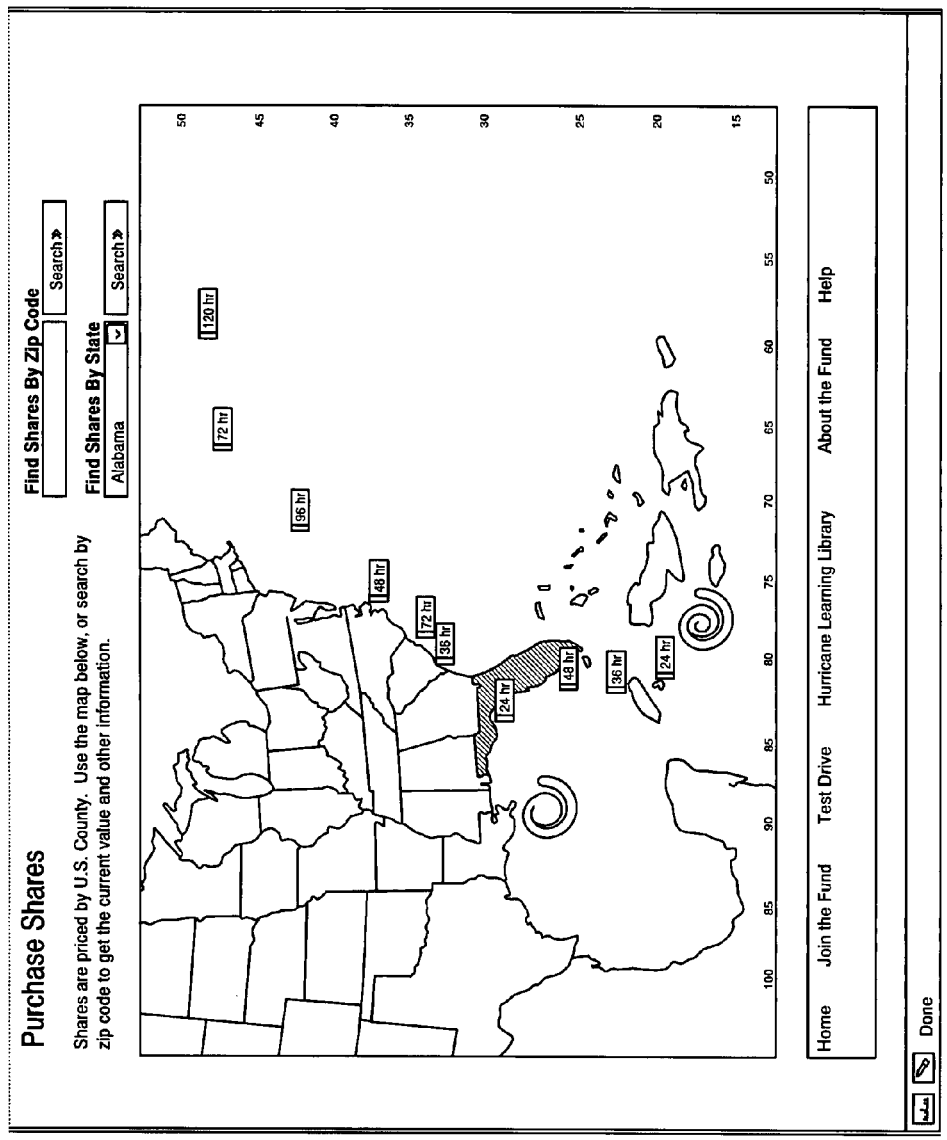
Figure 15:
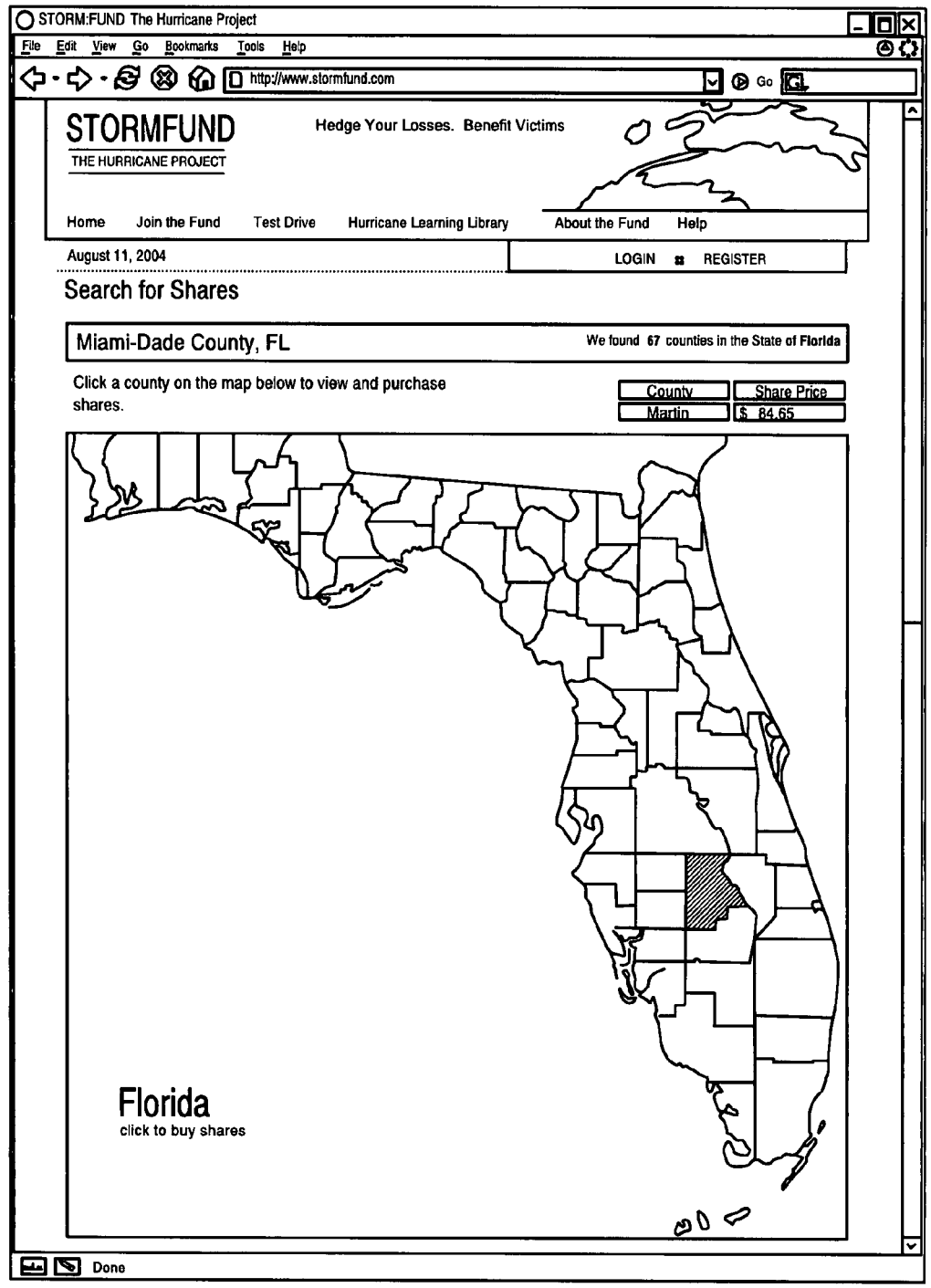

The primary means of making Hurricane Pools investments will, in one example, be by credit card, through a Hurricane Pools website. One example of a web site is given in FIGS. 13-18, which shows a web site implementing a Hurricane Pool financial activity. FIG. 13 shows a web site screen which serves either as a welcome page or one of the first pages that a participant will encounter upon acquiring the web site. Included in the screen depicted in FIG. 13 is an indication 600 of the current open Hurricane Pools and a brief summary 602 of current tropical cyclone activity.

In one instance, in addition to providing web site access, individuals who do not have internet access will also be able to participate in the Hurricane Pools by using touch screen displays and other examples of graphical user interfaces, located at convenience stores, gas stations and the like. Individuals will make selections by touching an interactive screen, for example, and pay for their investment by swiping a credit card or providing a cash payment to the retail establishment. Preferably, the display will automatically generate a printed receipt (including identification number) for both credit card and cash purchases. A social security number and perhaps a biometric device such as a fingerprint scan may be required to participate in the Hurricane Pool.

Figure 16A:
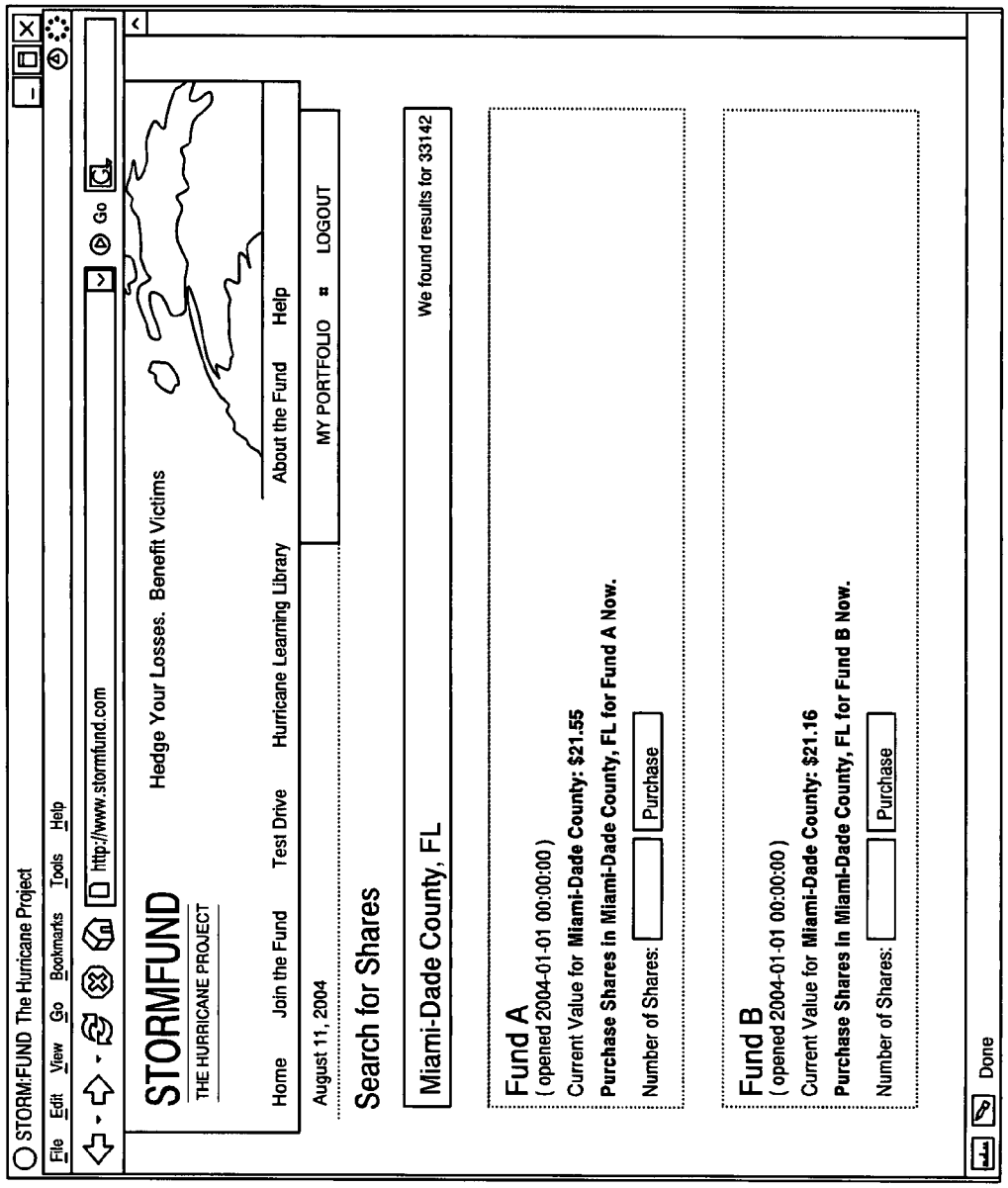
Figure 17:
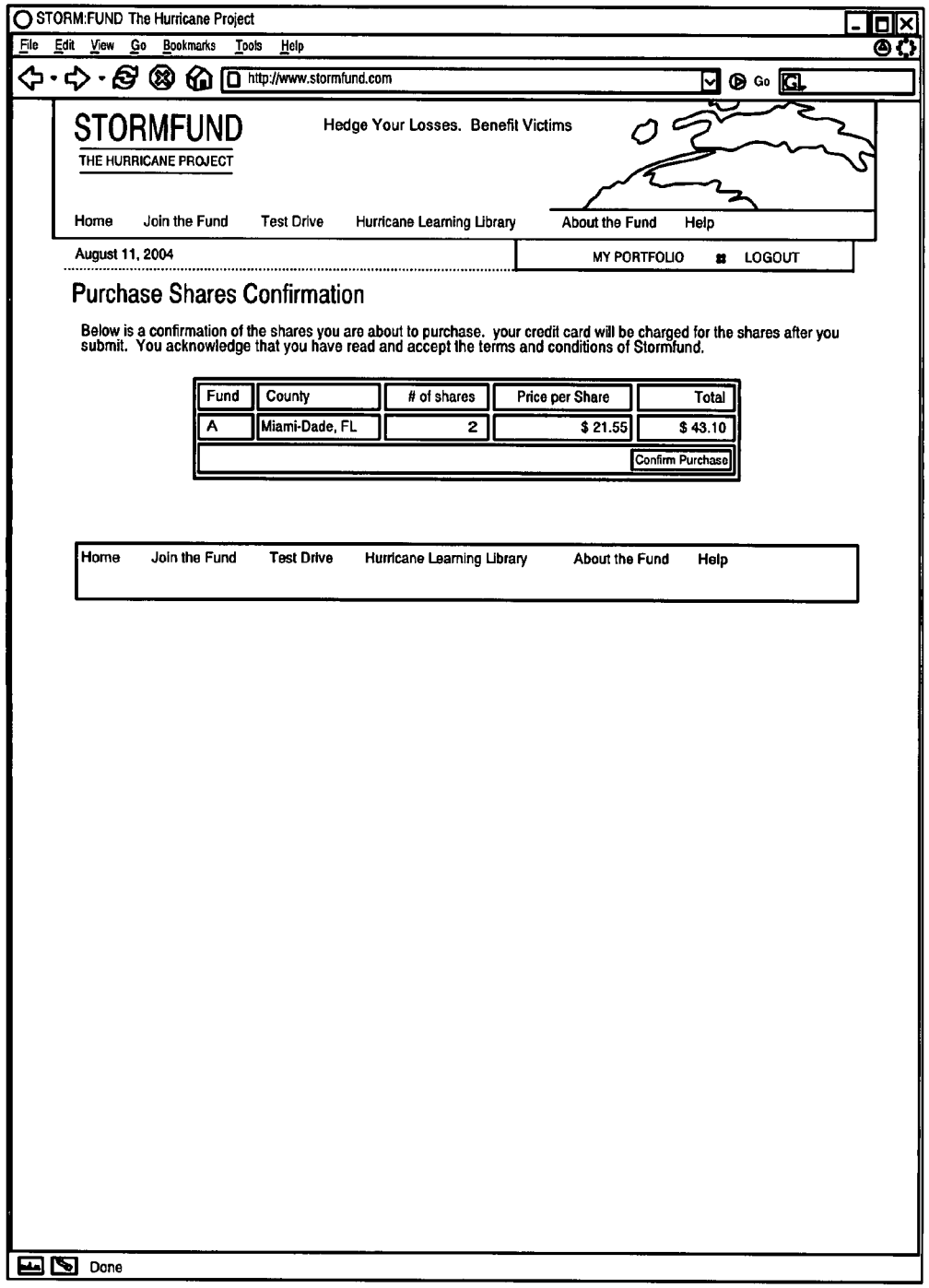
Figure 18:
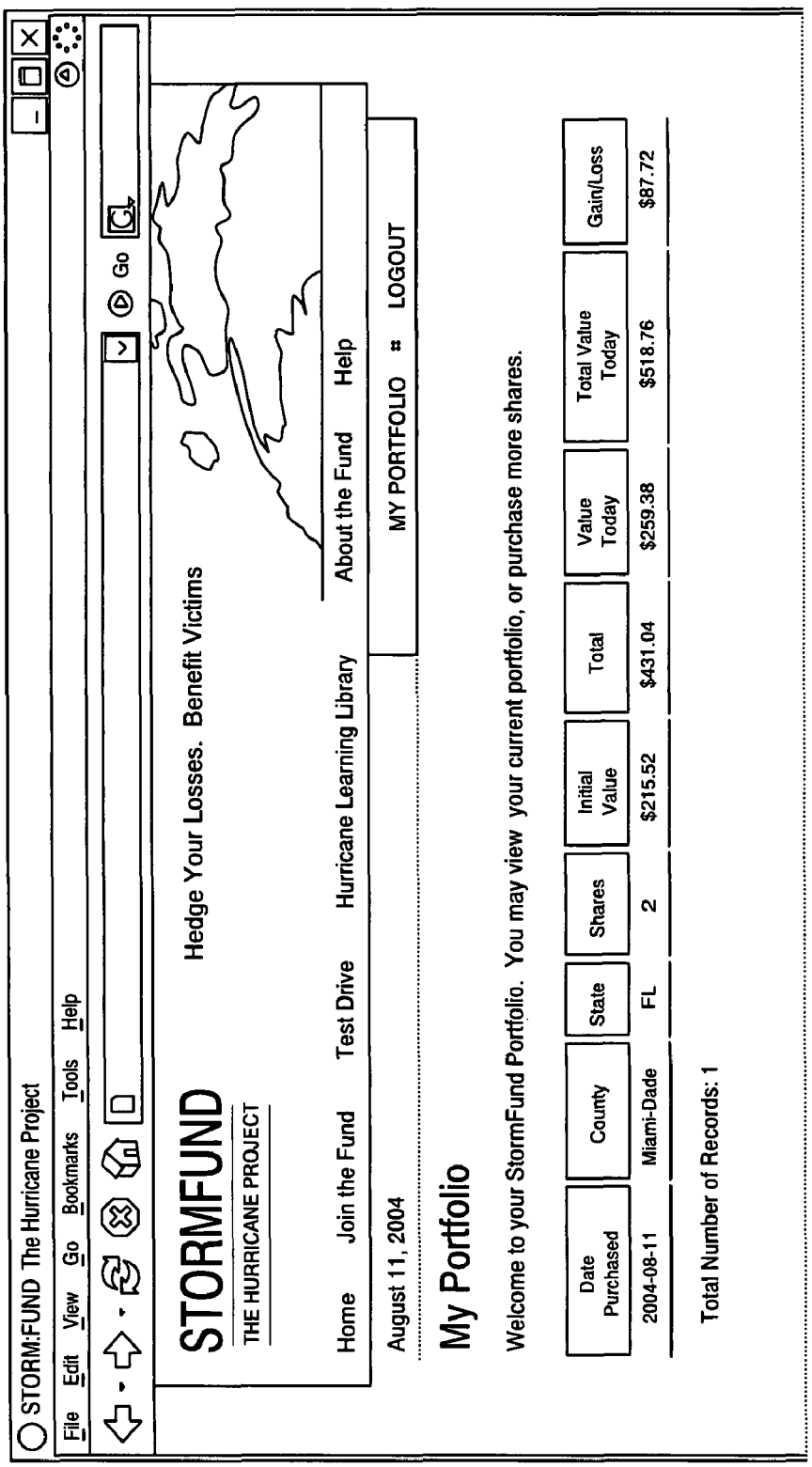

FIGS. 16-18 show financial investment unit purchases for the Storm Pool web site implementation of a Hurricane Pool. In FIGS. 16a and 16b-16c two screens are shown for purchasing financial investment units and in FIG. 17 a confirmation is given for financial investment units purchased. In FIG. 18, a summary or "portfolio" of all transactions for a participant is shown.

Once an investment in a Hurricane Pool is made, the investment preferably cannot be reversed as these would affect the value of the financial investment units purchased by others. In one instance, an investment is not considered to have been accepted until the market participant's credit card company credits that investment in the Hurricane Pool. If the credit card company later reverses that payment to the Hurricane Pool, the value of the financial investment units purchased in the Hurricane Pool will be preferably set to zero.

B. Financial Investment Unit Prices

The price of a Hurricane Pool financial investment unit for a particular county is, in one instance, determined by a mathematical formula involving both the probability of that county being hit, and price discounts for early investments. Therefore, financial investment unit prices in Hurricane Pools will be different at different times and different for different counties at a particular time.

The price incentives for early investment may be substantial, and are designed to encourage investments before any tropical events are in existence, and indeed well before the beginning of hurricane season. It is anticipated that much of the early investment activity will come from market participants who may want to use the Hurricane Pools to supplement conventional insurance, or from insurers using the Hurricane Pools as a reinsurance vehicle. One purpose of financially penalizing later investments is to obtain the greatest amount of money in the Hurricane Pool as possible, by encouraging early investing and discouraging procrastination.

Financial investment unit prices are preferably higher when hurricane strike probabilities are higher, and lower when hurricane strike probabilities are lower. Specific details of the pricing formula will preferably be made available on the Hurricane Pools website, for those who may be interested. Factors influencing the pricing probabilities include the following:

1. The location of the county for which the investment is being made. For example, counties in south Florida are historically more likely to be hit than are counties in Massachusetts, on average, and so financial investment unit prices for Florida counties will usually be higher.

2. The size of the county. Larger counties present bigger targets, and so financial investment units in larger counties will generally be more costly.

3. Which of the Hurricane Pools an investment is made in. For example, financial investment units in Hurricane Pool #2 cost less than financial investment units in Hurricane Pool #1, other factors being equal, because it is more likely for one U.S hurricane to occur in a given year than for two such events to occur.

4. The location(s) and strength(s) of tropical cyclones in the Atlantic Ocean, Caribbean Sea, and/or Gulf of Mexico, that potentially threaten the United States. Such storms in some locations are more likely to affect particular counties as hurricanes, based on a historical climatological analysis of more than a century of hurricane data, and financial investment unit prices for such counties will increase accordingly. Once a tropical depression is announced by the National Hurricane Center, and continuing through the intensification of the storm, financial investment unit prices continue to increase each time a storm is upgraded in strength, because threats to land are larger for stronger storms. This aspect of the financial investment unit pricing is intended to prevent persons who now have knowledge of a currently existing storm from being unfairly rewarded by having this information, relative to early Hurricane Pool market participants.

C. Opening and Closing Hurricane Pools

The number of Hurricane Pools that may be opened to investment is at the discretion of the Hurricane Pools management or provider. It is anticipated that two or three Hurricane Pools will be opened on January 1 st of each year. These Hurricane Pools pertain to possible U.S. hurricane landfalls during that calendar year, whether or not they occur during the generally recognized "hurricane season" (June 1 st through November 30th). At the discretion of the Hurricane Pools Administrators, additional Hurricane Pools may be opened before the beginning of the "hurricane season," for example if an unusually large number of hurricanes may be forecast to occur in that year. Similarly, additional Hurricane Pools may be opened to investment during the hurricane season, particularly if previously open Hurricane Pools have all been closed by hurricane landfalls (preferably, measured by the eye of the hurricane hitting land), or by imminent possible hurricane landfalls.

Hurricane Pools will preferably be closed to further investment when the storm to which they pertain is sufficiently close to landfall, according to the current NHC Advisories for that storm. Preferably, persons should leave home and not participate in the Hurricane Pools activity, when told to evacuate. The exact trigger for Hurricane Pool closings preferably strikes a balance between public safety (not discouraging prudent evacuation by remaining open too long) and broad participation (not cutting off investments before a given storm is an imminent threat). A possible compromise could be to trigger a Hurricane Pool closure when its tropical cyclone is both at hurricane strength and has generated NHC hurricane warnings for one or more of the counties for which Hurricane Pool investments may be made. In addition, for fast-moving and/or rapidly developing hurricanes, Hurricane Pools would be closed when the operational estimate of its track, as published in the relevant NHC Advisory, has traversed at least one of the counties for which Hurricane Pool investments may be made.

Because Puerto Rico and the U.S. Virgin Islands are relatively far from the U.S. mainland, a Hurricane Pool may be closed for these two territories without it necessarily being closed for the rest of the U.S. In such cases, financial investment units for counties in the conterminous U.S. that are subsequently traversed by the same storm at hurricane strength will also qualify to receive payouts from that Hurricane Pool. However, a Hurricane Pool that is closed because of storm proximity to or landfall on the U.S. mainland will preferably also close for Puerto Rico and the U.S. Virgin Islands.

III. Hurricane Pool Payouts

A. Disbursements to Qualifying Financial Investment Units

Preferably, all of the money invested in a given Hurricane Pool, less fixed percentages for participating state governments (to help support emergency management efforts) and for Hurricane Pool management, is divided equally among Qualifying Financial investment units. A Qualifying Financial investment unit is a financial investment unit purchased for a county that is subsequently hit by the hurricane to which that Hurricane Pool pertains. Therefore early market participants, whose Qualifying Financial investment units were purchased relatively cheaply, will realize larger returns on their investments than will later market participants, for whom the financial investment unit prices were higher.

To the extent possible, disbursements from Hurricane Pools to holders of Qualifying Financial investment units will preferably be made by posting the amounts to the credit card account from which the investment was originally made. This mechanism has the advantage that the disbursements will be available very quickly, to people who may need these financial resources for rebuilding or other hurricane-related expenses. For example, individuals who may be displaced by extended evacuation from their homes may have especially acute needs for these payouts. These problems are magnified by loss of jobs. It may be necessary to withhold portions of large disbursements on behalf of the IRS.

B. Determination of Qualifying Financial Investment Units

For the purposes of determining Qualifying Financial investment units in Hurricane Pools, counties are considered to have been "hit" in one instance if the track of the center of the hurricane as determined from the NHC Forecast, Public, or Special Advisories for that storm (or, e.g. within, +/−20 nautical miles) passes through some portion of that county. The basic information in the NHC Advisories that is used to determine Qualifying Financial investment units in this exemplary instance are the storm positions (latitude and longitude) and strengths (maximum sustained winds), that are reported to have occurred at particular times. These location points will preferably be connected by straight-line segments (or, optionally curves calculated from a formula in operational use at NHC or otherwise made public and preferably mentioned by reference on the Hurricane Pool website). Financial investment units in counties traversed by a track so calculated, between two consecutive positions at which the storm was at hurricane strength (maximum sustained wind of 64 kt, or 74 mph), will, in this instance, be Qualifying Financial investment units. For this purpose, the geographical extent of counties will be defined for example by the Cartographic Boundary Files of the U.S. Census Bureau, that are published at http://www.census.gov/geo/www/cob/co2000.html. These definitions could also be modified to allow financial investment units in counties affected by stronger hurricanes (Category 2+ hurricanes, as indicated by maximum sustained winds reported in the NHC Advisories) to return a larger financial investment unit of Hurricane Pool assets to their market participants.

Preferably, it should be pointed out to Market participants in Hurricane Pools that these rules for determining Qualifying Financial investment units have been somewhat idealized, relative to real-world hurricane behavior, in the interest of having a promptly available, clear, explicit and automatic way of disbursing Hurricane Pool assets to Qualifying Financial investment units. In particular, a few points should be noted. The first point is that: there will often be counties experiencing hurricane-force winds and/or other hurricane impacts that nevertheless do not qualify as having been "hit" according to the definition used by the Hurricane Pools. This will be the case especially for the larger and more powerful storms. Hurricane Pool market participants whose intention is to, in effect, supplement their insurance coverage are therefore encouraged to invest in surrounding counties also. To encourage market participants to protect themselves, the Hurricane Pools site will automatically flash or change color for several counties which border the county initially selected and urge our market participants to spread their investment to include surrounding (collar) counties. In this manner, the market participant will, in this instance, have greater opportunity to collect from the Hurricane Pools actively if damage occurs, but the eye of the hurricane does not enter their county.

The second point is that, because qualifying counties are determined on the basis of storm positions only at particular, and possibly irregular times, small discrepancies between the calculated track (used to determine Qualifying Financial investment units) and the actual track (as determined some months later in the official NHC Tropical Cyclone Report for that storm, or that might be evident at the time of the storm from a events of weather-radar images, for example) can and will occur. Again, it may be advisable for some individuals to invest in nearby counties, in addition to the county(s) in which they have the most interest.

As a third point, the U.S. Census Bureau data files are only approximations to the true geographical outlines of many counties. They consist of a collection of line segments, and so will not accurately follow curving county boundaries. In addition, portions of some counties (particularly relatively small islands) are not included in the Census Bureau's Cartographic Boundary Files. For example, the Dry Tortugas are not included in the Cartographic Boundary File for Florida, so that a hurricane passing over this portion of Monroe County, Florida, would not by itself constitute a "hit" on Monroe County for the purpose of determining Qualifying Financial investment units.

In cases where there may be multiple tropical cyclones in existence at the same time, an explicit rule deciding which storm pertains to which Hurricane Pool is needed, if more than one of them eventually affects the U.S. as a hurricane. Priority can be determined according to the time of landfall on at least one of the counties for which Hurricane Pools investments may be made. For example, if the hypothetical hurricane "Bob" makes U.S. landfall ahead of hypothetical hurricane "Alice," "Bob" would be assigned to Hurricane Pool #1, and "Alice" would be assigned to Hurricane Pool # 2.

It is anticipated that payouts to Qualifying Financial investment units will be made within two weeks of the final NHC Advisory for the storm in question. In unusual cases, such as for storms that may have the potential to reintensify and affect the U.S. again, Hurricane Pool payouts may be delayed beyond two weeks at the sole discretion of the Hurricane Pools Administrators. In all cases, Hurricane Pools disbursements will preferably be made on the basis of the best and most recent information available from the National Hurricane Center at that time about the storm in question, and will not be subject to revision in the event of subsequent updates to that information.

IV. The Hurricane Pools Website

With reference to FIGS. 13-18, the Hurricane Pool's activity, in one instance, will be administered through a website that calculates financial investment unit prices (or prices of other financial investment units) automatically, according to information from NHC Advisories that are updated at least 4 times daily when one or more Atlantic tropical cyclones are present, and receives payments from market participants' credit card accounts, or other financial equivalent, or other alternatives to payment, such as transactions to an market participant's brokerage account. Preferably, first-time entrants will need to register. Password protection will preferably be employed for credit-card accounts associated with each registration, to facilitate any eventual payouts that may need to be made to that account. Social Security information will preferably be required as part of the registration, in order for state and national government agencies to track tax liability on any payouts. Other arrangements could be made for those who access the website through their brokerage service or other third party service.

Current financial investment unit prices for all available counties can be displayed both graphically and in tabular form. With reference to the schematic screen depictions of FIGS. 14 and 15, clickable maps (coastal area and individual state) are made available, with financial investment unit prices indicated approximately with a color code. Preferably, state-by-state pull down menus (not shown) are also provided. Participants are to be given the option of specifying their entries either in terms of financial investment units bought, or dollars to be entered, for each county selected. Choices made by a participant are shown in shaded form in FIGS. 14 and 15.

The sums entered to date in each Hurricane Pool (and available for subsequent payout) will be posted on the Hurricane Pools website and continuously updated. For Hurricane Pools that are currently open for investment, it will be possible for site visitors to determine potential payouts for a financial investment unit in any county, under various assumptions about the track of the hurricane to which that Hurricane Pool pertains. These "what if" calculations can be made available for any historical hurricanes that have crossed a county in question, or for any hypothetical hurricane track that a website visitor might be interested in.

For Hurricane Pools that have been closed to further investment, the actual hurricane track and Hurricane Pool payouts per financial investment unit will preferably be listed, together with a variety of official NHC information about that storm. Until a given tropical cyclone has fully dissipated, and so has no chance of reintensifying and subsequently affecting a portion of the U.S., these estimates will be subject to revision.

Because financial investment unit prices will be updated (preferably at least four times daily according to the most current Advisory information from NHC), it will be necessary for the site to be unavailable for accepting investments for short, pre-scheduled, periods of time (e.g. every 6 hours). When an Atlantic tropical cyclone is relatively close to the U.S., these blackout times will be more frequent, in order to accommodate the additional NHC Advisories and to perform other necessary duties. In addition, some or all of the parts of the website may close from time to time on an unscheduled basis, in order to incorporate new information that is occasionally provided by NHC at times other than the usual Advisory schedules. These additional blackout periods will also allow time for the new information to be disseminated to interested parties. In one instance, the lengths of website blackout times will depend on the speed with which the NHC advisories can be obtained, and their information transformed to updated hurricane probabilities for the Hurricane Pools. Even when there are no Atlantic tropical cyclones in existence, financial investment unit prices will preferably be updated during the regular (e.g. 6-hourly) blackout periods, with decreasing of the early-entry discount by a small amount.

When choosing to purchase financial investment units for a particular county or neighboring counties, it is preferable to encourage market participants to thoroughly familiarize themselves with as much data on hurricanes as is publicly available. To assist in this effort, helpful weather-related links may be provided on the Hurricane Pools website, as well as other educational information that might be helpful. For example, a graphical history of storms which have occurred during the last 113 years and their associated tracks may be provided to market participants and other participants.

With reference to FIGS. 24-40, further details concerning the website are considered. In FIGS. 4-40 further examples of systems and methods according to principles of the present invention is shown employing one or more graphical user interfaces. As will be appreciated by those skilled in the art, the graphical user interfaces may be constructed using known computer programs and programming languages. In general, the graphical user interfaces are employed to facilitate investment related actions by a user, such as investment research, trial calculations and other activities and implementing financial investment decisions. The graphical user interfaces include, in addition to descriptive and information data, active graphical items, such as "buttons" having a conventional shape (e.g. round, oval) as well as special shapes (e.g. a county map or a storm track).

In the examples given, the financial activity relates to naturally occurring events of the types mentioned herein, such as tropical storm activity. As will be seen, it is generally preferred that the financial activity be related to defined geographical areas (herein referred to as "regions"), represented in map or table form. For example, the regions defined in various embodiments of the present invention may correspond to well-known geographic or political boundaries, such as county, township or parish borders. However, it is sometimes expedient to define a region as an arbitrary geographical area, unrelated, or only loosely related to established boundaries. As will be appreciated, although regions having the approximate size of counties or parishes are preferred in the illustrated examples, regions can be of virtually any size desired, smaller than a county or alternatively, larger, such as groupings of several counties. Further, although the illustrated embodiments are concerned with coastal regions of the United States, virtually any land area could be used as well. Also, although the illustrated embodiments pertain to first land strike of hurricane storms on the continental U.S., other natural peril events, such as the earliest official designation of a designated area being flooded, are also contemplated.

Figure 24:
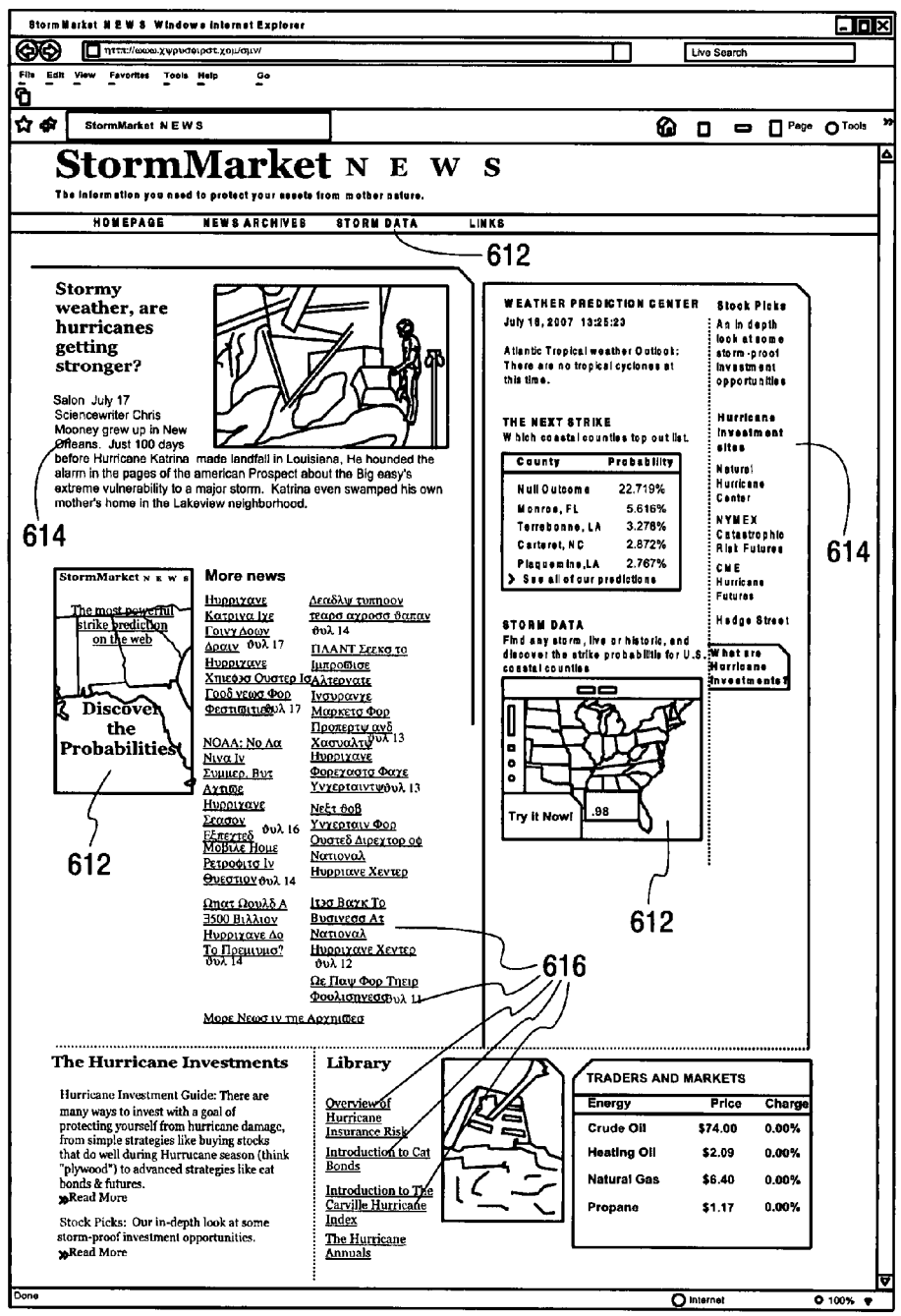
FIG. 24 is a schematic representation of a computer screen showing an introduction to overview of the graphical user the subject invention.

Turning now to FIG. 24, a system and method for financial activity employing a graphical user interface is shown illustrating an introductory page generally indicated at 610. Included are active graphical selection item in the form of buttons 612 of various text and graphic types. The buttons 612 provide links to a further detailed entry page illustrated in FIG. 25. Also shown in FIG. 24 are descriptive data components of the graphical user interface indicated at 614 and linking components indicated at 616 that invoke outside resources that are external to the embodiment of the invention described herein. If desired, the linking components could be internalized to the invention being described, if the system operator should choose to undertake that additional responsibility.

Figure 25:
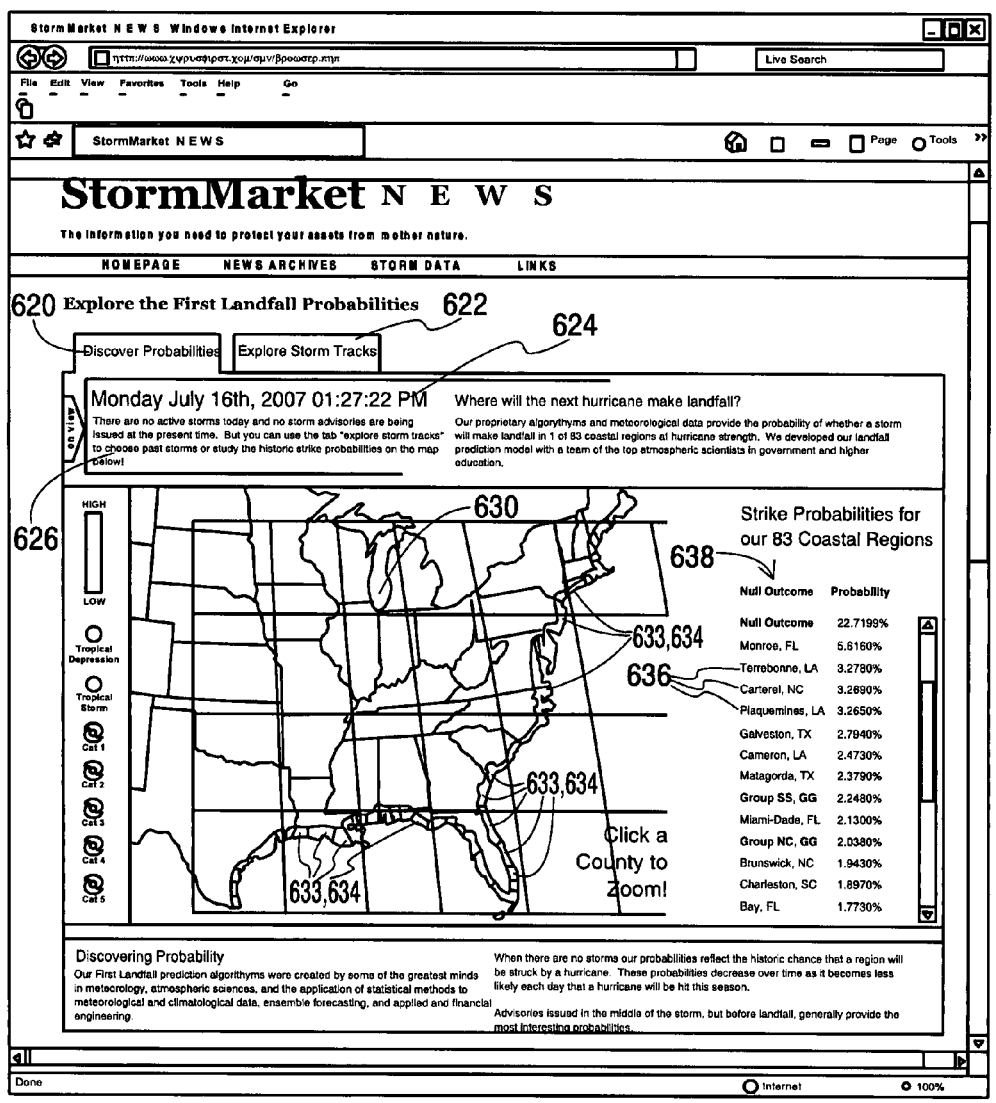
FIG. 25 is a schematic representation of a computer screen showing an overview of the graphical user interface of the subject invention, reflecting current conditions.

Referring now to FIG. 25, an entry page is shown. Included are active graphical selection items or buttons 620, 622. Preferably button 620 is automatically selected when the entry page is loaded, although button 622 or neither button could be initially selected. In the preferred embodiment button 620 activates a data display showing probabilities for various land regions in real time. Included in the graphical user interface, is a passive or static component in the form of a map 630 of the U.S., including eastern and southeastern coastal areas divided into regions 632. These regions are overlaid by active graphical selection item or buttons 634 corresponding to the shape of the corresponding region 632. Also included is a component of the graphical user interface generally indicated at 638. This component is provided in the form of a table, with regions listed in one column, and their corresponding probabilities listed in the adjacent column. The tabular component 638 is preferably populated with active graphical selection item or buttons in the form of text table entries, which serve as alternative active graphical selection items to the graphical buttons 634.

Also included in the entry page of FIG. 25 are data components that provide information to the user. For example, data component 624 provides a textual description of the real time map and related information displayed. Data component 626 provides textual description of the current natural peril event status. At the time shown, a quiet condition is indicated with no ongoing storm having begun and no storms having occurred for the time period of the financial activity. The present invention contemplates that the time period of the financial activity may be defined in any manner desired. For example, the time period could be the current calendar year, or the storm season for the calendar year (e.g. June to November). Also contemplated are a number of consecutive time periods referred to herein as "events," defined herein as beginning at the year or season and ending, for example, with the first landfall of the year (defined according to preselected rules), and being immediately reset upon first landfall to start a second event for the year, and so forth.

Figure 26:
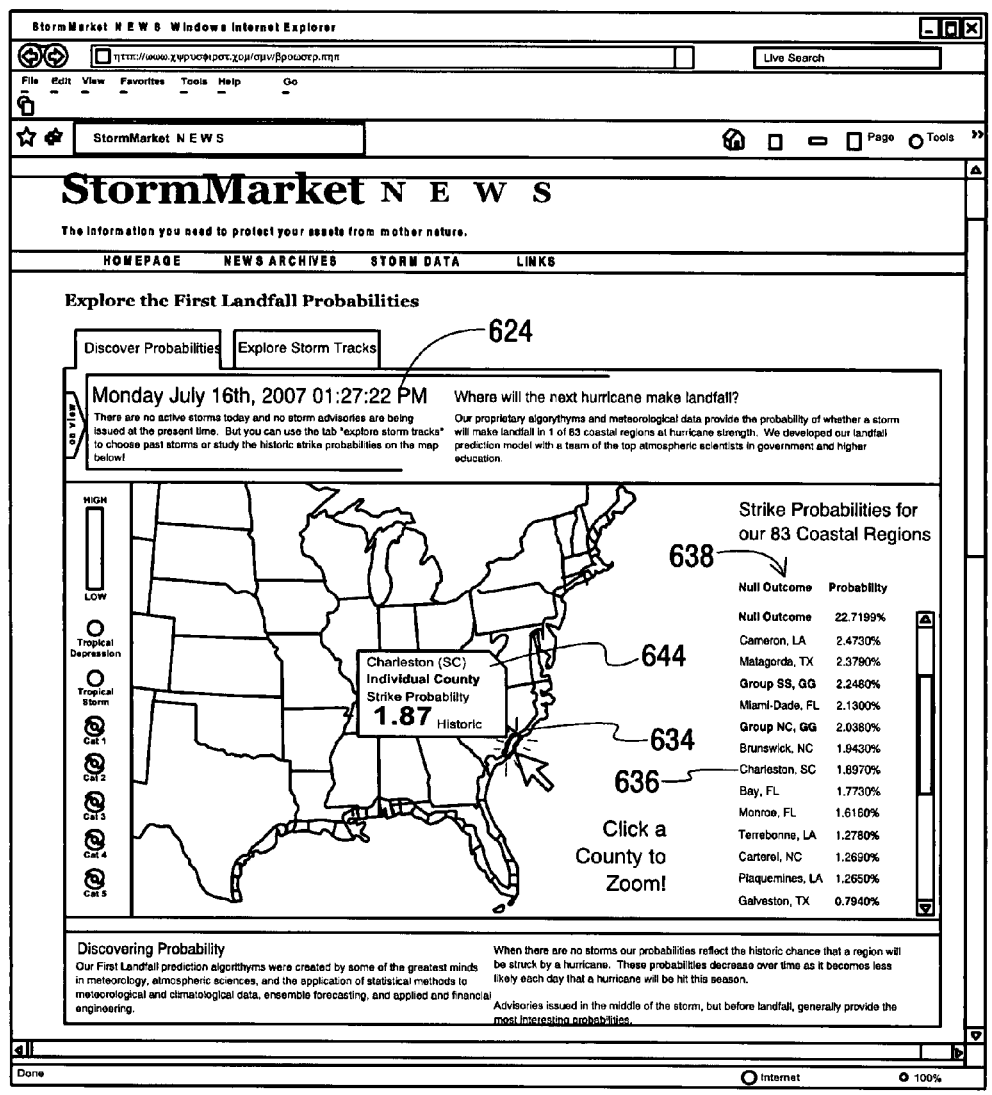
FIG. 26 is a schematic representation of a first computer screen showing the graphical user interface of the subject invention directed to a detailed geographical location.

Referring now to FIG. 26, operation of button 634 is illustrated. As mentioned, button 634 comprises one example of an active graphical selection item. The button 634 may be activated as desired, by a key press for example, or by merely moving the cursor over the button (an intuitive operation, owing to the graphical content of the button). Indicated in FIG. 26 is activation by moving the cursor over a button 634 corresponding to a particular region defined by the financial activity, corresponding to the geographical boundary of Charleston, S.C. The graphical user interface preferably responds in at least two ways. First, an information component in the form of a pop-up message 644 appears next to the selected region.

The pop-up message 644 can contain virtually any desired message content. Preferably, the message contains the probability of a first land strike for the real time indicated in data component 624. Also included in pop-up message 644 is other data related to the financial activity, such as the text name of the region selected and its inclusion in a regional grouping larger than county. As mentioned throughout the figures and the examples of preferred embodiments, the probability of first land strike is monitored by the facilitator of the financial activity and is made available to the participants in a number of different ways. In place of the first land strike probability or in addition thereto, the financial activity could monitor disaster estimates, in real time or on a historical basis, for example. Such estimates could be calculated from meteorological and other types of data, but could also be obtained from risk modeling companies and damage estimate services. For the selection illustrated in FIG. 26, the region selected happens to correspond to a single county, and not part of a larger-sized geographical portion, and accordingly is designated as an "Individual County." Also, characterization data related to the probability is given in the pop-up message, indicating that the basis for the probability as "historic," although other bases could be employed as well. The probability can be calculated in real time, in response to the user selection, or alternatively, can be extracted from a look-up table of previous calculations.

In the preferred embodiment, the graphical user interface responds to the region selection by adjusting the tabular component 638 to display the text button corresponding to the chosen region in the middle of the table, for ready contextual reference. In the embodiment illustrated, entries in the tabular component 638 are ranked according to decreasing probability values, although virtually any ordering or arrangement desired could be employed as well. Also, in the preferred embodiment, the same result could also be obtained by selecting the region's textual button 636, as opposed to the graphical button 634.

Figure 27:
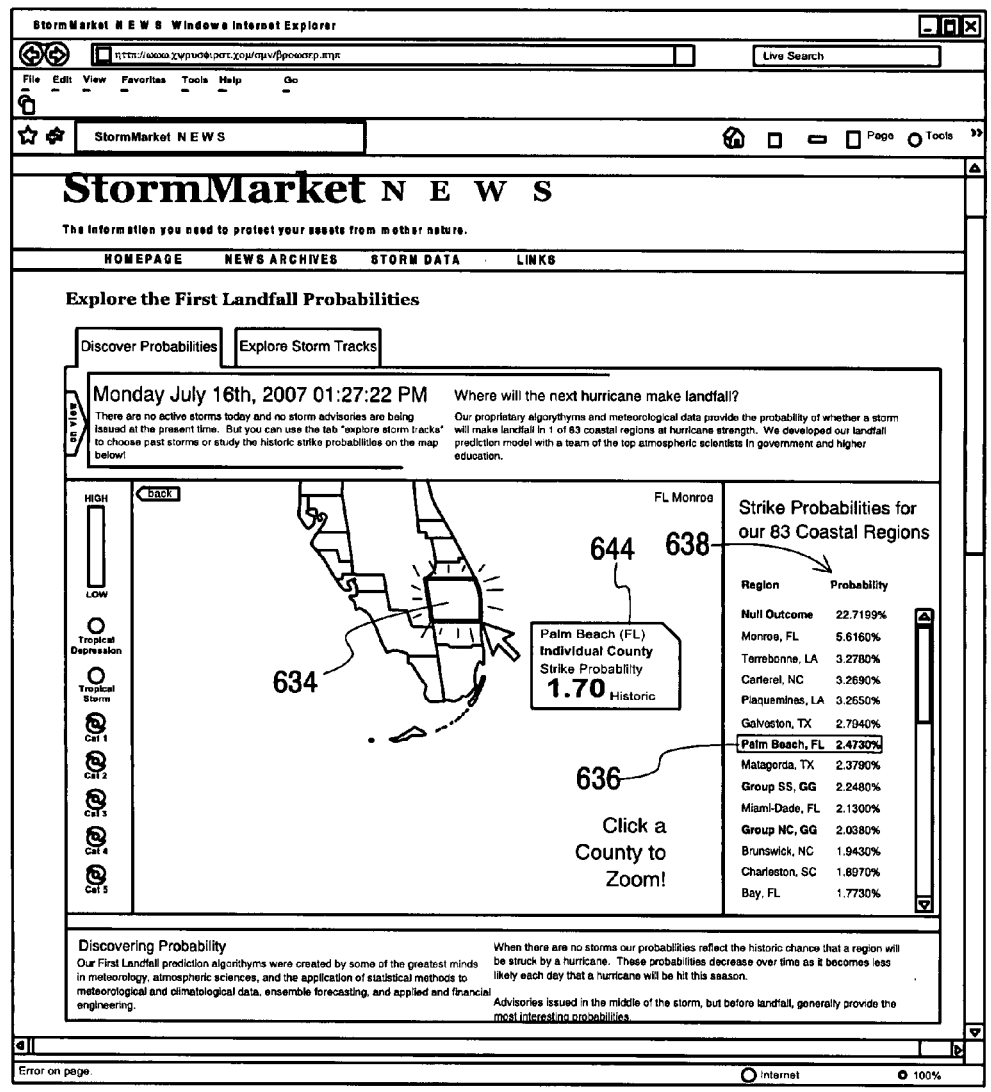
FIG. 27 is a schematic representation of a second computer screen showing the graphical user interface of the subject invention directed to a detailed geographical location.

In the preferred embodiment, by selecting the desired region with a mouse press, the graphical user interface responds by enlarging a portion of the display showing the selected region and its surrounding regions, in the manner shown in FIG. 27. In this figure, the selected region is Palm Beach, Fla., designated by the financial activity as an "Individual County," indicating that the region corresponds to the geographical and/or political boundary of that county of the State of Florida. The pop-up message 644 appears, as before, with information for the region selected, and the textual button 636 is highlighted in the tabular component 638, and centered in that table area. If desired, additional buttons (not shown) can be provided to afford the user the opportunity to place an investment for the selected region, and/or to select the neighboring regions, or to select additional individual regions.

Referring briefly to FIG. 25, button 622 is provided so that the user can select financial activities related to storm tracks and individual storms that have been recorded, with their related data analyzed to the extent necessary. As indicated herein, the U.S. government provides official determinations relating to storm events. For example, the National Hurricane Center publishes ongoing reports of specific storm activity, starting when a storm is a tropical depression at sea, continuing when a storm increases in intensity to become a tropical storm, and then when the storm further increases in intensity so as to be designated a hurricane. Further, when a storm approaches land, e.g. is within 24 hours (estimated) of reaching landfall, official advisories are published at regular intervals, and at the appropriate time, official forecasts are also published. This data is, by its nature, historic, although data points along the course of a storm (the storm "track") are given in the context of real time of near-real time announcements, advisories and predictions. Typically this data is carefully analyzed by one or more responsible government agencies, and is recorded for future use. In one aspect of the present invention, this data is made available to the financial activity user in a comprehensible form that allows a user to digest and correlate large amounts of data, quickly and easily, using graphical and graphics-related tools.

Figure 28:
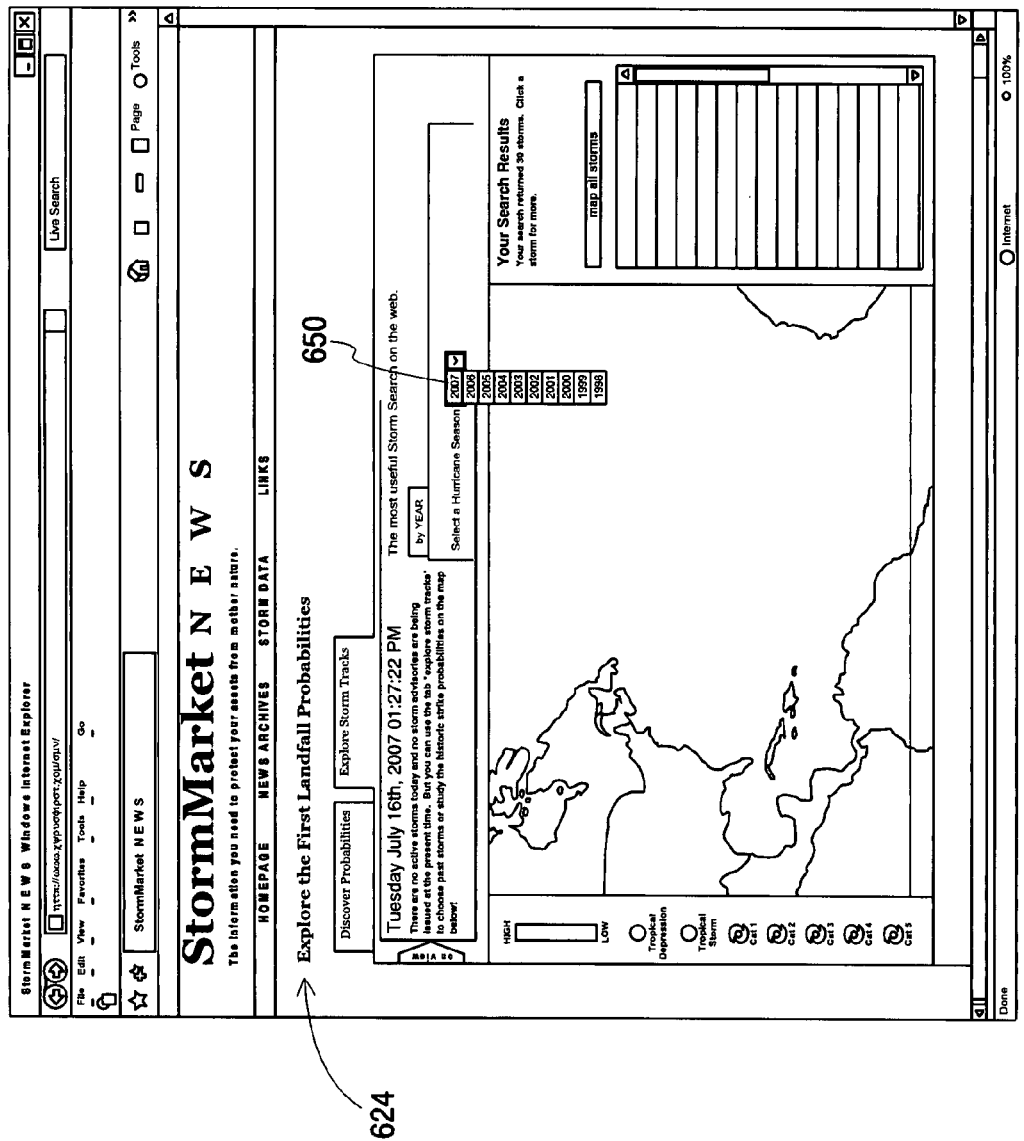
FIG. 28 is a schematic representation of a computer screen showing the graphical user interface of the subject invention directed to an overview of geographically related data for a given year.

Referring now to FIG. 28, the illustrated display is preferably invoked by selecting button 622 in FIG. 25. Included in FIG. 28 is the map 630 of the U.S. Any storm tracks for the current year would be shown, along with their corresponding table entries (to be explained herein). At the current time, there are no storms to report. Note that data component 624 is now blank, indicating that a user selection must be made to proceed further. Also included is an active graphical selection item in the form of a pull-down table 650 that is initially selected to the current year.

Figure 29:
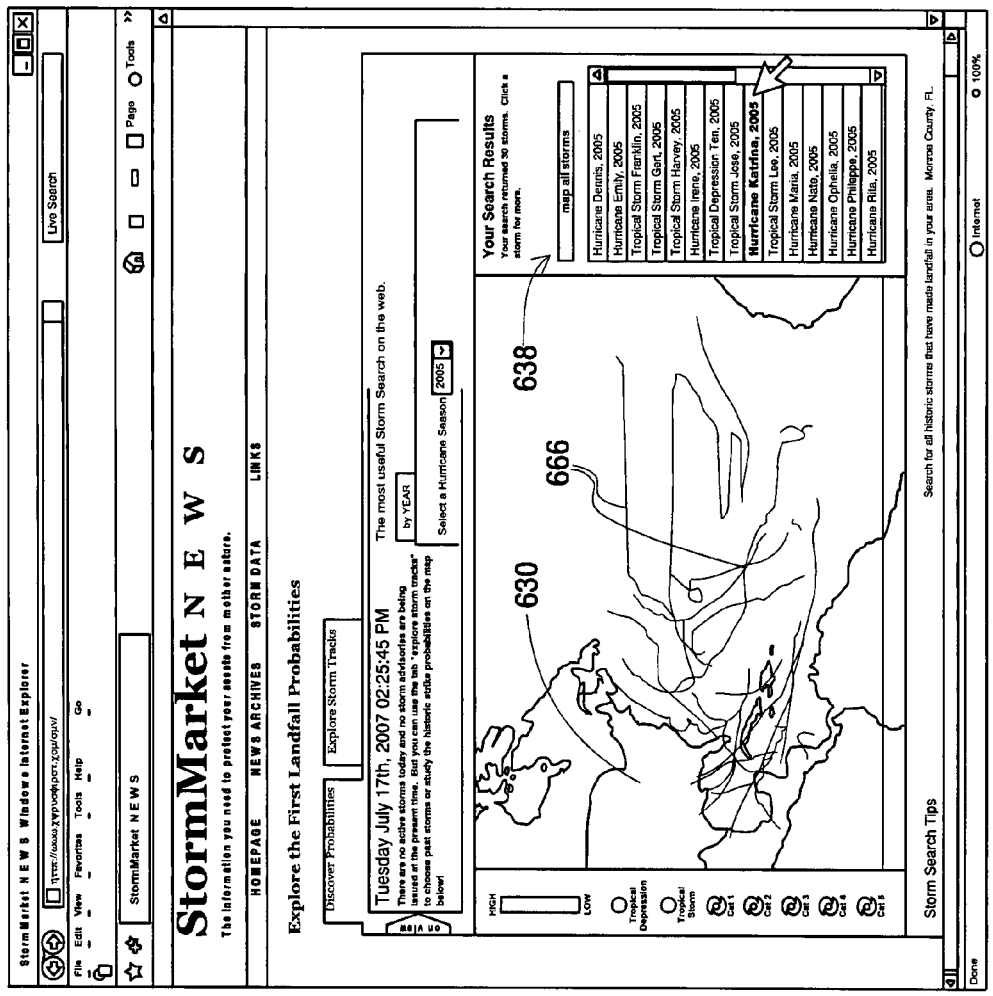
FIG. 29 is a schematic representation of a computer screen showing the graphical user interface of the subject invention offering menu choices to a user, within the context of the chosen year.

If desired, any preceding year or other desired time (such as a seasonal period, a date range, a recurring date or month) provided by the financial activity) can be selected. For example, referring to FIG. 29, the year 2005 is selected. In addition to the map 630 of the U.S., the tabular component 638 is populated with a listing of names of storms that are reported for the selected year 2005. Each entry in tabular component 638 is an active graphical selection item button used to invoke the menu sub-selection illustrated in FIG. 30. FIG. 29 also shows a number of active graphical selection item buttons 666 in the graphical form of storm tracks, i.e. paths of storms reported in the selected time period (herein the year 2005). The same result is achieved by either selecting the storm track button 666 or the textual storm name buttons in the tabular component 638 of FIG. 29.

Figure 30:
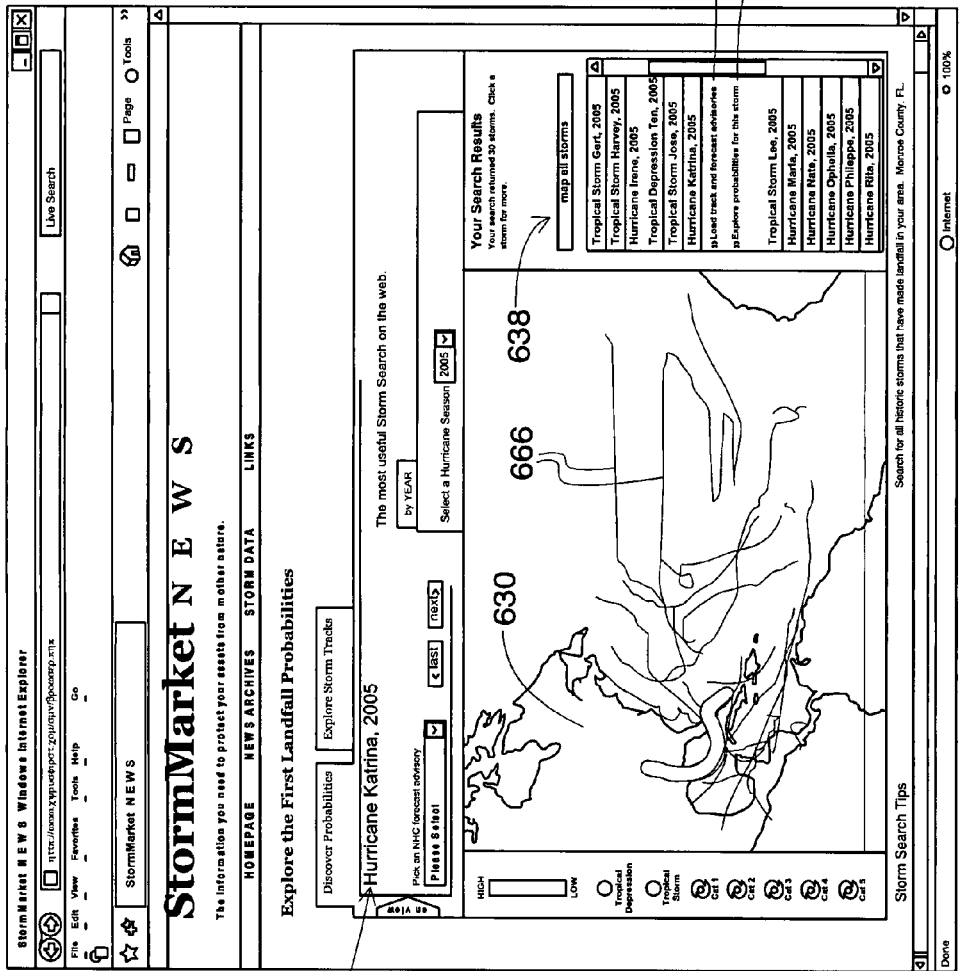
FIG. 30 is a schematic representation of a computer screen showing the graphical user interface of the subject invention offering menu choices to a user, within the context of a given storm occurring in the chosen year.

Referring now to FIG. 30, in the preferred embodiment, for each storm an option is provided to either "Load track and forecast advisories" according to text button 660, or "Explore probabilities for this storm" according to text button 662. Note that data component 624 now indicates the current selection of the storm "Katrina" in year 2005.

Figure 31:
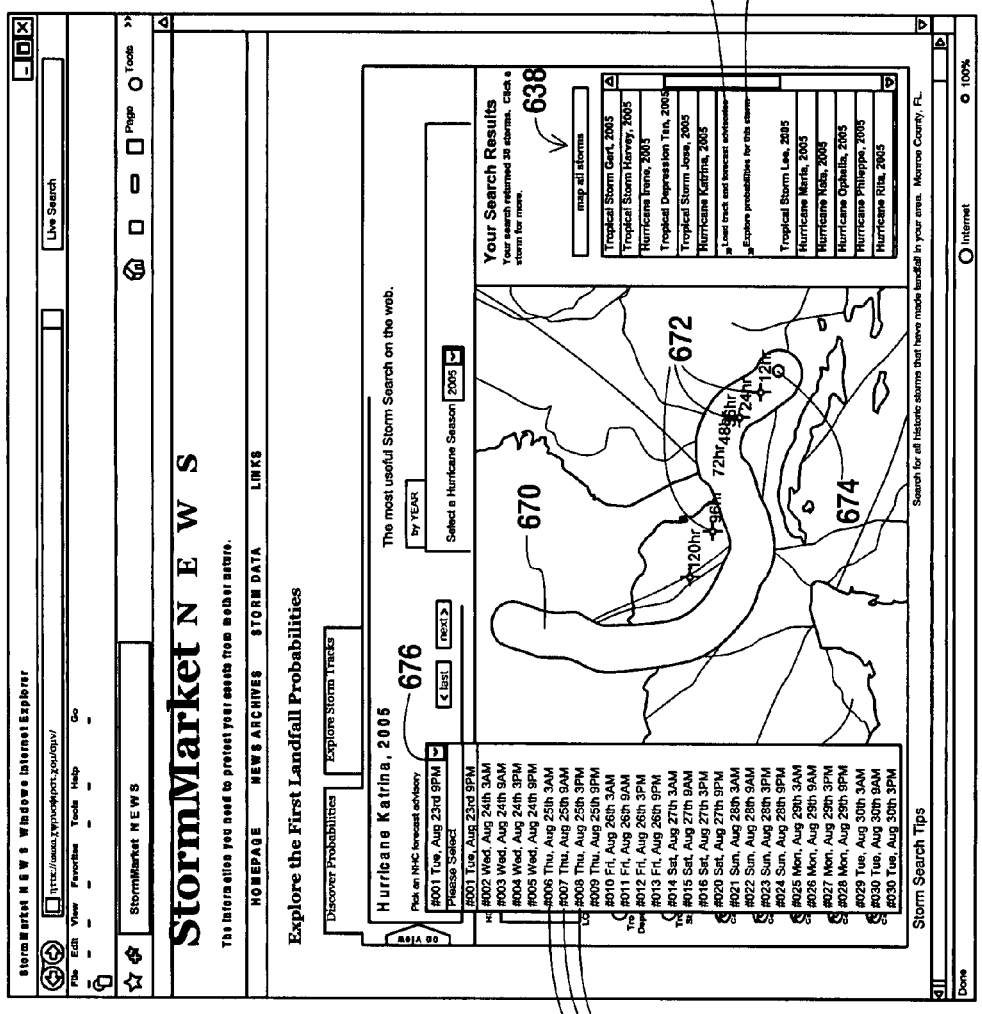
FIG. 31 is a schematic representation of a computer screen showing the graphical user interface of the subject invention offering different sets of data to a user, that are available within the context of a given storm, occurring in the chosen year.

If text button 660 in FIG. 30 is selected, then the track and forecast advisories are loaded for the selected storm in the selected time period, and the display of FIG. 31 is presented to the user. In addition to showing the tabular component 638, with its indication of the selected storm, the storm tracks of FIG. 30 are replaced with a single storm track 670 for the selected storm, shown in an expanded (enlarged width) size, and with a plurality of data points 672, for the point in time indicated in pull-down table. The data points may include, for example, official advisories, such as NHC advisories, other warning or information services provided by the NHC or other third party information source. In the illustrated embodiment, NHC advisories are the preferred data points.

If text button 660 in FIG. 30 is selected, then the track and forecast advisories are loaded for the selected storm in the selected time period, and the display of FIG. 31 is presented to the user. In addition to showing the tabular component 638, with its indication of the selected storm, the storm tracks of FIG. 30 are replaced with a single storm track 670 for the selected storm, shown in an expanded (enlarged width) size, and with a plurality of data points 672 for the point in time indicated in pull-down table. The data points may include a variety of different data types, such as forecast advisories or other forecast products by the NHC or other responsible government agency. In the preferred embodiment, the active graphical selection item table 676 contains a list of storm advisories published by the NHC for the selected storm. Each storm advisory has a textual button 678, preferably corresponding to available storm track data sets that have been reported for each advisory published. Initially, the first table item is selected, and the corresponding data points appear as active graphical selection item buttons 672. When buttons 672 are selected, corresponding data (not shown) is displayed, including, for example, current (i.e. current as of the time of the advisory) storm location, direction, path velocity, internal wind velocities and other storm related meteorological and climatological data.

Figure 32:
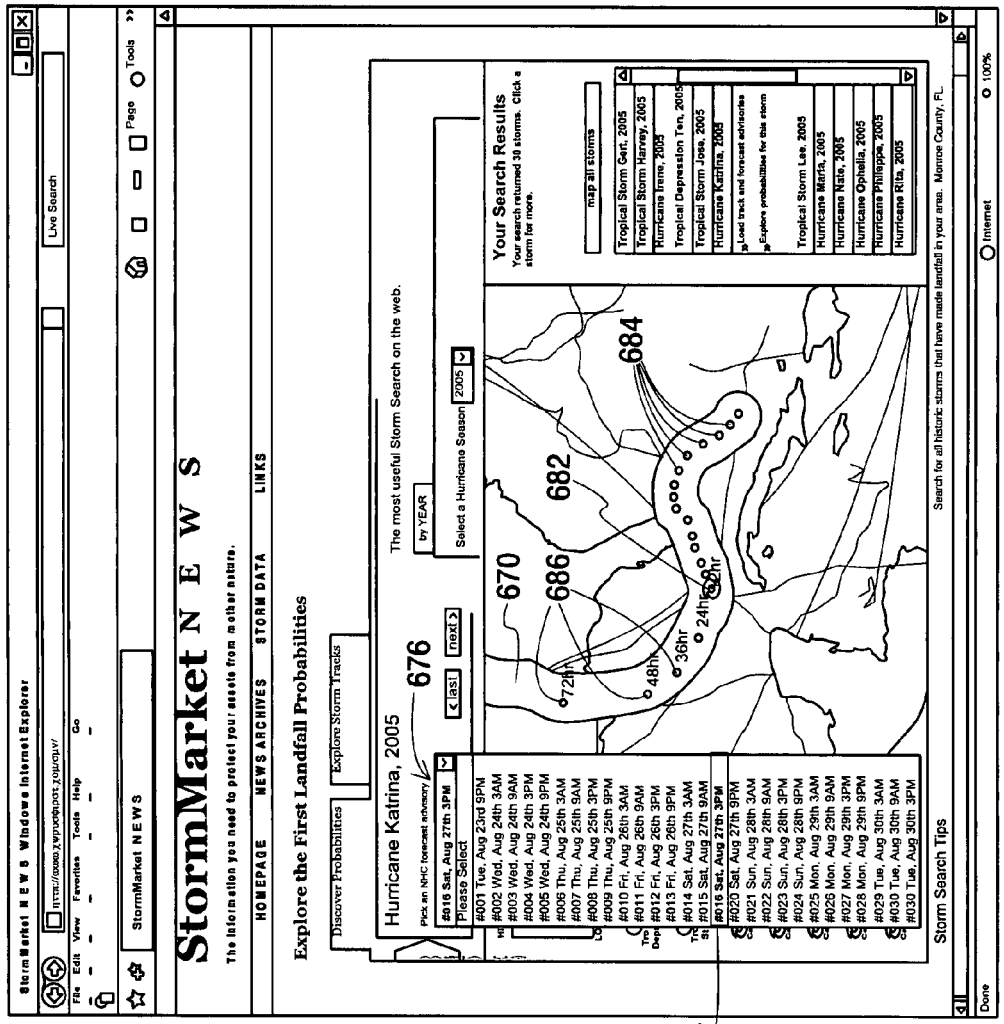
FIG. 32 is a schematic representation of a computer screen showing the graphical user interface of the subject invention identifying a first chosen set of data selected by a user, for a particular day and time, that is available within the context of a given storm occurring in the chosen year.
Figure 33:
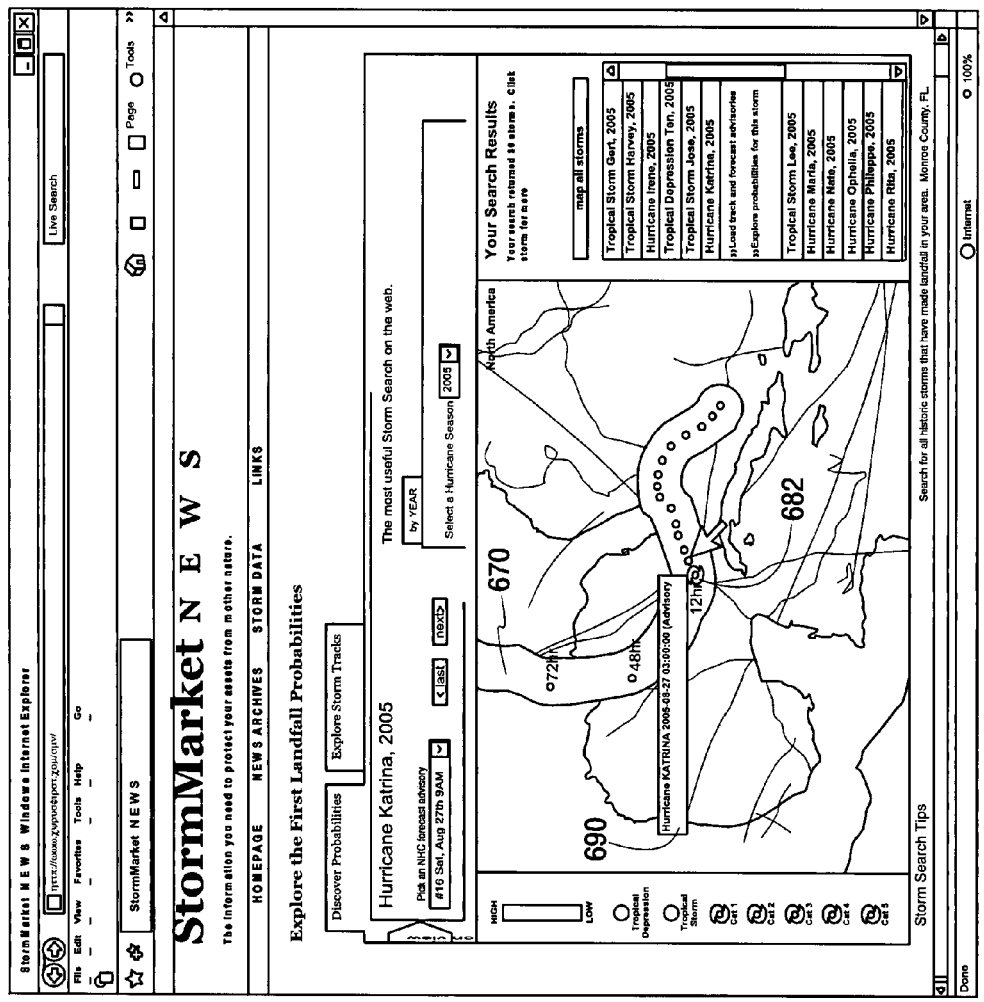
FIG. 33 is a schematic representation of a computer screen showing the graphical user interface of the subject invention identifying a data event selected by a user, for a first particular geographical position for a particular day and time, that is available within the context of a given storm occurring in the chosen year.
Figure 34:
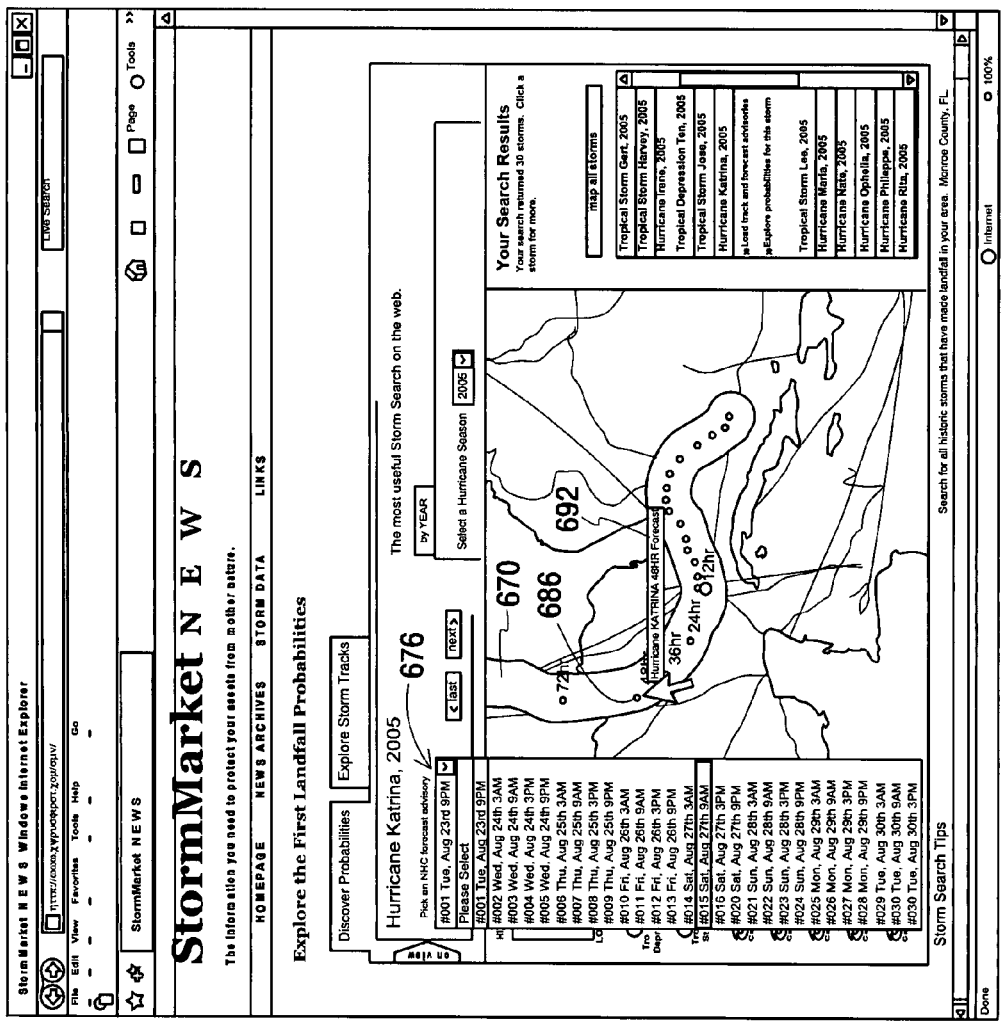
FIG. 34 is a schematic representation of a computer screen showing the graphical user interface of the subject invention identifying a data event selected by a user, for a second particular geographical position for a particular day and time, that is available within the context of a given storm occurring in the chosen year.
Figure 35:
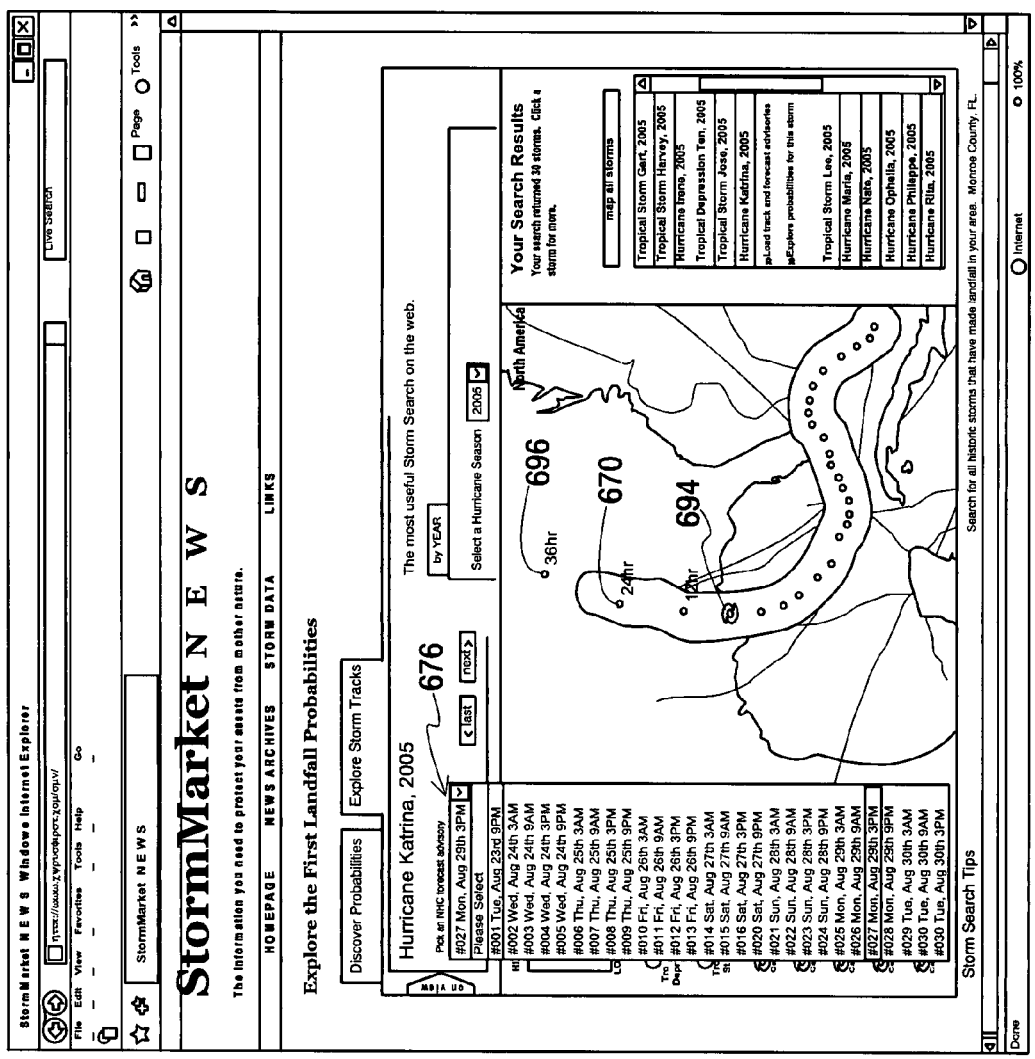
FIG. 35 is a schematic representation of a computer screen showing the graphical user interface of the subject invention displaying another menu choice chosen by a user, within the context of a given storm occurring in the chosen year.

Any of the textual advisory name buttons 678 of FIG. 31 can be selected, as desired. Referring to FIG. 32, the sixteenth advisory for the selected storm has been selected, #016, occurring at Sat, August 27th 9 AM. Preferably, the overall track outline has been retained, but the data points along the track have been updated. For example, data point 682 indicates the "present" location of the storm, now designated as hurricane Katrina. Data points 684 indicate past advisory data points, whereas data points 686 indicate forecast advisories. FIG. 33 illustrates the user selection of data for the data point 682 for the (historically) current position of the storm. Selection of the active graphical selection item button 682 causes data component 690 to be displayed. A similar operation is illustrated in FIG. 34 where forecast advisory button 686 is selected, with the graphical user interface responding by displaying information component 692. FIG. 35 shows the 27th advisory data set that occurred approximately at the time of landfall. Data point 694 shows the historically current location of hurricane Katrina. Note that the 36 hour forecast advisory data point 696 lies outside the storm track 670, indicating that the hurricane level was downgraded approximately 30 hours beyond the selected point in time (i.e. the time of advisory 27 of the 2005 storm Katrina).

Figure 36:
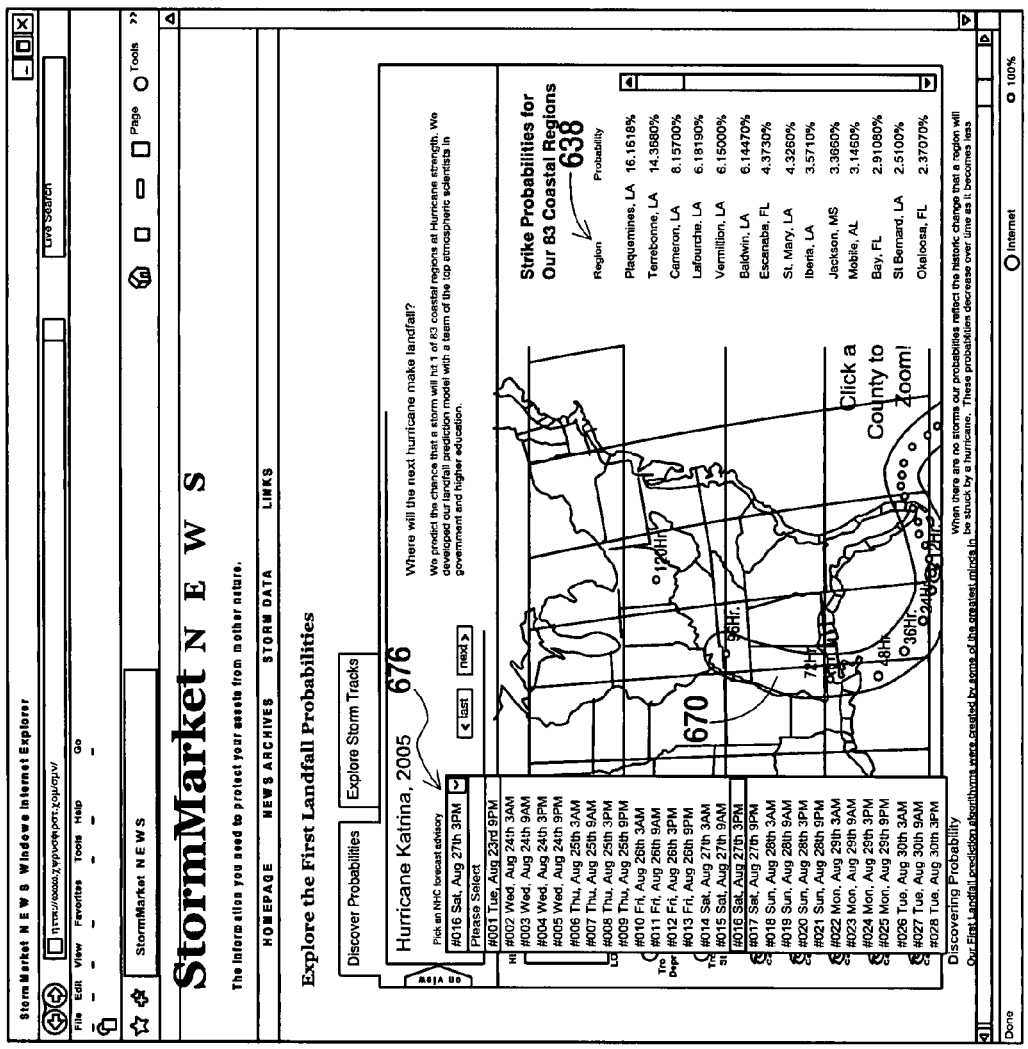
FIG. 36 is a schematic representation of a computer screen showing the graphical user interface of the subject invention with sets of probability data available for selection by a user, for a particular day and time, that is available within the context of a given storm occurring in the chosen year.

FIG. 36 illustrates the path predicted for the storm at Sat, August 27th 3 PM. Note the predicted track 670 stopping at the southern tip of Illinois, slightly after the passage of 96 hours beyond the historically current time. This figure illustrates how forecast conditions, storm event probabilities, vary during the course of a storm. In FIG. 36, strike probabilities are listed in tabular component 638 for this selected point in time. If desired, any of the advisory time points listed in table 676 could be chosen, and in response, the graphical user interface will prepare probability data. If desired, this data can be prepared for all regions available to a user, or the program can wait until the user selects a particular region. Either the region probabilities can be calculated in real time, or previously calculated values can be extracted from available databases or other records available.

Figure 37:
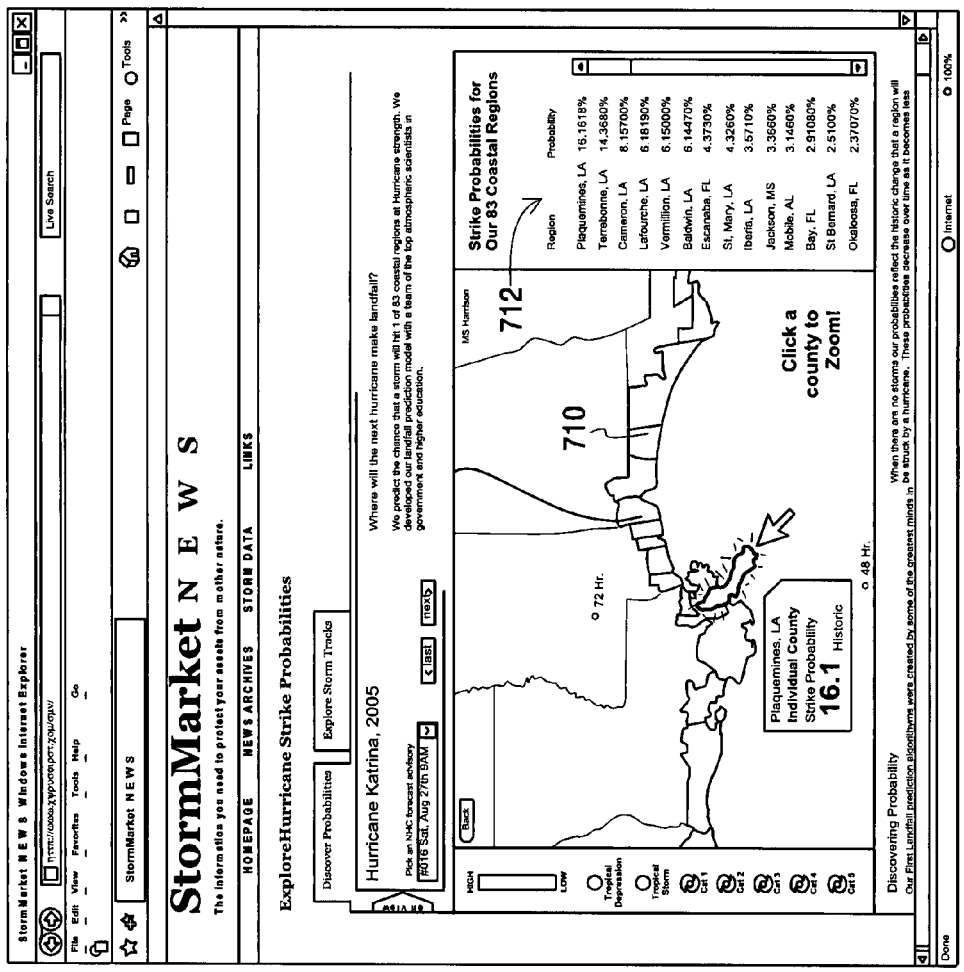
FIG. 37 is a schematic representation of a computer screen showing the graphical user interface of the subject invention with probability data selected by a user, for a particular geographic location, day and time, that is available within the context of a given storm occurring in the chosen year.

FIG. 37 illustrates the probability of first landstrike for a selected geographical location or region, for a particular day and time in history, within the context of a given storm occurring in the chosen year. An information component in the form of a pop-up message 710 appears next to the selected region. Adjacent table 712 displays a ranking of probabilities (and optionally, other data, not shown) for regions in play at the selected date and time in history. The table 712 preferably displays a list of textual buttons representing the names of the regions whose data is accessible to the user.

Figure 38:
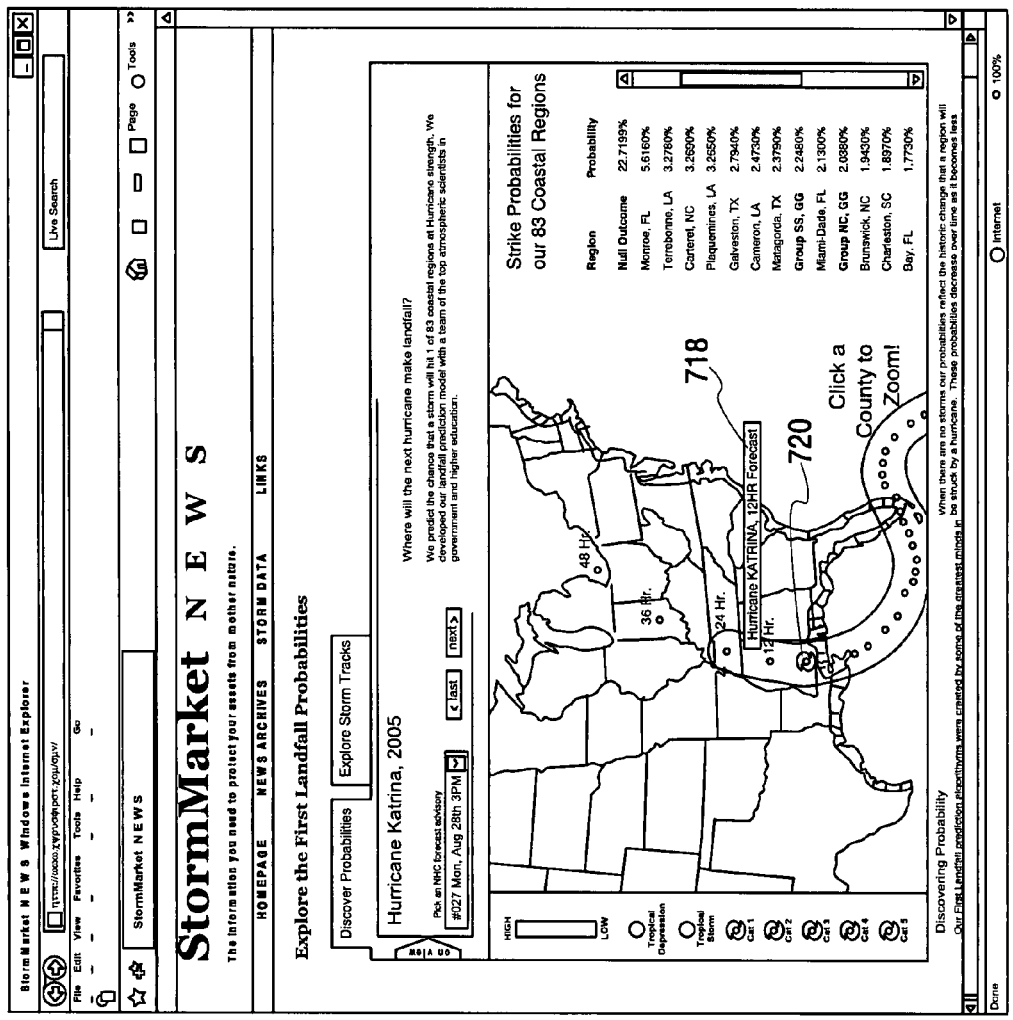
FIG. 38 is a schematic representation of a computer screen showing the graphical user interface of the subject invention identifying a forecast data event selected by a user, for a particular geographical position for a particular day and time, that is available within the context of a given storm occurring in the chosen year.

FIG. 38 illustrates the probabilities of first landstrike for all regions in play, as of a chosen date and time when forecast data available through the textual button 718, applies. As indicated, a complete set of probability data is made available to a user who is studying the investment conditions that existed for an actual storm, located at the position indicated at 720. Included in the data made available to the user, is the National Hurricane Center 12 hour forecast advisory, as indicated above, with reference to textual button 718.

Figure 39:
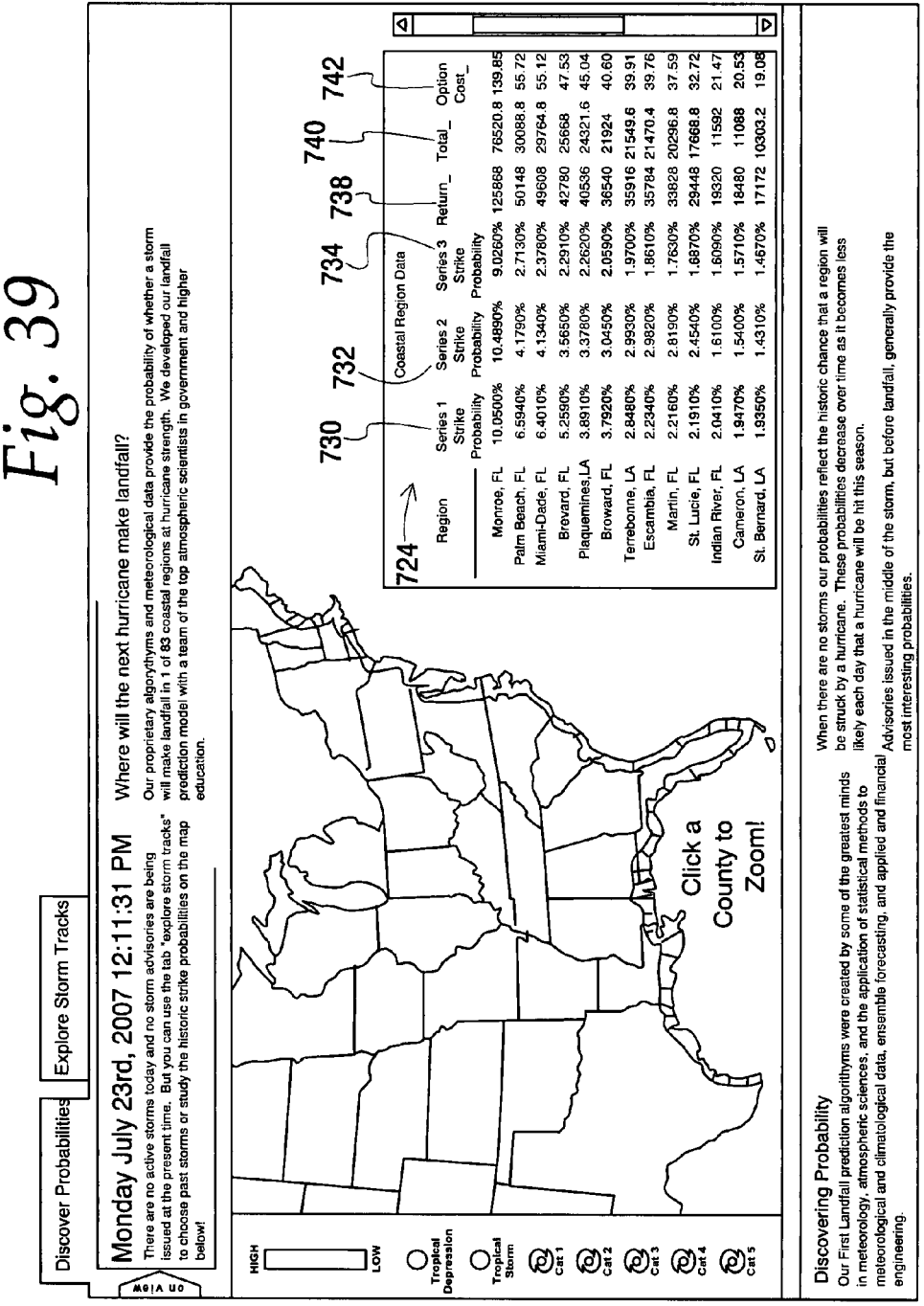
FIG. 39 is a schematic representation of a computer screen showing the graphical user interface of the subject invention with probability data for multiple natural peril events of a given year, along with related investment data.

As mentioned above with respect to FIG. 26, the graphical user interface operating in real time, or near-real time, responds to the region selection by adjusting the tabular component 638 to display the text button corresponding to the chosen region in the middle of the table, for ready contextual reference. In the embodiment illustrated in FIG. 26, entries in the tabular component 638 are ranked according to decreasing probability values, although virtually any ordering or arrangement desired could be employed as well. As indicated in the single column listing of probabilities for corresponding regions, only a single probability is associated with each region is contemplated for the current storm season. Referring now to FIG. 39, multiple probabilities (i.e. three) are displayed for each region.

The arrangement of FIG. 39 reflects a financial activity in which several events are conducted for a given storm season. A number of possibilities exist. Preferably, at the beginning of the year, some small number (e.g. three) events are opened and operated concurrently. In the event of a first hurricane landfall, the first of these is closed, and the remaining two continue—they are preferably not initially opened at that time, as set out in the following example where, as soon as the first landfall occurs in a given storm season, the first events is closed, and a second events is declared open. Under this latter mode of operation, the number of events offered by a financial activity for a given storm season is determined by natural peril events, with the financial activity responding to each land strike in the manner indicated. The table component 724 indicates that three events have occurred at the moment in time indicated. As mentioned, it is generally preferred that this moment in time displayed is as close to real time as possible. In FIG. 39, the probabilities for the first three events are tabulated in columns 730, 732 and 734. Other financial data corresponding to each region listed in the table is also displayed. For example, a theoretical return on investment (assuming an immediate first strike in the region of interest) is given in column 738, a current total investment is given in column 740 and a per-financial investment unit purchase cost is indicated in column 742. Additional data items can be included, either in the spreadsheet style illustrated in FIG. 39, or in a pop-up or pull-down style, for example, as may be desired.

Figure 40:
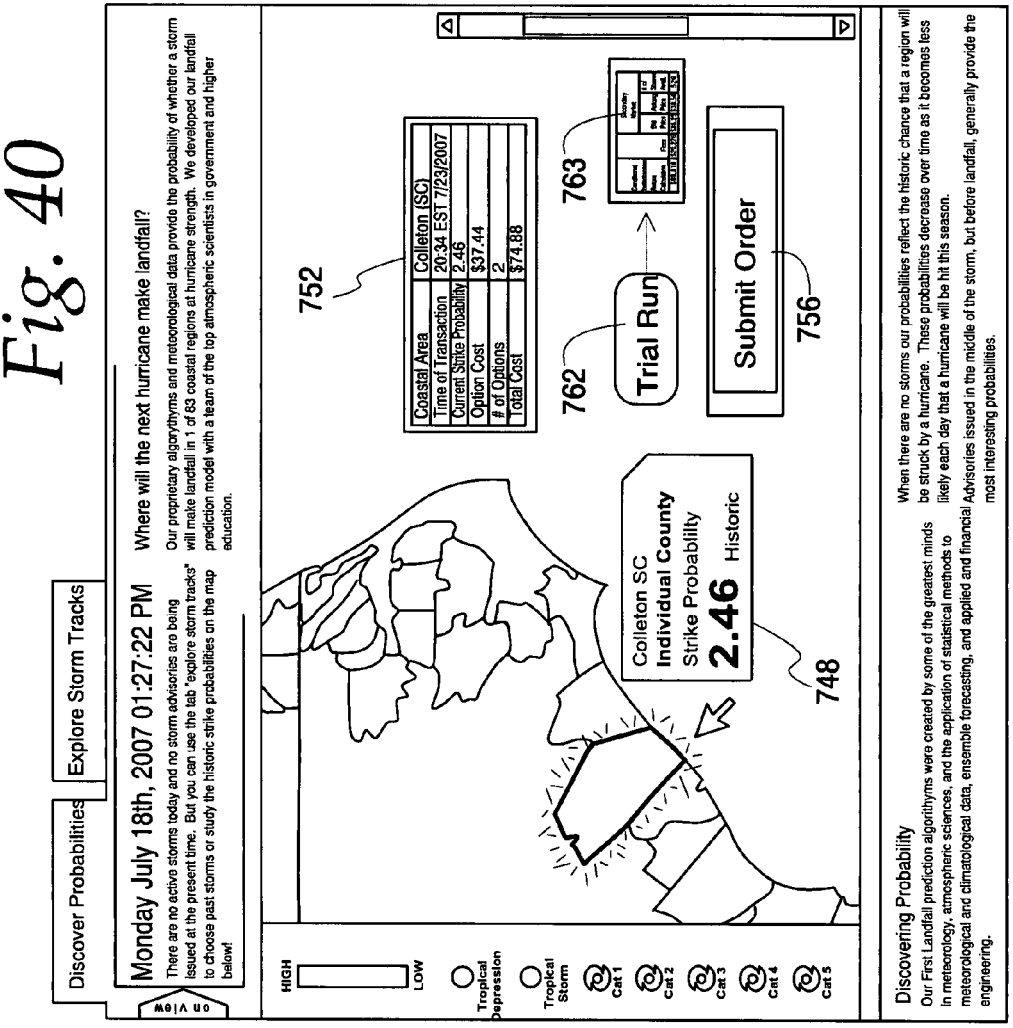
FIG. 40 is a schematic representation of a computer screen showing the graphical user interface of the subject invention displaying investment data for a particular geographical position for a particular day and time.

Turning now to FIG. 40, activities pertaining to a purchase of a financial investment are illustrated. An information component in the form of a pop-up message 748 appears next to the selected region. Message 748 may include probability data, as indicated and/or additional investment data, such as meteorological data. Table component 752 supplies additional data as may be necessary. For example, in addition to providing a textual confirmation of the region selected, the current time, hypothetical rate of return (assuming an immediate strike in the region selected) and financial investment unit cost are displayed to the user. If the user should decide to proceed, the number of financial investment units to be purchased are entered, and the total cost for the transaction is displayed. Alternatively, the user may enter a financial amount, and the programs returns the number of financial investment units that can be purchased for the designated amount. As a final step, the user activates button 756 to finalize the offer to purchase. If the user wishes to explore operation of the financial activity, but also wishes to make certain that an offer to purchase is not tendered, the user can activate button 762, requiring the user to clear the "trial run" status previously chosen, before proceeding with an actual transaction. This causes a display component 763 to appear with a variety of information, relevant to the user's current proposed position.

FIG. 41 shows display component 763 in greater detail. Preferably, display component 763 is provided in the form of a table displaying a variety of data relevant to the user's proposed position, should the designated number of financial investment units be purchased. Included is a Landfall Instantaneous Return Calculation, assuming that the storm immediately makes landfall. Following, is a calculation of a Landfall Conditional Floor, setting out the amount the user can expect to receive if the storm should eventually hit the designated geographical area. A variety of secondary market information is also reported to the user, including the current value of the proposed investment in the secondary market, based on market trading. The bid price, asking price and number of available financial investment units are also given.

The present invention also contemplates that the display component 763 is made available to users when a user logons onto the system at a later date. The display component is updated, either automatically, or in response to a key press to keep the user informed of his position in the market. FIG. 42 shows a summary display of the user's market status, assuming the user has invested in a number of different positions, schematically indicated by display components 763 in FIG. 42. A total display component 770 resembles the individual display components 763, except for showing a total of their data components.

V. Disposition of Hurricane Pool Assets When No U.S. Landfalling Hurricane Occurs It is generally preferred that a "null" event be created as an alternative to a selected geographical region. When employed, the null event is an investment option provided as an alternative to all geographical areas, and indicates the participant's prediction that no hurricane landfall (or occurrence of another natural peril event) will occur for a given financial activity time period.

As mentioned herein, it is possible that an entire year or other period of financial activity can pass without a landfall occurrence. While various arrangements can be provided under exchange rules, it is generally preferred to account for this possibility as an option choice. It is preferred that the option choice be presented for trade as if it were an eligible county or other geographical region. Financial activity rules are preferred that provide for payouts to holders of the null county only at the conclusion of a financial activity period, such as a meteorological hurricane season," generally considered to be December 1 of the current year. If no hurricane makes landfall in the U.S., during the hurricane season, for example, the null county holders for all events or other activities of the season will preferably receive a pay out from a portion of the monies collected.

It can happen that a Hurricane Pool will be closed by the imminent approach of a hurricane which subsequently fails to pass over any U.S. land area, according to the definition of a "hit" used by the Hurricane Pools (e.g. Hurricane Ophelia (2005) would have been one such case). The Hurricane Pools need to have a clear and automatic rule for the disposition of the assets of such Hurricane Pools. Some possibilities are:

1. Preferably, a fund closed by an imminent approach of a storm that does not make landfall is, to reopen that events when it is clear from NHC or other official reports that the storm in question poses no further threat.

2. Transfer all assets and financial investment unit ownerships to the next Hurricane Pool. For example, if Hurricane Ophelia had closed Hurricane Pool #3 in 2005, all investments made in Hurricane Pool #3 would be transferred to Hurricane Pool #4. Financial investment units in Hurricane Pool #4 would then include those reflecting previous investments in Hurricane Pool #4, in addition to those purchased by investments in (the now closed) Hurricane Pool #3. Assets of the combined Hurricane Pool #4 would then have been paid to financial investment units for counties qualifying according to the path of Hurricane Rita, regardless of whether they represented investments in Hurricane Pool #3 or Hurricane Pool #4.

3. Transfer the assets, but not the financial investment unit ownership, to the next Hurricane Pool. Here, the money invested in Hurricane Pool #3 for the hurricane that eventually turned out to be Ophelia would have been transferred to Hurricane Pool #4 and paid according to the track of hurricane Rita, but financial investment units purchased in the original Hurricane Pool #3 in this example, would not qualify for any disbursements.

4. Another rule will be needed to govern assets of Hurricane Pools remaining open at the end of the year. If desired, one of the above options, (although not necessarily the same as that governing mid-season Hurricane Pool closures) or perhaps, some other option could be chosen for pool disposition.

5. The pools can be returned to participants, less management costs, if desired.

6. Preferably, however, an additional outcome, called "null" event is defined. For the Kth events, this corresponds, to the event wherein there is no Kth U.S. hurricane landfall in the current year. Participants purchasing financial investment units in the null outcome split the pool of money at the end of hurricane season, if that events is still open as a consequence of a fund remaining open until that time.

VI. Detailed Consideration of the "Hurricane Pools" Example

I. Introduction

The following is a detailed consideration of the Hurricane Pools example given above. In one example, the number of Hurricane Pools in which players may participate varies from year to year. Initially, K Hurricane Pools are opened, beginning on 1 January of the year before the hurricane season in question. Each of these relate to one of the first K tropical cyclones passing over a portion of the U.S. with at least hurricane-force winds, as determined by the National Hurricane Center or its successors, during the hurricane season (1 June through 30 November). In relatively active years, additional Hurricane Pools may be opened as the hurricane season progresses. The Hurricane Pools entered in a given natural peril event, less portions for state participation and Hurricane Pool management, are paid to entrants according to a formula that accounts for the chances of each hurricane striking the qualifying county(s), as assessed at the time a participant entry is made.

VII. Structure of the Hurricane Pools

A. One Example of Hurricane Pool Financial investment units

Entries (investments) in the Hurricane Pools may be made for individual counties (including the null event, when present in the financial activity), in the form of "financial investment units." The price of a financial investment unit varies in one instance, according to the probability of a hurricane strike on the county for which the entry is made, using information available at the time the entry is made, and modified by a discount factor that encourages early entries and penalizes later entries. Financial investment units are priced relative to a benchmark, or "par" value, defined by an entry for the most vulnerable county historically, (Palm Beach, Fla.) made at the beginning of the hurricane season (1 June). Choice of Palm Beach County as the par level is arbitrary because all of the financial investment unit values are relative; but this choice may have market participant appeal, in that the prices of entries for all other counties will then reflect an apparent discount.

The reference probability for a hurricane strike on Palm Beach county, as well as reference probabilities for the other n counties for which entries are accepted, has been derived from a climatological analysis of U.S. landfalling hurricanes that occurred from the late 19$^{th}$ century through the present. This type of analysis can specify the probability that the center of a hurricane-force tropical cyclone will pass within 75 nautical miles (86.25 statute miles) of the county center in a given year. These values can be adjusted for the size of a county by estimating the probability that a hurricane will track through the county in a given year, assuming that the county has a circular shape. Defining the probability of passage within 75 n. mi. of county i as $Q_i$, the size-adjusted annual climatological hurricane strike probability is, according to the following Equation (1):

$$Q_i^* = Q_i \frac{2(A_i/\pi)^{1/2}}{2 \cdot 87.25} = 0.006541 A_i^{1/2} Q_i, \quad (1)$$

where $A_i$ is the area of the county, in square statute miles. The 87.25 mile counting radius is used to smooth the somewhat erratic historical record of hurricane tracks.

Figure 19:
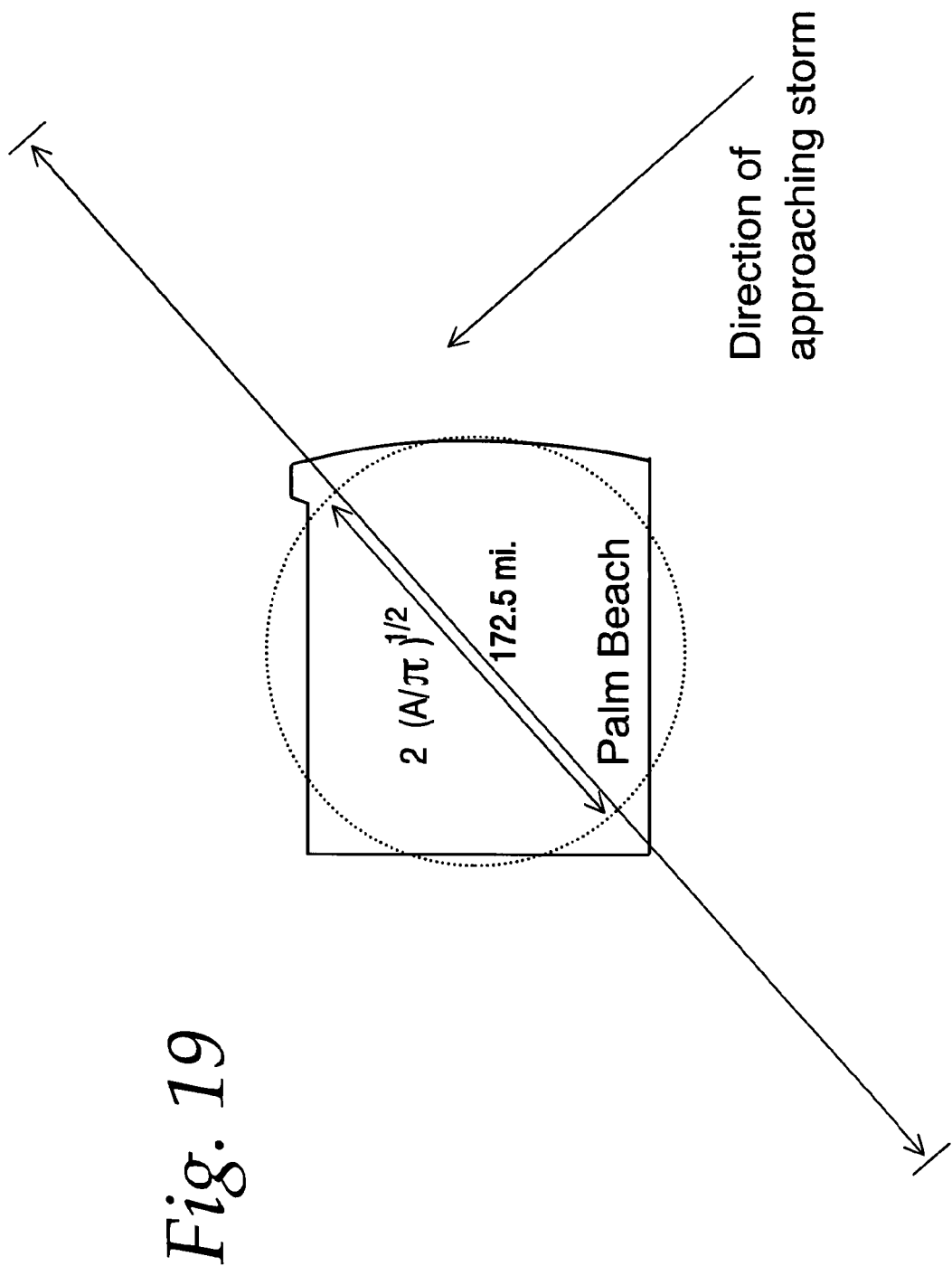
FIG. 19 is a schematic drawing illustrating treatment given to a unit area addressed in an exemplary financial activity.

Referring now to FIG. 19 a schematic diagram indicates a preferred treatment of a geographical unit, herein, Palm Beach county, FL, with an area of approximately A=2230 sq. mi., represented by a circle of the same area (dashed). Hurricane centers passing within 86.25 miles of the county center (long arrows) have a probability of about 0.31 (ratio of the dashed circle diameter to 172.5 ml) of passing through the county itself.

FIG. 19 illustrates the geometry behind Equation (1), for the case of Palm Beach County. The area of this county is approximately A=2230 sq. mi., and the annual probability of a hurricane track within 86.25 ml. of the county center is Q=28.74%. Many storms tracking within this distance of the county center will fail to pass through the county, but the proportion that will do so is given approximately by the ratio of the diameter of the circle approximating the county (=2[A/ ?]$^{1/2=53.3}$ ml.) to twice the search radius defining Q, or 172.5 ml. Therefore, for this county, Q*=28.75% (53.3/172.5)=8.88%. The counties included in the Hurricane Lottery, their approximate areas, and their Q and Q* climatological values are calculated and made available for future reference.

The reference probability for a hurricane strike on Palm Beach county in any single Hurricane Pool is smaller than Q*/100=0.0888, because there are more than one U.S. hurricane landfalls in an average year. This average number of U.S. hurricane landfalls is ?=1.7 hurricanes/year, so the Palm Beach County reference probability is, according to the following Equation (2):

$$p_{ref} = \frac{Q^*}{100\mu} = \frac{8.88\%}{(100)(1.7)} = 0.0522. \quad (2)$$

In addition to depending on hurricane likelihoods for a county of interest in relation to the reference probability for Palm Beach county in Equation (2), financial investment unit prices also increase gradually through the time period that entries are accepted, according to daily compounding of an annualized discount rate D that is multiplied in the financial investment unit pricing formula, according to the following Equation (3):

$$\text{Time-of-entry adjustment} = (1+D)^{\frac{jdate-152}{365}}. \quad (3)$$

Here jdate is the Julian date (consecutive numbering of the days of the year), so that the exponent in Equation (3) is zero, and Equation (3) produces no change in the financial investment unit price, for 1 June (jdate=152). Julian days in the year prior to the hurricane season in question are negative. If the annual discount rate is 5%, then D=0.05.

Figure 20:
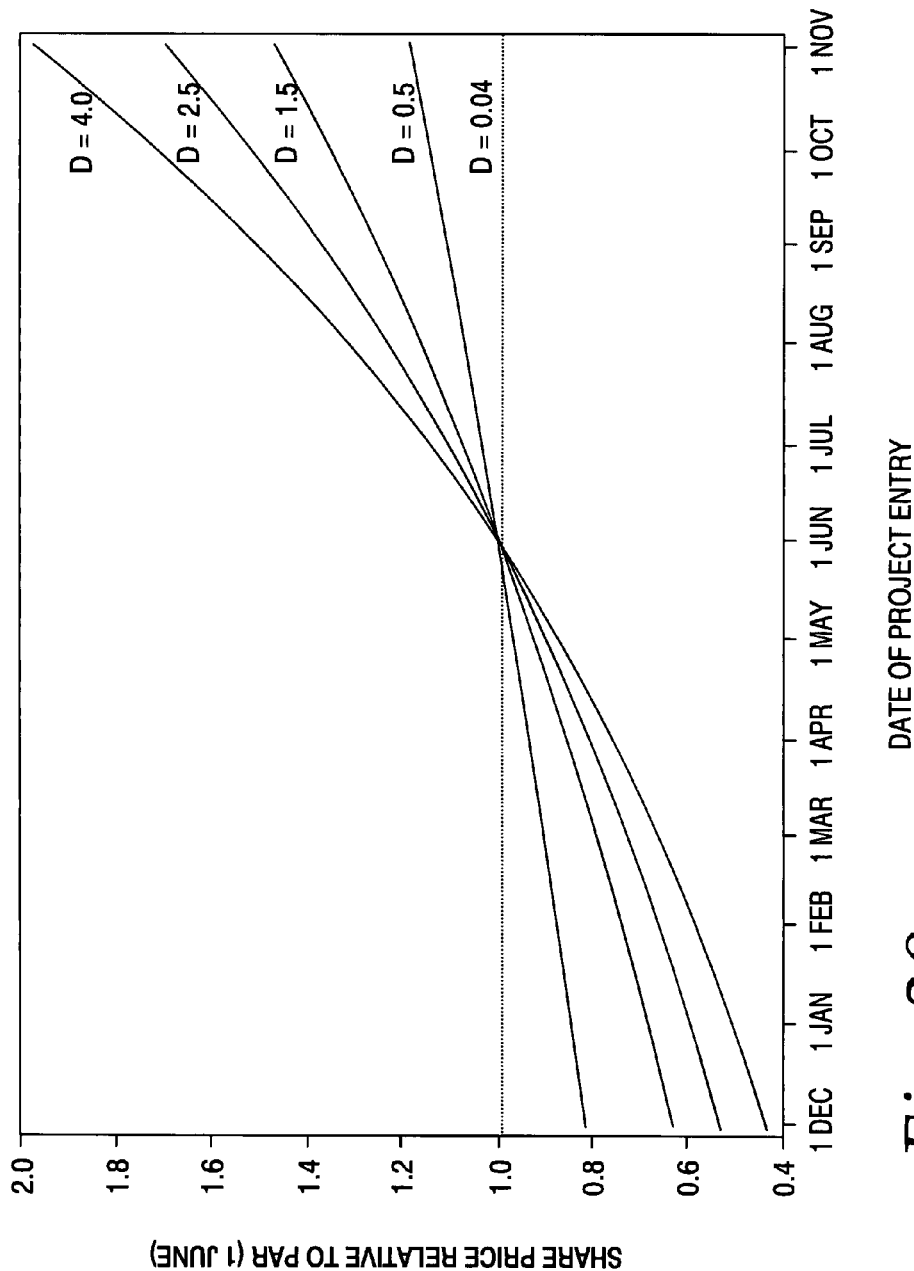
FIG. 20 is a schematic representation of the relationship between financial investment unit prices and dates of participation in a financial activity, prior to occurrence of a natural peril event.

Adjusting financial investment unit prices by multiplying by Equation (3) rewards early entries and penalizes late entries, in part as a compensation for opportunity costs. An appropriate value for the discount rate D needs to be determined, and might be varied from year to year to reflect values in then-current financial markets. However, D should also include a very substantial premium over short- or medium-term interest rates in order for this factor to have a significant effect on financial investment unit prices, and so to encourage contributions to the Hurricane Pools well in advance of the beginning of hurricane season. Referring now to FIG. 20, a graphical plot shows financial investment unit price, relative to par on 1 June, for five values of the annual discount rate, D. FIG. 20 indicates values of Equation (3) as a function of date of entry into the Hurricane Pool, for a range of values of D. The relative financial investment unit price is 1.0 for all discount rates at the par date of 1 June. For current market rates on short-term money (D~0.04, or 4%) the effect on financial investment unit price, shown by the dashed line, is negligible. An annual discount rate of D=4.0 (i.e., 400%) is necessary to produce (for example) a price differential of approximately 15% between 1 May and 1 June.

The price per financial investment unit for a particular county, i, is determined by the probability of a hurricane strike on that county, $p_i$, at the time the entry is made; and in relation to the par value for an entry on Palm Beach county (Equation 2) as of 1 June (Equation 3). These factors are combined to determine the financial investment unit price using the following Equation (4):

$$\text{Price per share} = F(1+D)^{\frac{jdate-152}{365}} \frac{\ln(1-p_i)}{\ln(1-p_{ref})}. \quad (4)$$

This equation is the basic pricing tool for the Hurricane Pools. Here F is an arbitrary pricing factor, that could be chosen according to marketing considerations. It is the par price for one financial investment unit, for Palm Beach County on 1 June. For example, F=1 corresponds to $1/financial investment unit. A higher pricing factor, such as F=100 ($100/financial investment unit) might have the effect of subtly encouraging some participants to enter more money in the Hurricane Pool. The second factor in Equation (4) specifies that entries made before 1 June will be cheaper, and entries made after I June will be more expensive, as indicated in Equation (3) and in FIG. 20. FIG. 21, table 1, shows an example of illustrative financial investment unit prices, in round numbers, for a range of strike probabilities $p_i$, assuming purchase on 1 June, with F=$100/financial investment unit.

Finally, Equation (4) indicates that the financial investment unit price for county i depends on the probability $p_i$ relative to the reference climatological probability $p_{ref}$ for Palm Beach county, through the function $-\ln(1-p)$. This functional form has been chosen in order to obtain financial investment unit prices that are economically logical, particularly toward the extremes of the probability range. For $p_i=0$, Equation (4) produces a zero financial investment unit price: financial investment units in a county are free if there is absolutely no chance for the Hurricane Pool to pay off for that county, and financial investment units are extremely cheap for counties where the probabilities of being affected by hurricanes (e.g., in west Texas) are vanishingly small. At the other extreme, the financial investment unit price approaches infinity as the probability that a hurricane will affect the county approaches 1, so that the Hurricane Pools offer no reward for betting on a sure thing. FIG. 21, table 1 shows the dependence of financial investment unit prices (purchased on 1 June, with F=$100/financial investment unit) on the strike probability $p_i$, for a few illustrative cases. According to equation (4), unless there are Atlantic tropical cyclones currently in existence, counties for which the climatological probability $Q_i^*/(100\mu)=p_i<p_{ref}$ (i.e., all counties except Palm Beach), the price per financial investment unit will be less than F, and accordingly most participants will receive a discount in the purchase price.

VIII. Determination of Strike Probabilities for Equation (4)

The hurricane strike probabilities $p_i$ in Equation (4) are based on the best information available at any given time, that can reasonably be obtained in an automated way by the Hurricane Pool's website software. If no Atlantic tropical cyclones are in existence at the time of a Hurricane Pool entry, that best information will be the unconditional climatological probability of a hurricane strike on the county in question for the $k^{th}$ Hurricane Pool. These will be referred to in the following as "Stage I" probabilities.

Sharper, that is, more detailed, or more accurate or better informed probability information about hurricane strikes can be obtained when one or more Atlantic tropical cyclones are in existence, but are too far from the U.S. for probability forecasts of hurricane-force winds for counties of interest to be issued by the TPC. In such cases, the probabilities $p_i$ in Equation (4) are obtained from climatological values for each county, conditional on the existence of a tropical depression, or tropical cyclone such as a hurricane, in a given sector of ocean. These conditional climatological probabilities will be referred to as "Stage II" probabilities. In another example, pricing may be determined solely, or partially by market activity, in combination with other factors described herein.

Finally, the TPC issues probability forecasts for hurricane-force winds during the upcoming 5 days. These forecasts provide the "Stage III" probabilities, when they extend over land areas of interest, especially, when they predict landfall within the next 24 hours. To the extent that there may be more than one Atlantic tropical cyclone in existence at a given time, Stage II and/or Stage III probabilities for each need to be combined in order to evaluate $p_i$ in Equation (4). In one example, Stage I pricing is determined according to the probabilities and other considerations provided herein, whereas Stage II and Stage III pricing is determined solely by market activity.

A. Stage I Probabilities

The Stage I probabilities are obtained from climatological values, in a way that follows Equation (2) for the reference strike probability for Palm Beach county. In Equation (2), the size-corrected annual strike probability Q* is divided by the average number of strikes per year, $\mu$, to reflect the fact that more than one hurricane affects the U.S. per year, on average, and is converted from percentage to fractional probability. The Stage I probabilities are further corrected to reflect the fact that, for the second and subsequent Hurricane Pools, it is less likely for there to be a corresponding U.S. hurricane landfall. That is, entering the first Hurricane Pool is less uncertain than is entering the second Hurricane Pool with respect to the Stage I probabilities, and so the financial investment unit prices for the first Hurricane Pools should be higher. Similarly, the financial investment unit prices should be higher for the second Hurricane Pool than for the third and any subsequent Hurricane Pools. These adjustments are included in the calculation of the Stage I probabilities using probabilities for different numbers of landfalling hurricanes, as calculated using the Poisson distribution. This distribution is a conventional and well-accepted probability model for allocating probability among the possible numbers of hurricanes in a given year when the average number per year is p. Specifically, the Poisson probabilities for each possible number, X, of U.S. landfalling hurricanes are, according to Equation (5):

$$Pr\{X=x\} = \frac{\mu^x e^{-\mu}}{x!}, \quad (5)$$

$$x = 0, 1, 2, \ldots$$

Using these Poisson probabilities with $\mu=1.7$ U.S. landfalling hurricanes per year, on average, the Stage I probabilities for the $i^{th}$ county in $k^{th}$ Hurricane Pool are, according to the following Equation (6):

$$p_i^{(1)} = \frac{Q_i^*}{100\mu} \frac{Pr\{X=k\}}{1-Pr\{X=0\}}, \quad (6)$$

$$i = 1, \ldots, n.$$

When a Stage I probability is the appropriate risk estimate for county i, $p_i^{(I)}$ is substituted for $p_i$ in Equation (4) to determine the financial investment unit price. For the $k=1^{st}$ Hurricane Pool, the ratio of Poisson probabilities in Equation (6) is 1, so that Equation (6) for County i is exactly analogous to Equation (2) for the reference county, Palm Beach. That is, $p_{ref}$ in Equation (2) is nothing more than the Stage 1 probability for Palm Beach county in the first Hurricane Pool. For the second and subsequent Hurricane Pools, these Stage I probabilities are reduced to reflect the fact that the corresponding hurricanes are less likely to occur. The purpose of this second factor in Equation (6) is to provide a further price advantage to early entrants in the second and subsequent Hurricane Pools, which may not pay off at all, relative to entrants who wait until after the formation of what may become the $k^{th}$ landfalling hurricane before entering. FIG. 22, table 2 shows Poisson probabilities from Equation (5), calculated with $\mu$=1.7 landfalls/year, the corresponding cumulative probabilities Pr{X=x}, and the ratio of probabilities on the right-hand side of Equation (6). FIG. 22, table 2 shows Poisson probabilities for $\mu$=1.7 hurricane landfalls per year, with corresponding cumulative probabilities and ratios of probabilities used in Equation (6).

B. Stage II Probabilities

When an Atlantic tropical cyclone is in existence, the Stage II probabilities p(II) associated with county i being affected by a hurricane may increase from the respective Stage I value, depending on the location and intensity of the storm. These Stage II probabilities are obtained by combining the Stage I probabilities, with conditional climatological relative frequencies of hurricane-force winds occurring within 120 n.mi. (138 statute miles) of each county center, given that a tropical cyclone that is or will eventually become a named storm (i.e., at least tropical storm strength) exists in one of 406 2.5 by 2.5 degree regions of the Atlantic ocean, Caribbean Sea, or Gulf of Mexico. These conditional relative frequencies denote one of these ocean regions in which there is a tropical cyclone as j, and the conditional probability that hurricane force winds due to this storm will eventually occur within 120 n. mi. of the center of county i as $Q_{i,j}$. That is, for each ocean region j, there is a data table similar to that for the unconditional climatological values $Q_i$, although the conditional $Q_{i,j}$ climatological values are calculated with a larger smoothing radius (120 vs. 75 n. mi.) because there are fewer storms from which to calculate the conditional relative frequencies. Accounting for this larger smoothing radius, the size-adjusted conditional relative frequencies $Q^*_{i,j}$ are calculated, analogously to Equation (1), using the following Equation (7):

$$Q^*_{i,j} = Q_{i,j} \frac{2(A_i/\pi)^{1/2}}{2 \cdot 138} = 0.004088 \, A_i^{1/2} Q_{i,j}; \quad (7)$$

$$i = 1, \ldots, n;$$

$$j = 1, \ldots, 406.$$

Stage II probabilities are computed by combining these area-adjusted conditional relative frequencies with the corresponding Stage I probabilities, according to the following Equation (8):

$$p_i^{(II)} = p_i^{(I)} + q_{i,j} - p_i^{(I)} q_{i,j}, \, i=1, \ldots, n; j=1, \ldots, 406; \quad (8)$$

where, according to the following Equation (9):

$$q_{i,j} = \begin{cases} \frac{.837 \, Q^*_{i,j}}{100}, & \text{if the storm in ocean sector } j \text{ is a unnamed depression} & (9a) \\ \frac{Q^*_{i,j}}{100}, & \text{if the storm in ocean sector } j \text{ is a tropical storm} & (9b) \\ \frac{1.72 \, Q^*_{i,j}}{100}, & \text{if the storm in ocean sector } j \text{ is a hurricane} & (9c) \end{cases}$$

Here, 0.837 is the proportion of tropical depressions that have gone on to at least tropical weather strength (1991-2004, reflecting current operational practice at NHC), and 1.72 is the ratio (1886-1998) of the numbers of tropical storms to hurricanes in the Atlantic basin. The purpose of Equation (9) is to reflect the fact that the existence of a hurricane is more threatening, on average, than the presence of a tropical storm, which is in turn more threatening than the presence of a tropical depression. The probability from Equation (8) is substituted for $p_i$ in Equation (4) when the Stage II risk assessment is appropriate for county i.

Equation (8) reflects the increase in risk, over and above the baseline risk to county expressed by $p_i^{(I)}$, attributable to the presence of a tropical cyclone in ocean sector j. The conditional probabilities $q_{i,j}$ are combined with (rather than replace) the Stage I probabilities in Equation (8), because county i continues to be at (climatological) risk for being struck by a hurricane, even if the storm in ocean sector j fails to make landfall as a hurricane. If the conditional probability $q_{i,j}$ is substantial, $p_i^{(II)}$ will be appreciably larger than $p_i^{(I)}$. If the tropical cyclone in ocean sector j has negligible probability of affecting county i as a hurricane, Equation (8) implies $p_i^{(II)} \sim p_i^{(I)}$.

C. Stage III Probabilities

Stage III probabilities will be based on the NHC hurricane wind forecasts provided as part of the official advisory for each tropical cyclone. The system that is expected to be in place for these forecasts for the 2006, 2007, and later hurricane seasons (currently described by TPC as "experimental") will produce probability forecasts for wind speeds of at least hurricane force within the upcoming 120 hours (after each advisory), when these probabilities are at least 2.5%. Examples are shown at www.nhc.noaa.gov/feedback-pws-graphics2.shtml?.

In the current TPC forecast, hurricane-force winds in county i are denoted as $f_i$. Analogously to Equation (8), the Stage III probabilities are computed by combining these forecasts with the Stage I probabilities from Equation (6), again because failure of the current tropical cyclone to affect the U.S. as a hurricane does not preclude the $k^{th}$ Hurricane Pool from paying out for some subsequent storm. Specifically, the Stage III probabilities are computed using the following Equation (10):

$$P_i^{(III)} = P_i^{(I)} + t_i - p_i^{(I)} f_i, f_i > q_{i,j}, \quad (10a)$$

or $$P_i^{(III)} = P_i^{(II)}, f_i < q_{i,j}. \quad (10b)$$

Equation (10b) includes the possibility that the storm in question may affect a county for which $f_i=0$, because these TPC forecasts are set to zero if the probability is smaller than 2.5%. Again the Stage III probabilities from Equation (10) are substituted for $p_i$ in Equation (4) when explicit TPC forecasts for hurricane-force winds are current for some portion of the U.S.

D. Combining Stage II and Stage III Probabilities

It can happen that two or more Atlantic tropical cyclones are in existence at the same time. In such cases, their strike probabilities for each county i need to be combined in some way, to yield the larger probability that either one or the other might affect the county in question. Let $p_i(1)$ be the probability of the first of these storms for county i, calculated using either Equation (8) or Equation (10), as appropriate. Similarly, let $p_i(2)$ be the corresponding value for the second of these storms. If there are only two such cyclones present, the combined probability $p_i$ to be used in the pricing Equation (4) is obtained using the following Equation (11)

$$p_i = p_i(1) + p_i(2) - p_i(1)p_i(2). \quad (11)$$

This probability would be applied equally to the next two Hurricane Pools (assuming that there are two or more) that are still active and accepting entries. If there is a third such tropical cyclone, denote its probability for county i, calculated from the Equation appropriate to its Stage, as $p_i(3)$. The combined probability for county i in Equation (4) would then be, according to Equation (12)

$$p_i = p_i(1) + p_i(2) + p_i(3) - p_i(1) - p_i(2) - p_i(1)p_i(3) - p_i(2)p_i(3) + p_i(1)p_i(2)p_i(3) \quad (12)$$

This probability would be applied to the next (up to) three Hurricane Pools still accepting entries.

IX. Closing Hurricane Pools

Hurricane Pools cease to be available for further entries when the corresponding hurricane is sufficiently close to a U.S. land area. "Sufficiently close" could mean that either a hurricane watch or hurricane warning has been issued for a U.S. coastal county. Because Puerto Rico and the U.S. Virgin Islands are relatively far from the U.S. mainland, a Hurricane Pool can be closed for these two territories without it necessarily being closed for the rest of the U.S. Because of the prevailing westward tracks of tropical cyclones at low latitudes, a Hurricane Pool that is closed because of storm proximity to the U.S. mainland is also closed for Puerto Rico and the U.S. Virgin Islands.

X. Payout Algorithm

Financial investment units purchased in the $k^{th}$ Hurricane Pool for counties traversed by the $k^{th}$ U.S. landfalling hurricane are "qualifying financial investment units." In one instance, these countries are defined by the NHC operational adversaries. In another instance, these counties are defined as those containing a "best track" hurricane position, or a portion of a line connecting two "best track" hurricane positions, as portrayed in the "best track" Table of the official TPC Tropical Cyclone Report for that storm. Payouts are preferably determined by dividing the available Hurricane Pools (e.g. participant entries less state and management percentages) by the number of qualifying financial investment units, and paying that amount for each qualifying financial investment unit.

In cases where there may be multiple tropical cyclones in existence at the same time, priority is determined according to time of first U.S. landfall. For example, if the hypothetical hurricane "Alice" makes landfall after hurricane "Bob," "Bob" would be assigned to Pool 1 and "Alice" would be assigned to Pool 2.

It is anticipated that payouts to Qualifying Financial investment units will be made within two weeks of the final NHC Advisory for the storm in question. In unusual cases, such as for storms that may have the potential to reintensify and affect the U.S. again, Pool payouts may be delayed beyond two weeks at the sole discretion of the Pools Administrators. In all cases, Pools disbursements will be made on the basis of the best and most recent information available from the National Hurricane Center at that time about the storm in question, and will not be subject to revision in the event of subsequent updates to that information. In the event, however, that there is no landfall officially reported for the season or other time period, a "null" event can be provided as an investment option, as described herein.

XI. Caveats Regarding Pool Payouts

The above rules for determining Qualifying Financial investment units have been somewhat idealized, relative to real-world hurricane behavior, in the interest of having a promptly available, clear, explicit and automatic way of disbursing Pool assets to Qualifying Financial investment units. In particular:

There will often be counties experiencing hurricane-force winds and/or other hurricane impacts that nevertheless do not qualify as having been "hit" according to the definition used by the Hurricane Pools. This will be the case especially for the larger and more powerful storms. Pool market participants whose intention is to, in effect, supplement their insurance coverage will therefore be encouraged to invest in surrounding counties also. To encourage market participants to protect themselves, the Pools site will automatically flash several counties which border the county initially selected and urge market participants to spread their investment to include surrounding counties. In this manner, which we call a "collar" the market participant will have greater opportunity to collect pools if damage occurs but the eye of the hurricane does not enter their county.

Because qualifying counties are determined on the basis of storm positions only at particular, and possibly irregular times, small discrepancies between the calculated track (used to determine Qualifying Financial investment units) and the actual track (as determined some months later in the official NHC Tropical Cyclone Report for that storm, or that might be evident at the time of the storm from a events of weather-radar images, for example) can and will occur. Again, it may be advisable for some individuals to invest in nearby counties, in addition to the county(s) in which they have the most interest.

The U.S. Census Bureau data files are only approximations to the true geographical outlines of many counties. They consist of a collection of line segments, and so will not accurately follow curving county boundaries. In addition, portions of some counties (particularly relatively small islands) are not included in the Census Bureau's Cartographic Boundary Files. For example, the Dry Tortugas are not included in the Cartographic Boundary File for Florida, so that a hurricane passing over this portion of Monroe County, Fla., would not by itself constitute a "hit" on Monroe county for the purpose of determining Qualifying Financial investment units.

XII. Website Features

The Hurricane Pool will preferably be run through a website that calculates financial investment unit prices automatically, according to information from TPC advisories that are updated four times daily. Accordingly, it may be necessary for the site to be unavailable for accepting entries for short, pre-scheduled, periods of time every 6 hours for example. In addition, the website may need to be able to close from time to time on an unscheduled basis, in order to incorporate new information that is occasionally provided by the TPC at other than the scheduled 6-hourly update times. The lengths of these website blackout times, if any, will depend on the speed with which the NHC advisories can be obtained, and their information transformed to updated hurricane probabilities for the Hurricane Pool. Even when there are no Atlantic tropical cyclones in existence, financial investment unit prices will be updated during the regular blackout periods, by incrementing the date, jdate in Equation (4), by 0.25, four times daily.

Preferably, first-time entrants will need to register. Password protection may be preferred if a single credit-card account is to be associated with each registration, in order for any eventual payouts to be made to that account. SSN information is preferably made part of the registration in order for the IRS (and possibly also some states) to track tax liability on any payout. As an alternative, an outside service can provide credit or other financial services.

Current financial investment unit prices (or other financial investment unit) for all available counties are preferably displayed both graphically and in tabular form. Clickable maps (whole-coast, and individual state) are also preferably made available, with financial investment unit prices indicated approximately with a color code. State-by-state pull down menus could also be provided if desired. Participants are preferably given the option of specifying their entries either in terms of financial investment units bought, or dollars to be entered, for each county selected.

Preferably, a whole-state entry can be defined by automatically issuing an equal number of financial investment units for each county in play, within the state in question. This approach would place more money on counties more likely to be affected, and so would severely down-weight essentially zero-probability counties, such as those in west Texas. Here the number of financial investment units bought for each county is simply the dollar amount to be entered, divided by the sum of financial investment unit prices according to Equation (4), over all counties in that state.

The sums entered to date in each Hurricane Pool (and available for subsequent payout) are preferably posted and continuously updated. However, it may be difficult to calculate for potential entrants the possible payoffs for particular entries that they are contemplating, because those payoffs will depend on the track of the eventual storm in question. However, it is also possible to show a minimum payout or "floor" when such feature is desired.

As mentioned above, it is sometimes preferred to provide an expectation of a minimum payout or "floor" for participants that suffer damage from a natural peril event. The "floor" is a minimum payout, conditional on the county or other geographical area in which an market participant holds an investment unit being "hit."

XIII. Algorithm Parameters

As noted above, several parameters in the financial investment unit price algorithm are adjustable. In one example these parameters could be defined before the beginning of a given year's Hurricane Pools as follows. These exemplary parameters are:

K=# of Hurricane Pools that will be opened initially.
n=# of counties in the game
D=discount rate (as discussed above)
F=pricing factor (as discussed above)

The choice for the number, K, of initial Hurricane Pools to be run involves a tradeoff between numbers of years when one or more Hurricane Pools do not pay off, versus numbers of years when there are more U.S. landfalling hurricanes than initial Hurricane Pools. Using the Poisson probabilities from FIG. 21 table 1, these tradeoffs are approximately as indicated in FIG. 23, table 3.

If all counties in an included state will be in play, it is necessary only to specify the states to be considered in order to determine n. For example Oklahoma has a single county with Q≠0, and Kentucky has seven. All eight of these have Q=0.01. Accordingly, it is preferred that these states not be included in the financial activity. A large number of effectively irrelevant counties may also be excluded under this plan, especially in Texas, but also in Arkansas and Tennessee.

Preferred Characteristics

As noted above, a number of different alternatives and variations in conducting financial activities are possible. The following discusses representative alternatives and variations which are preferred, but not necessarily required. Although the following exemplary preferred characteristics may, generally speaking, be compatible with one another, it is possible that any number of these characteristics could be made inconsistent with, or mutually exclusive of other characteristics. These exemplary characteristics include:

1. Variability factors affecting at least one of said investment price and said distribution/payout. It is generally preferred that variability factors include, at least a consideration of the time interval between investment and event occurrence and a defined probability of predicted outcome, preferably set at the time of investment. Other variability factors may also be incorporated.

2. Prices charged to participants for their chosen investments preferably continually change due, for example, to the variability factors at play at a given time. In general, it is preferred that there be no elimination of price changes to shorten processing delays, or for other reasons.

3. Prices at any given time for any predicted outcome are preferably made to be the same for all participants.

4. Payouts to successful, qualifying participants are preferably made according to the same set of rules which apply to all participants. Generally speaking, it is preferred that no rewards be given for preferred participants.

5. All winners (qualifying participants) of the financial activity share in the pot. That is, it is generally preferred that there are no odds multiplying a participant's investment. Also, it is generally preferred that payouts are not made from the provider's personal account—unlike the "House" of certain gambling activities which pays out winning bets from its own account.

6. Provider does not engage as a participant. For example, it is generally preferred it that there be no hedging where, for example, there may be excessive bidding.

7. Participants do not compete against the "house" i.e. the provider.

8. In certain instances, it may be preferable to limit financial activity to only the United States and its territories and possessions.

9. Financial activity encompasses a single event or type of event over a given "season".

10. It is generally preferred that the participants be able to objectively and independently observe the events for themselves, as they unfold.

11. It is generally preferred that, apart from financial responsibility, a participant's investment be "accepted" only in terms of data format. Optionally, acceptance can be related to an optional investment cap. It is generally preferred that there be no extra qualification for each investment occurrence.

12. It is generally preferred that financial activity be carried out as much as possible in real-time, and that this be made possible by virtue of rules definitions, especially definitions of events and event outcomes which occur in a well defined environment/system. It is generally preferred that the selection of events for the financial activity be limited to an absolute minimum—i.e. a single event.

13. It is generally preferred that the financial activity be restricted to tropical weather events, and in one instance, only to hurricane events.

14. It is generally preferred that the financial activity be further restricted to events comprising at least one of said landfall and said land track. It may also be preferable in certain instances to limit financial activity to hurricanes having a certain category strength at some defined time during the ongoing financial activity.

15. It is preferable, in certain instances, that multiple stages of probability assessment be applied to at least one of said investment and said payout.

16. It is preferable in certain instances that the external objective independent information source be limited to the National Hurricane Center (NHC), and optionally to its subsidiary and/or related agencies (e.g. TPC).

Other Preferences

In addition to the above preferred characteristics, it is generally preferred that the graphical user interface be used to convey educational information to participants, on an ongoing, developing basis. For example, it is generally preferred that the participants be provided with a rich source of information to inspire further interest in the financial activity and the skills which it sharpens. For example, it is generally preferred that live feeds of various external objective independent information sources be relayed to the participants on an ongoing basis. For example, storm locations and changing intensities, along with their projected path can be displayed on a flat map. This type of data can be obtained from the National Hurricane Center, for example. Other competing predictions from other independent sources could also be displayed, preferably in different colors on a common map.

As storms advance and locations change, it is preferred that calculations of updated current pricing and returns be displayed on an ongoing basis, with any necessary qualifying assumptions being made available to the participants.

Also, it is generally preferred that the current dollars invested for particular geographical areas be displayed along with historical odds or probabilities for the geographical area, thus making it possible for participants and interested observers to determine what the payout will be under the specified conditions, if the storm should develop as predicted. For example, payoffs for a given geographical area can reflect different times of investment, different total amounts of money invested in the overall financial activity, different severity levels or other characteristics of the storm and the probability that the storm will hit the area of interest, based upon historical data and/or near term predictions. It is also generally preferred that the participants and interested observers be able to access a data window showing the current total of pools invested, and a profile of geographical areas with the number of investments being made for that local area.

In general, it is preferred that the financial activity have an educational study component to sharpen a participant's knowledge and skills useful for improving their financial position. This knowledge and skill level will also help the participants cope with the reality of being subjected to potentially harmful storm activity. It is also generally preferred that the financial activity display helpful information to participants, such as checklists of items needed to prepare for an oncoming threatening event. These checklists can help organize participant's activities in the decreasing preparation time available. If desired, checklist information can be solicited from participants and posted in a public viewing area. In another example, a display area can also be provided showing constantly updated damage estimates, threats to life and similar public safety-related information.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims. For example, various communication functions can be grouped into one or more communication units to perform one or more communication tasks. Any of the examples and alternatives provided herein could be combined in whole or in part with one another, as may be desired, and can be combined with one or more features set forth herein.

I claim:

1. A computerized method of offering for purchase, positions predicting a future first natural peril landstrike resulting from a substantially continuous ongoing natural process culminating in a future first natural peril landstrike, comprising:

providing a computer graphical user interface having first and second portions;

providing a database containing 1) a map of geographical areas corresponding to the positions to be offered for purchase, 2) strike probabilities of future first natural peril landstrikes for the geographical areas; and 3) offer prices for purchasing positions predicting future first natural peril landstrikes in respective geographical areas, that are based at least in part on respective strike probabilities;

displaying the map in the first portion of the graphical user interface with user selectable portions corresponding to the geographical areas of the map;

during the substantially continuous ongoing natural process, electronically obtaining updated data providing the basis for electronic calculations of strike probabilities of a future first natural peril landstrike for the geographical areas; and in response to a user selecting a user selectable portion and thereby indicating a geographical area for selection, displaying in the second portion of the graphical user interface, an offer price, electronically updated in substantially real time so as to be based at least in part on an updated strike probability, for purchasing a position predicting the future first natural peril landstrike in the indicated geographical area.

2. The method according to claim 1, wherein the positions comprise derivative securities interests predicting the eventual outcome of the future first natural peril landstrike as a combined call on one geographical area predicted to be struck by the future first natural peril landstrike and a put on all other geographical areas.

3. The method of claim 2 wherein the derivative securities interests comprise one of said futures contract, said options contract and said option on futures contract.

4. The method of claim 2 further comprising:
electronically assigning a value to derivative securities interests purchased;
determining the outcome of the future first natural peril landstrike; and
assigning a portion of the value to derivative securities interests predicting the determined outcome of the future first natural peril landstrike.

5. The method according to claim 1, further comprising, in response to the user selecting the user selectable portion, displaying in the second portion of the graphical user interface, a strike probability of a future first natural peril landstrike for the indicated geographical area.

6. The method according to claim 1, wherein the second portion of the graphical user interface displays data in the form of a table.

7. The method according to claim 1, further comprising a third portion of said graphical user interface for entry of order data including a designation of the indicated geographical area and the offer price for purchasing a position predicting a future first natural peril landstrike in the indicated geographical area.

8. The method according to claim 7, further comprising a fourth portion of said graphical user interface for confirming a commitment to purchase a position corresponding to the order data entered.

9. A system for offering purchase positions predicting a future first natural peril landstrike resulting from a substantially continuous ongoing natural process starting with a reported precursor tropical storm at sea and culminating in the future first natural peril landstrike, comprising:
a computer interface module for electronically providing a graphical user interface having first and second portions;
a database containing 1) a map of geographical areas corresponding to the positions to be offered for purchase, 2) electronically calculated strike probabilities of a future first natural peril landstrike for the geographical areas; and 3) offer prices for purchasing positions predicting a future first natural peril landstrike in respective geographical areas, electronically calculated, at least in part, on respective strike probabilities;
the interface module communicating with the database to display the map in the first portion of the graphical user interface with user selectable portions corresponding to the geographical areas of the map;
the database further containing electronically updated data during the substantially continuous ongoing natural process, that provides the basis for electronic calculations of strike probabilities of a future first natural peril landstrike for the geographical areas; and
the interface module, in response to a user selecting a user selectable portion and thereby indicating a geographical area for selection, displaying in the second portion of the graphical user interface, an offer price, electronically updated in substantially real time so as to be based at least in part on an updated strike probability, for purchasing a position predicting a future first natural peril landstrike in the indicated geographical area.

10. The system according to claim 9, wherein the interface module, in response to the user selecting the user selectable portion, also displays in the second portion of the graphical user interface, a strike probability of a future first natural peril landstrike in the indicated geographical area.

11. The system according to claim 10, wherein the second portion of the graphical user interface is displayed in the form of a table.

12. The system according to claim 9, wherein the graphical user interface further has a third portion for entry of order data including a designation of the indicated geographical area and the offer price for purchasing a position predicting a future first natural peril landstrike in the indicated geographical area.

13. The system according to claim 9, wherein the graphical user interface further has a fourth portion for confirming a commitment to purchase a position corresponding to the order data entered.

14. An article of manufacture including a machine readable medium for causing a computer to perform a computerized method of offering for purchase, positions predicting a future first natural peril landstrike resulting from a substantially continuous ongoing natural process starting with a reported precursor tropical storm at sea and culminating in the future first natural peril landstrike, comprising:
providing a computer graphical user interface having first and second portions;
providing a database containing 1) a map of geographical areas corresponding to the positions to be offered for purchase, 2) strike probabilities of future first natural peril landstrikes for the geographical areas; and 3) offer prices for purchasing positions predicting future first natural peril landstrikes in respective geographical areas, that are based at least in part on respective strike probabilities;
displaying the map in the first portion of the graphical user interface with user selectable portions corresponding to the geographical areas of the map;
during the substantially continuous ongoing natural process, electronically obtaining updated data providing the basis for electronic calculations of strike probabilities of a future first natural peril landstrike for the geographical areas; and
in response to a user selecting a user selectable portion and thereby indicating a geographical area for selection, displaying in the second portion of the graphical user interface, an offer price, electronically updated in substantially real time so as to be based at least in part on an updated strike probability, for purchasing a position predicting the future first natural peril landstrike in the indicated geographical area.

* * * * *